US011661288B1

(12) United States Patent
Kane et al.

(10) Patent No.: US 11,661,288 B1
(45) Date of Patent: May 30, 2023

(54) CONVEYOR BELT CLEANING DEVICE CONTROLLABLE BY A CONTROL PANEL

(71) Applicant: Crossford International, LLC, Stamford, CT (US)

(72) Inventors: Timothy J. Kane, Stamford, CT (US); Gregory Wyatt, Stamford, CT (US); Evan Reyes, Stamford, CT (US); Joseph Franzino, Stamford, CT (US); Russell Barnes, Stamford, CT (US); Robert Folchi, Stamford, CT (US)

(73) Assignee: Crossford International, LLC, Stamford, CT (US)

( * ) Notice: Subject to any disclaimer, the term of this patent is extended or adjusted under 35 U.S.C. 154(b) by 0 days.

(21) Appl. No.: 17/805,723

(22) Filed: Jun. 7, 2022

Related U.S. Application Data

(63) Continuation-in-part of application No. 17/658,835, filed on Apr. 12, 2022, now Pat. No. 11,565,888.

(51) Int. Cl.
*B65G 45/24* (2006.01)
*B65G 45/02* (2006.01)
*B65G 45/18* (2006.01)

(52) U.S. Cl.
CPC ............. *B65G 45/24* (2013.01); *B65G 45/02* (2013.01); *B65G 45/18* (2013.01)

(58) Field of Classification Search
CPC ........ B65G 45/14; B65G 45/22; B65G 45/24; B65G 45/18
See application file for complete search history.

(56) References Cited

U.S. PATENT DOCUMENTS

| | | | |
|---|---|---|---|
| 3,983,888 A * | 10/1976 | Edwards ............... | B65G 45/18 134/9 |
| 7,784,476 B2 * | 8/2010 | Handy ................... | B08B 1/008 134/172 |
| 2019/0084773 A1 * | 3/2019 | Handy .................. | B65G 45/22 |

* cited by examiner

*Primary Examiner* — Mark A Deuble
(74) *Attorney, Agent, or Firm* — Tatonetti IP

(57) ABSTRACT

A dynamic, reconfigurable, and modular cleaning device utilizes software, sensors, and modular components to provide a one-size-fits-all approach to cleaning conveyor belts. The cleaning device secures to a body or frame associated with a conveyor belt, in which an associated cleaning head cleans the conveyor belt's surface. The cleaning head has an arm that extends from its body and inserts into a corresponding opening on a connecting frame associated with the cleaning device. The cleaning head is then secured in place via a cylindrical pin that extends through aligned holes on the arm and the connecting plate. Insertion of the pin connects the components together, and removal of the pin enables a user to disconnect the cleaning head and swap a new one in its place, such as to provide a different cleaning action.

20 Claims, 46 Drawing Sheets

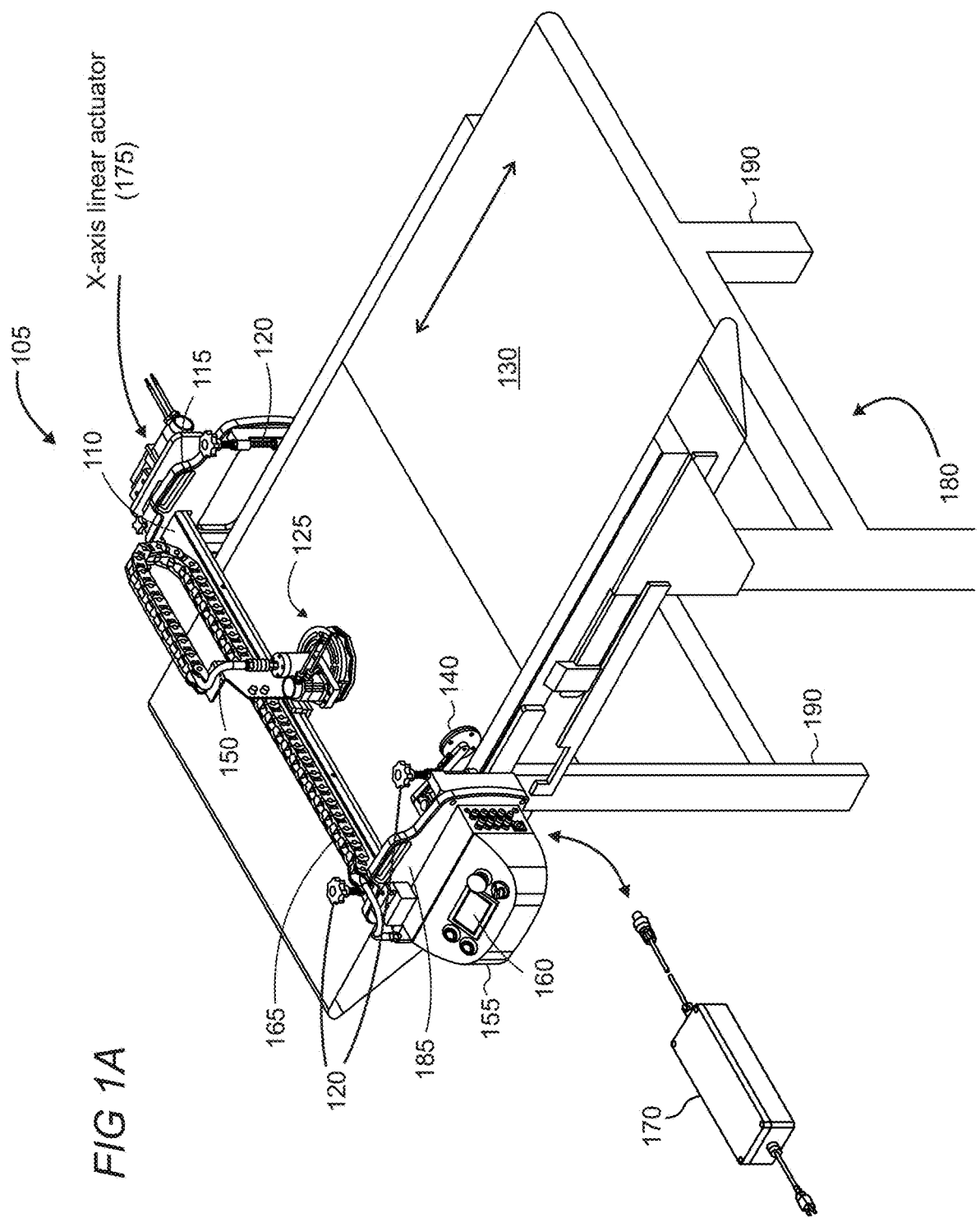

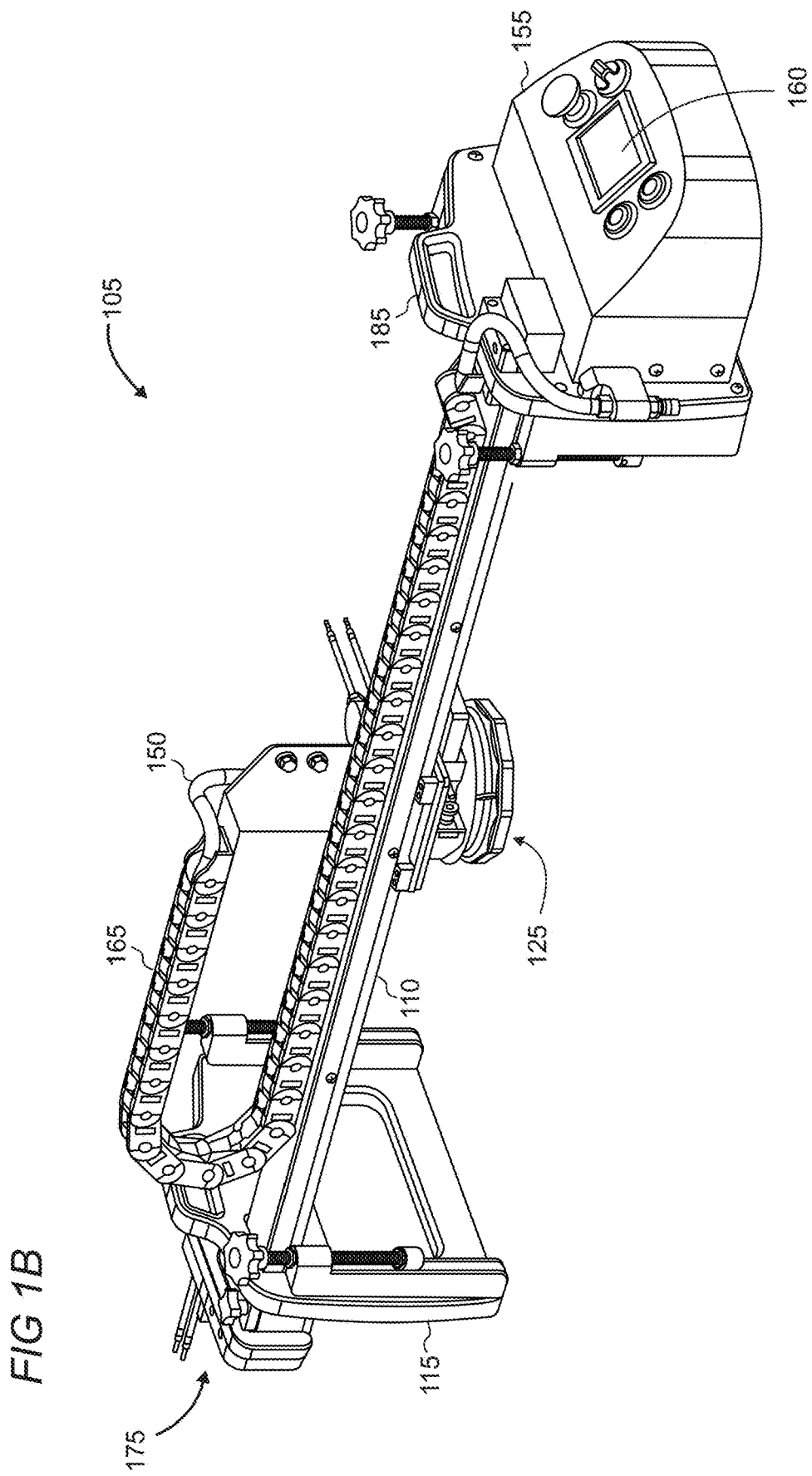

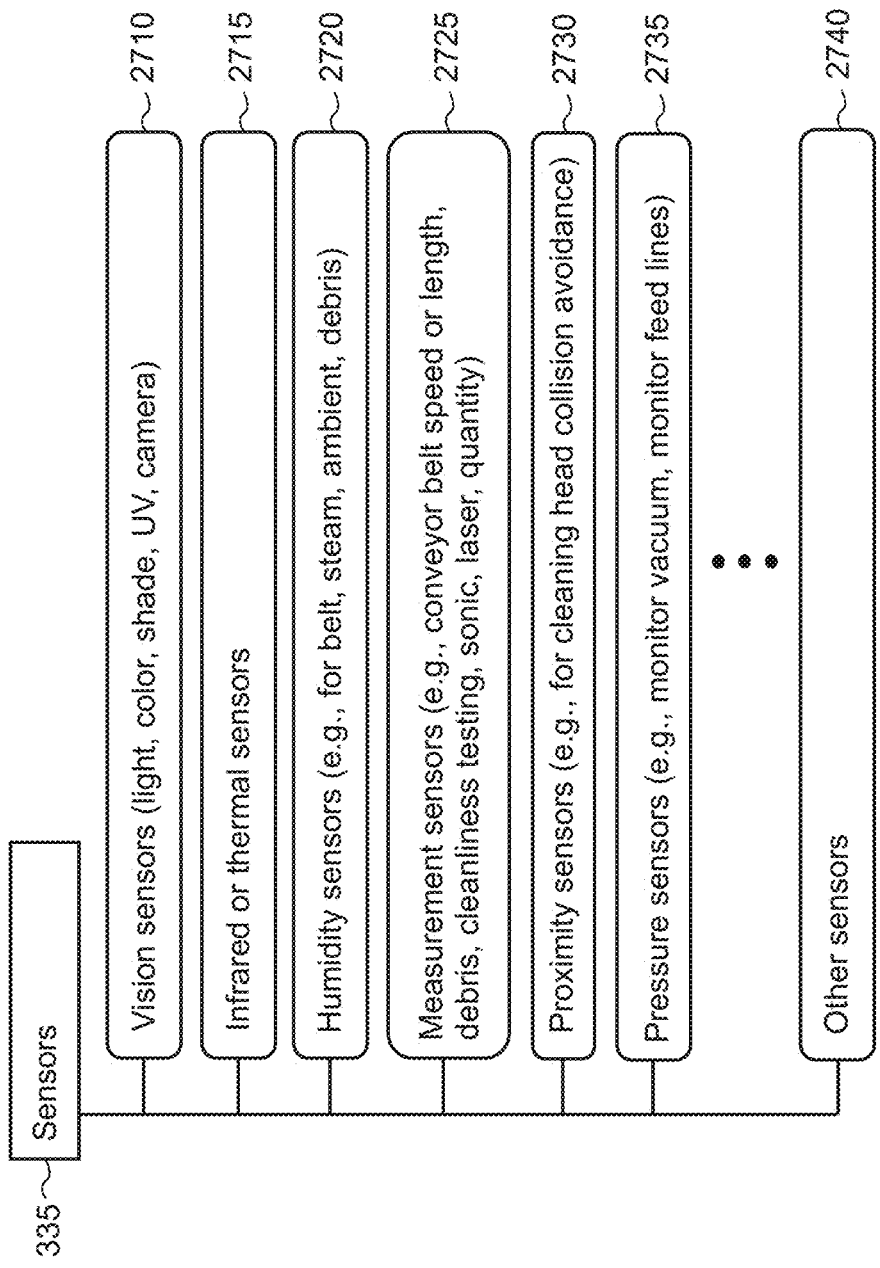

FIG 28B

Sensory considerations by control panel

| Increase cleaning | Low ———————— Conveyor belt percentage or quality cleaned status ———————— High | Reduce cleaning |
| Increase speed | Slow ———————— Conveyor belt's speed ———————— Fast | Reduce speed |
| Decrease cleaning | Low ———————— Identified large objects on conveyor belt ———————— High | Increase cleaning |
| Increase steam | Low ———————— Level of humidity identified on/around conveyor belt ———————— High | Reduce steam |

2850    2855    2860

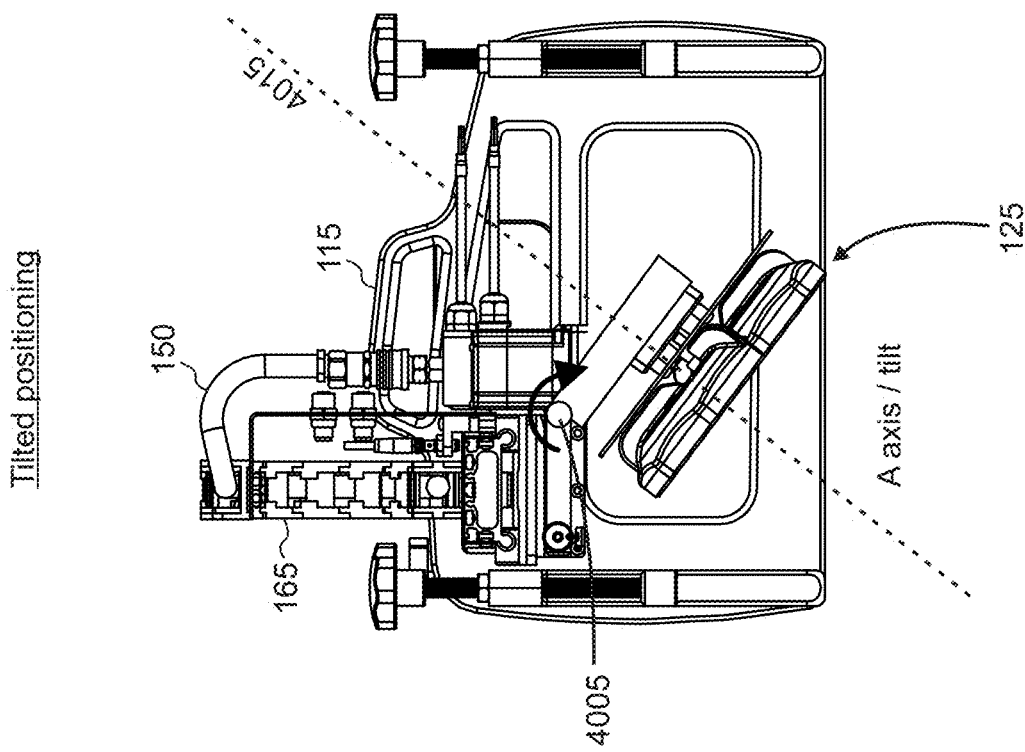
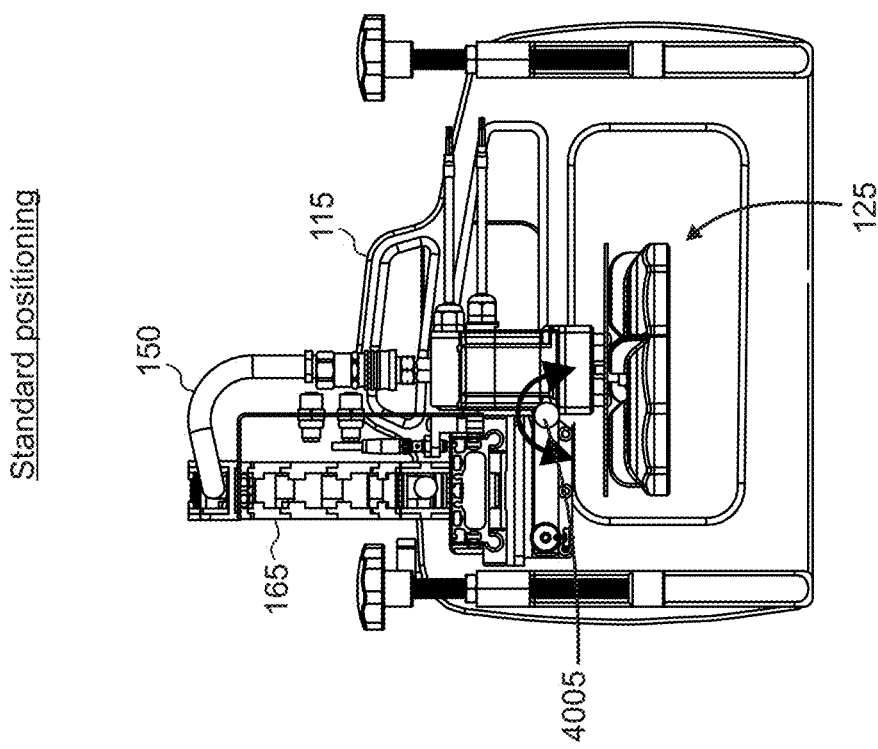
FIG 40

CONVEYOR BELT CLEANING DEVICE CONTROLLABLE BY A CONTROL PANEL

CROSS-REFERENCES TO RELATED APPLICATIONS

This Non-Provisional Utility Patent Application is a Continuation-In-Part Application of U.S. patent application Ser. No. 17/658,835, filed Apr. 12, 2022, entitled "Modular Head Cleaning Device and System," the entire contents of which is hereby incorporated herein by reference. This Non-Provisional Utility Patent Application is related to co-pending U.S. patent application Ser. No. 17/805,722, filed contemporaneously herewith on Jun. 7, 2022, entitled, "Conveyor Belt Cleaning Device Adapted with Modular Cleaning Heads," the entire contents of which is hereby incorporated herein by reference. This Non-Provisional Utility Patent Application is related to co-pending U.S. patent application Ser. No. 17/805,727, filed contemporaneously herewith on Jun. 7, 2022, entitled, "Conveyor Belt Cleaning Device having Modularity and Real-Time Cleaning Adjustments based on Sensory Input," the entire contents of which is hereby incorporated herein by reference.

BACKGROUND

Conveyor belts, such as commercial conveyor belts for food preparation or pharmaceutical processing, among other industries, become contaminated with various debris and particulates. For example, spillage from the transported items or other bacteria and germs can stick to the conveyor belt, thereby contaminating the transported items. This cleanliness problem is propounded since, at least for some conveyor belt deployments, the transported items are meant to be ingested by people or animals.

SUMMARY

A dynamic, reconfigurable, and modular cleaning device utilizes software, sensors, and modular components to provide a one-size-fits-all approach to cleaning conveyor belts. The cleaning device secures a frame or body associated with a conveyor belt that places a cleaning head above the conveyor belt for cleaning. A removable cleaning head has an arm that extends from its body and is insertable into an opening on a connecting frame attached to the cleaning device, thereby securing the removable cleaning head to the cleaning device. Corresponding holes on the arm and the connecting frame enables a user to insert a pin, such as a cylindrical pin, to attach the cleaning head to the cleaning device's frame.

Removal of the pin enables a user to remove the cleaning head's arm from the cleaning device's opening and thereby detach the components. Such a system provides modularity so that alternative cleaning heads are usable with the cleaning device. Exemplary and non-exhaustive cleaning heads include a rotary fluid dispensing cleaning head that can dispense chemicals (e.g., cleaning chemicals, bleach, etc.), air, water, and steam, rotary brushes that may dispense fluid, oscillating brushes that may dispense fluid, non-rotary fluid dispensing nozzles that have tilting or angular adjustability, vacuums, and energy emitting cleaning heads. Each one of these alternative cleaning heads may be configured with an extending arm with a hole that fits into the connecting frame's opening to secure the cleaning head to the cleaning device once the pin is inserted, as discussed above. Such a system provides modularity and customizability so that this single cleaning device system can be used in an array of scenarios and industries and provides a one-size-fits-all application.

The cleaning device's frame, or chassis, utilizes various linear actuators for controlling the cleaning head's movements. The linear actuators enable the cleaning head to move according to the x-axis, y-axis, z-axis, and a-axis (tilt). The linear actuators are operatively coupled to the cleaning head to directly or indirectly adjust the cleaning head's positioning. The linear actuators are controllable via a control panel and can be dynamically controlled to accommodate varied cleaning scenarios. For example, movement along the z-axis—in addition to the x- and y-axes—accommodates certain dispensing or other cleaning heads to be a distance from the conveyor belt while in use. Such dynamic movement also helps the cleaning heads target the conveyor belt from differing angles, providing a more precise and fulfilled cleaning.

The cleaning device implements a control panel configured with software applications to control the device's operations. The terms "control panel" or "computing device" may be used interchangeably herein to describe their functionalities. Such configurations provide dynamic cleaning operations and functionality responsive to, for example, detected information about the conveyor belt. Alternatively, the system may also utilize specific input operations depending on the user's preferences.

The cleaning device implements various sensory devices to gather information that the control panel can use to control the operations of the cleaning device in real-time, namely the cleaning head. The control panel is adapted with a touchscreen display to provide user interaction and control over the cleaning device, although other user interfaces (UIs) are also possible, such as pointing devices, keyboards, etc. The touchscreen display may present to the user various options for initiating the cleaning device's cleaning operations. For example, the user may develop their own custom cleaning program using the display's prompts, select a pre-made program, or input a pre-made program from some external source, such as a USB (universal serial bus) drive or another computing device that connects to the control panel, such as over NFC (near field communication), Bluetooth®, WiFi, etc. Pre-existing programs can also be edited at the control panel as well.

The cleaning device's components' mechanical and operational parameters may be set up at first use or for a new use scenario. For example, the recessed head's offset, the non-recessed head's offset, the head's near (proximal) and extended (distal) positioning relative to the unique conveyor belt's width, a cleaning level, belt speed and belt length information, and sensory input. This information may be one or both manually or automatically entered into the control panel's settings for a new program or may alternatively be edited for a pre-existing program.

Various sensory inputs are transmitted to the control panel to process and dynamically adjust the cleaning device and/or cleaning head's operations. Exemplary and non-exhaustive sensors can include vision sensors including light, color, shade, infrared, UV (ultraviolet); thermal sensors for temperature detection, humidity sensors, measurement sensors, proximity sensors, pressure sensors, and speed sensors, among other sensory devices. Each of these sensors may gather data and transmit the gathered data to the control panel's one or more processors for processing and consideration. For example, one or more vision sensors (e.g., infrared, UV, light, etc.) can detect cleanliness or dirtiness at specific locations or areas of the conveyor belt. The processor can utilize such data when controlling the cleaning head to, for example, instruct the cleaning head to focus on dirtied areas and avoid already-clean areas. While the control panel may receive the data and adjust the cleaning device's operations, alternatively, the gathered data may be transmitted to a user computing device (e.g., laptop computer) or remote service that can control the cleaning device. Therefore, the remote service may operate as a Software as a Service (SaaS) implementation.

Specific sensors can be used for specific types of cleaning heads or may work with a range of cleaning heads, depending on the sensed data. Knowledge and use of such data enable the control panel to cease operations when the conveyor belt is sufficiently cleaned, thereby saving electrical and mechanical resources and enhancing user experiences. Other actions can also be performed responsive to gathered data, such as focusing the cleaning head on specific areas on the conveyor belt, switching off the cleaning head if the conveyor belt is stuck, and adjusting a cleaning level, strength, or exhaustiveness, among other actions.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

It will be appreciated that the above-described subject matter may be implemented as a computer-controlled apparatus, a computer process, a computing system, or as an article of manufacture such as one or more computer-readable storage media. These and various other features will be apparent from reading the following Detailed Description and reviewing the associated drawings.

DESCRIPTION OF THE DRAWINGS

FIGS. 1A-B show illustrative representations of a conveyor belt cleaning device;

FIG. 27 shows an illustrative schema of sensors that may be used with the cleaning device and control panel;

FIG. 28B shows an illustrative diagram in which the control panel may adjust operational parameters based on gathered sensory data;

FIG. 40 shows an illustrative representation of the cleaning head's a-axis tilt capabilities;

Like reference numerals indicate like elements in the drawings. Elements are not drawn to scale unless otherwise indicated.

DETAILED DESCRIPTION

Figure 2:
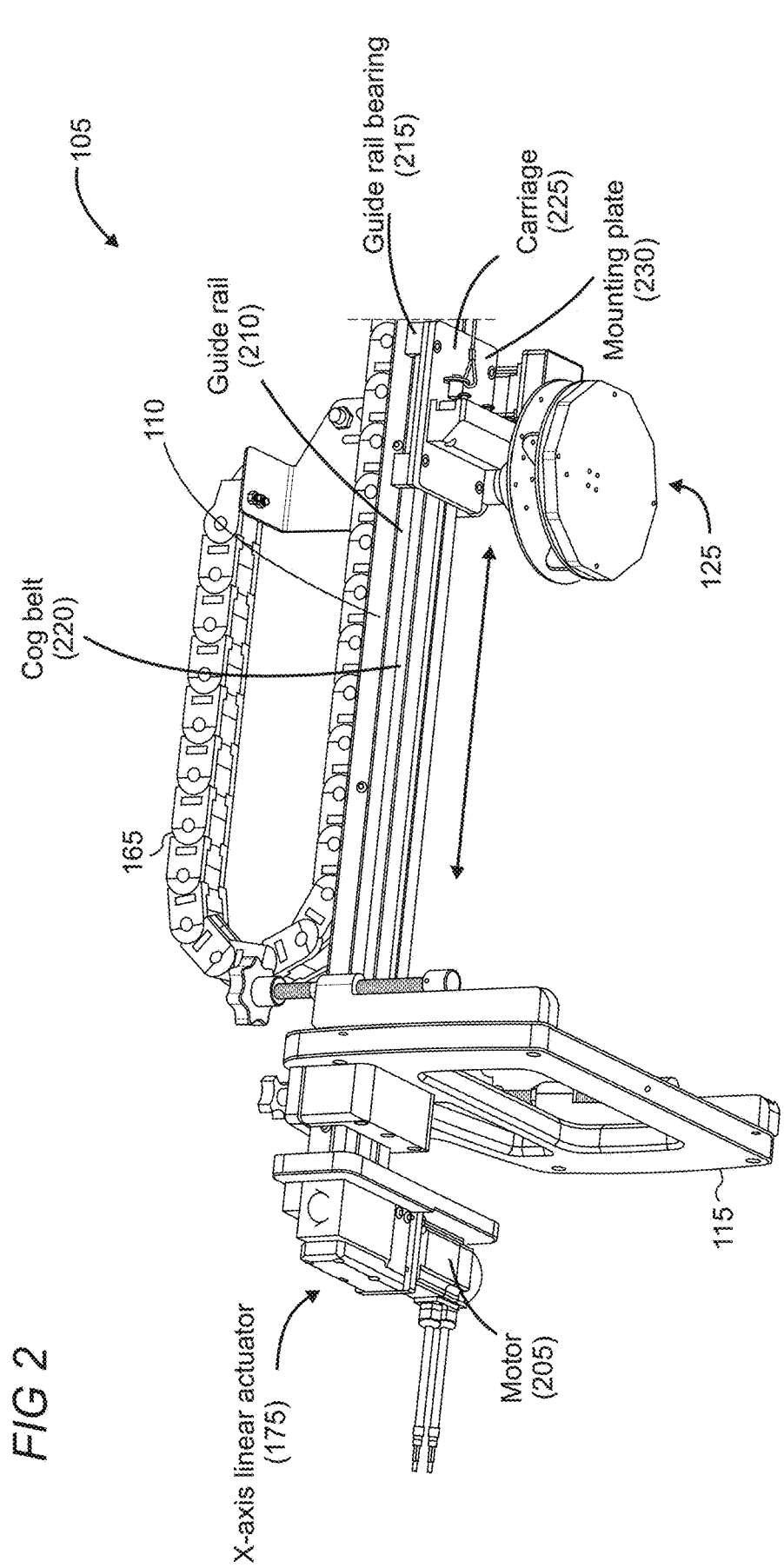
FIG. 2 shows an illustrative representation of the x-axis carriage that causes lateral movements of the cleaning head.

FIGS. 1A and 1B show illustrative representations of a cleaning device 105 that employs a cleaning head 125 to clean an advancing conveyor belt 130. Although a specific cleaning head 125 is shown, multiple types of cleaning heads can be connected to and disconnected from the cleaning device's frame 110, as discussed in greater detail below. The capability to use different cleaning heads enables a variety of cleaning techniques on a conveyor belt and reduces wear and tear on a given cleaning head. The cleaning device 105 relies on gravity and friction to hold the entire device in place on the body or frame adjacent to the conveyor belt 130. As discussed in further detail below, the vertical height adjustment components 120 or a vertical actuator engage against the conveyor belt's body or frame, and can be used to adjust the height of the cleaning device. The handles on opposing ends of the cleaning device enables a user to lift the device up from the conveyor belt.

The cleaning head 125 is configured as a rotary cleaning head that may or may not—depending on the implementation—dispense a chemical (e.g., detergent, bleach, etc.), water, steam, or air at the conveyor belt. The cleaning head is configured to perform some cleaning action at the conveyor belt 130 either by directly contacting the belt's surface, by outputting a medium (chemical, water, steam, air) to the belt's surface, or a combination of the two. The cleaning action causes the cleaning head to remove any particulates or debris and ultimately clean the conveyor belt.

The cleaning head 125 and conveyor belt 130 are supported by a base assembly 180, including a series of legs 190 that rests against a base or ground. The base assembly and legs may be comprised of a metal or other suitable material that has sufficient strength to support the cleaning device 105 and conveyor belt 130, among other components.

The cleaning device 105 includes a frame 110 that may be constructed of metal or plastic, such as plastic polycarbonate. The frame extends across the width ends of the cleaning device and the conveyor belt 130. An adjustable end frame 115 affixes the cleaning device's body to the conveyor belt 130 and the belt's frame or body. The adjustable end frame 115 can move inward toward the opposite end of the conveyor belt, such as toward the control panel 115, to enable the cleaning device to customizably fit various conveyor belt sizes. An opposite end frame 185 may be statically positioned.

A wire carriage 165 connects and translatably moves with the cleaning head 125. The wire carriage may be comprised of metal, plastic, or other suitable material. The wire carriage 165 moves transverse to the direction of the conveyor belt 130 via the x-axis linear actuator 175 and its components, which may include a motor, transmission, shaft, mount, and gears (not shown in FIGS. 1A-B).

Various types of linear actuators may be utilized to move the cleaning device 105, such as lead screw actuators or ball screw actuators. An electric motor is generally connected to the linear actuator by a flexible coupling or a belt, enabling the motor to be mounted either axially or perpendicular to the linear actuator. A variety of motor sizes can be mounted to these actuators depending on requirements and the specific implementation. The linear actuator has linear bearings that support the moving payload, as well as rotary bearings that support either the lead screw, ball screw, or belt pulleys.

A lead screw actuator uses a plain screw/nut arrangement to translate the rotary motion from a motor to linear motion. A manually driven screw or an AC (alternating current) induction motor are some methods to supply the rotary motion. The actuator's ability to back drive is reduced over ball screw actuators due to the low efficiency of the screw/nut. In some applications, this can be an advantage as it helps to keep the payload stationary while not in motion.

A ball screw actuator may use a high-precision nut with recirculating ball bearings that rotate around a ground screw thread. The advantages of this system are high precision and low friction, giving an efficient method of converting rotary motion to linear motion. Stepper or servo motors may be used to supply the rotary motion.

Belt actuators work where a belt is carried between two pulleys and attached to the moving carriage, then, as the belt rotates, the carriage is pulled along the actuator. One of the pulleys is driven by a motor which is generally mounted perpendicular to the actuator and coupled using a flexible coupling. Belt-driven linear actuators may be effective for long travel and high linear speed applications. Any one of these actuator configurations and mechanisms is usable with the present system. While this discussion is with respect to the x-axis actuator, similar actuators may be utilized for the y- and z-axis actuators, as discussed in greater detail below.

The wire carriage 165 moves with the cleaning head's variety of directional movements on the conveyor belt 130, including x-axis, y-axis, z-axis, and a-axis (tilt) movements, as discussed in greater detail below. A tube 150 is positioned and extends within the wire carriage 165 to transport liquids, steam, and other dispensable materials. One end of the tube 150 connects to the cleaning head 125 for output of the air, steam, or liquid, and the other end may be connected to a reservoir to provide such materials to the cleaning device. The wire carriage 165 functions as an energy chain for various items, including cables (e.g., bus, data, fiber optic, etc.) and energy sources (e.g., electricity, gas, air, and liquids). The wire carriage provides protection and manipulation of the wires during the movement of the cleaning head. The wires and cables may lead from the control panel or reservoir to the cleaning head 125 so materials can be utilized by the cleaning head, and a control panel 155 can instruct the cleaning head's movements and actions. Although the tube is shown in the drawings, the tube may alternatively represent a cable or otherwise host a series of wires, cables, or tubes that are transmitted to the cleaning head.

The cleaning device 105 includes the control panel 155, or computing device, that controls the cleaning device's various operations. The control panel includes a user interface (UI) 160 that can interact with a user through its input/output (I/O) capabilities. Although a touchscreen display is shown, other I/O devices may also be utilized with the control panel, such as a keyboard, numerical pin pad, a microphone, speakers, pointers, etc. Alternatively, the cleaning device may employ a network interface that can communicate with an external computing device, like a smartphone, tablet computer, laptop computer, desktop computer, or a remote service.

The cleaning device 105 includes manual vertical height adjustment components 120 that enable a user to vary the height of the cleaning device's overall positioning relative to the conveyor belt 130. Multiple vertical height adjustments are in place to provide greater customization to the user when adjusting the height. The vertical height adjustments include a knob that controls a threaded shank that can lift or drop that particular side of the cleaning device. While manual height adjustments are possible, y-axis actuators may alternatively be used, as discussed in greater detail below.

The control panel 155 may be connected to a power source 170, such as a battery or otherwise plug that connects to an outlet. The power source provides power to the cleaning device's components, including the control panel, cleaning head 125, etc.

FIG. 2 shows an illustrative representation in which a sliding carriage 225 is attached to a guide rail 210 on an underside of the cleaning device 105. The carriage 225 and associated mounting plate 230 provide sufficient support to withstand rigorous movements facilitated by the linear actuator 175. The mounting plate and carriage utilize the guide bearings, such as a roller, plate, or block, to facilitate carriage and cleaning head 125 movements. The guide rail is connected to a cog belt which moves responsive to the x-axis linear actuator 175. Although only the motor 205 is marked in FIG. 2, other linear actuator operational components may be associated therewith. Triggered movement by the actuator extends to the cog belt and translates to the cleaning head's x-axis movements through the carriage. The cleaning head may be offset from the guide rail so the cleaning head can receive cables, tubes, etc., from the wire carriage 165 (FIGS. 1A-B).

The carriage 225 is the element that moves along the guide rail 210 and supports the attached load, such as the cleaning head 125. The linear guides implemented may be, for example, sliding contact guides or roller bearing guides. In sliding contact guides, such as the guide rail bearings 215, the sliding carriage slides over the rail, which may use some lubricant. In roller bearing guides, roller bearings are located inside the sliding carriage 225. The addition of the roller bearing helps to reduce the coefficient of friction between the carriage and the guide rail, which in turn reduces the force required to move the carriage without necessarily requiring lubrication. The design of the rails for these guides will include grooves for the roller bearings to move along.

Figure 3:
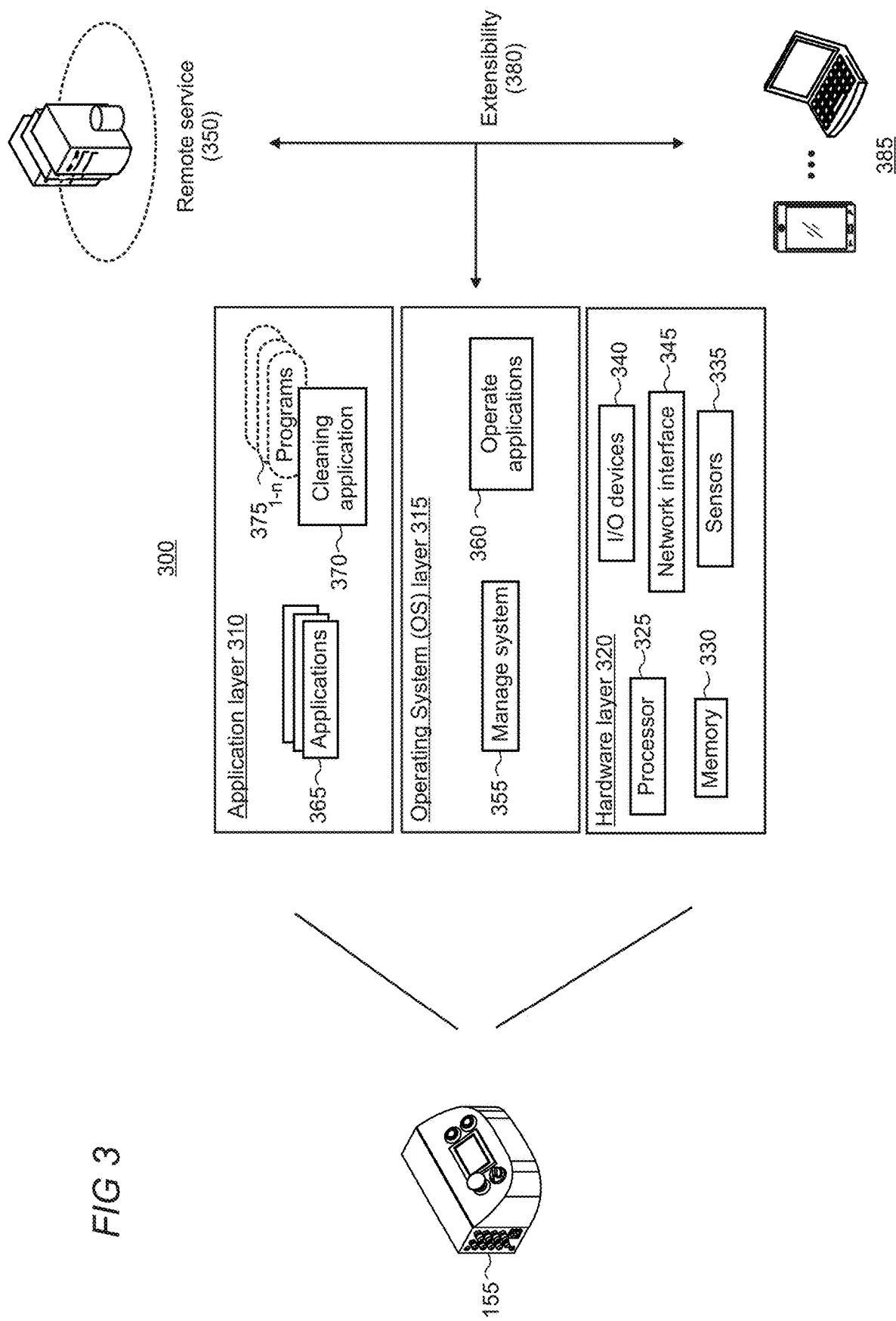
FIG. 3 shows an illustrative layered architecture of the cleaning device's control panel.

FIG. 3 shows a simplified layered architecture 300 of the cleaning device's control panel 155, or computing device, which controls at least some of the cleaning device's operations. The control panel can include a hardware layer 320, operating system (OS) layer 315, and application layer 310. The hardware layer 320 provides an abstraction of the various hardware used by the control panel 155 (e.g., input and output devices, networking and radio hardware, etc.) to the layers above it. In this illustrative example, the hardware layer supports processor(s) 325, memory 330, input/output devices (e.g., mouse, keyboard, touchscreen display 160) 340, network interface (e.g., network interface card) 345, and sensors 335. The network interface may support an ethernet connection, WiFi connectivity to a router, or short-range communications over Bluetooth® or NFC (Near Field Communication), such as to a user's computing device (e.g., smartphone, tablet computer, personal computer (PC), laptop, etc.).

The application layer 310 in this illustrative example supports various applications 365, including a cleaning application 370 that facilitates the cleaning head's cleaning of conveyor belts. As shown, the cleaning application may utilize user-created or pre-made programs 375 and installed at the control panel 155. The cleaning application references and executes the programs when cleaning a conveyor belt.

Leveraging the network interface 345, the cleaning application 370 may be configured with extensibility 380 to communicate with external computing devices, such as remote service 350 and user computing device 385. For example, the user devices may be instantiated with the cleaning application to thereby enable remote control or assessment over the cleaning device. The user devices may see whether the cleaning device 105 is operating, its completion level, and other status information (FIGS. 23 and 24), as discussed in greater detail below. The remote service may also be configured with a cleaning application 370 that remotely controls the cleaning device's operations. For example, the remote service may receive data gathered by a cleaning device's sensors 335 and responsively instruct the cleaning device to adjust its operations. The remote service may be in communication with multiple distinct cleaning devices at different or the same sites and, in that regard, operates as a Software as a Service (SaaS).

The OS layer 315 supports, among other operations, managing system 355 and operating applications/programs 360. The OS layer may interoperate with the application and hardware layers in order to perform various functions and features.

Figure 4:
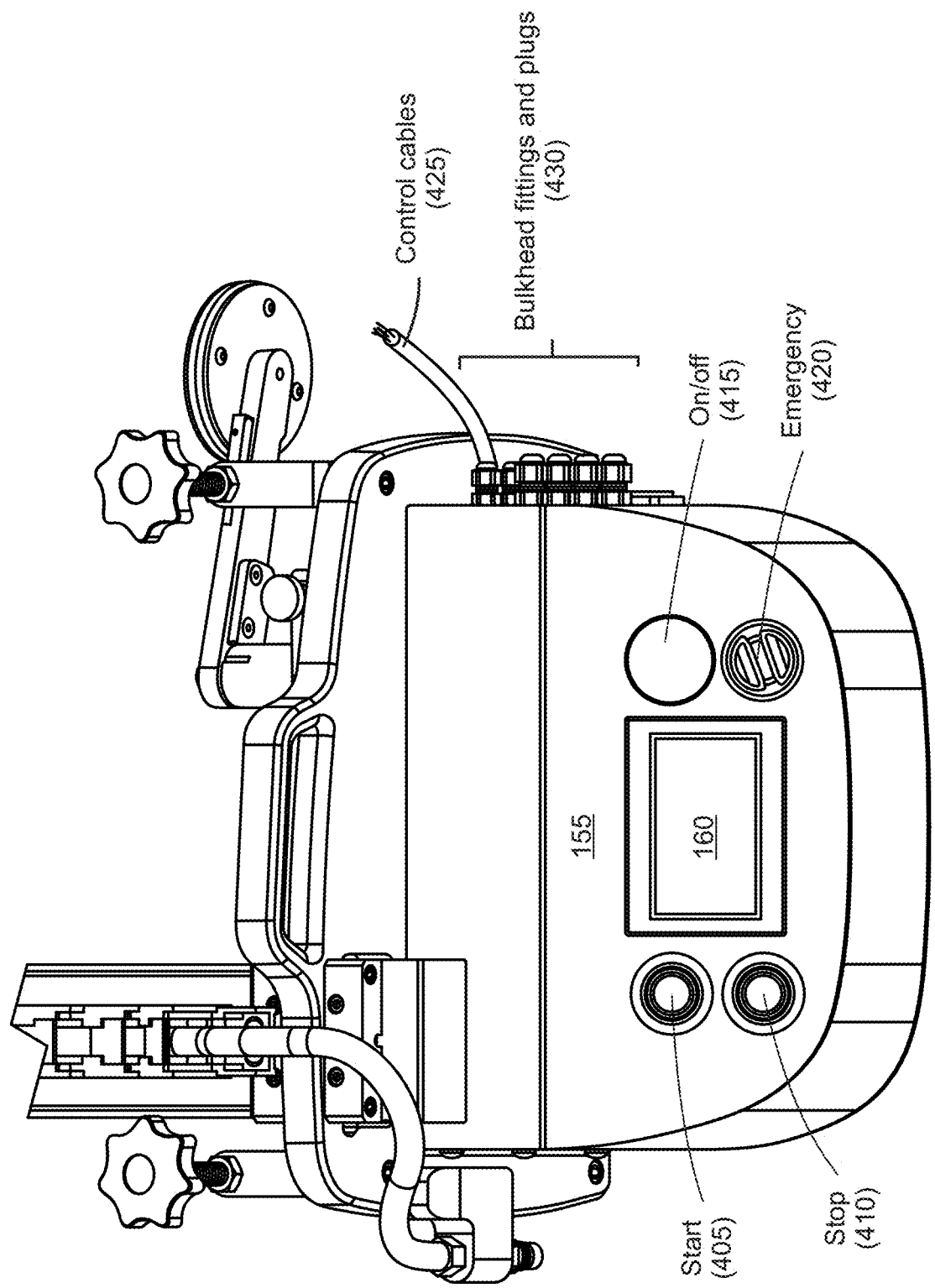
FIG. 4 shows an illustrative representation of the control panel's user interface (UI)

FIG. 4 shows an illustrative representation in which the cleaning device's control panel 155 includes various components. For example, the control panel includes physical push buttons or switches with specific functions, such as a start button 405, stop button 410, on/off button 415, and emergency button 420. Pressing the start button may cause the cleaning device to execute a previously or most-recently selected program 375. The UI 160 may likewise be configured with buttons that can perform similar functions while also configured with additional functionality, as discussed in greater detail below. The control panel includes a series of bulkhead fittings and plugs 430 that can receive various inputs and control cables 425 for connecting to other components or computing devices. Operation of the conveyor belt may plug into the control panel so that the control panel can control starting and stopping of the conveyor belt. For example, the control panel can direct power to the conveyor belt to move or interrupt electricity from being delivered to the conveyor belt's operational motor.

Figure 5:
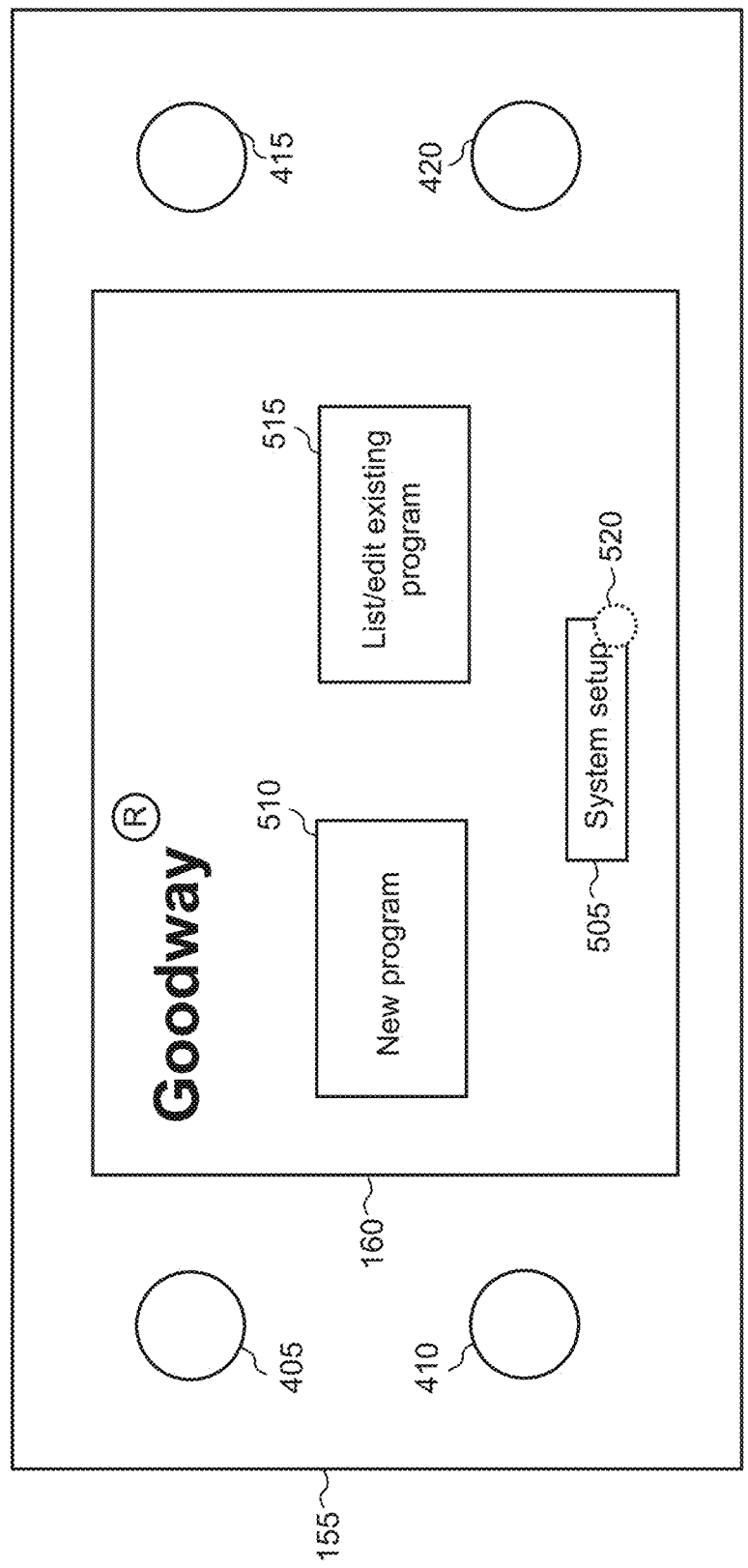
FIG. 5 shows an illustrative UI for setting up the control panel

FIG. 5 shows an illustrative user interface (UI) 160 on the control panel 155 in which the user can initiate a program on the cleaning device 105. The UI presented may be an initial screen presented upon switching on the control panel. The user is presented with a new program option 510, list/edit existing programs option 515, and a system set up option 505. The user selects the system setup option 505, as representatively shown by input 520. User input 520 may be a touch on the touchscreen UI 160 or may be a keyboard stroke, pointer click, or voice input at a microphone, among other input methods.

Figure 6:
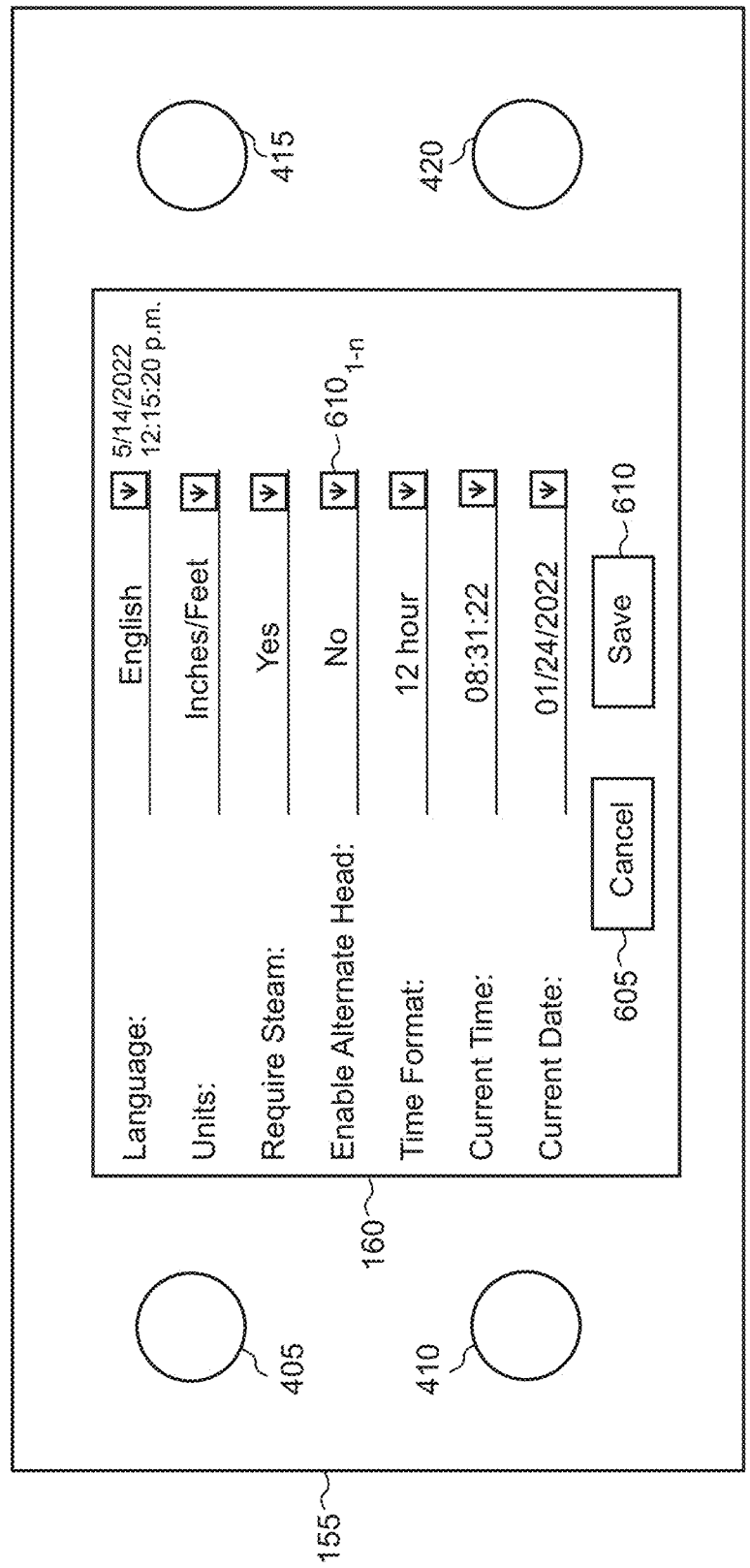
FIG. 6 shows an illustrative system setup UI.

FIG. 6 shows an illustrative UI 160 in which the selected system setup option 505 from FIG. 5 is displayed. This screen presents the user with the various settings information for the cleaning device's operation, such as the language, units, steam utilization, alternate head utilization, time format, current time, and current date. This information may be utilized during the setup of programs by the cleaning application 370 on the control panel 155. The down arrow buttons 610 indicate that the user can select on any one of the options and change its setting. For example, the user can change the language from English to Italian, the units from inches/feet to centimeters/meters, remove the option of steam, enable the user of an alternate head, change the time format to 24 hour clock, and alter the current time and date. The user can select the cancel button 605 to revert back to the previous screen without saving any changes, or can select the save button 610 to save any changes that the user makes.

Figure 7:
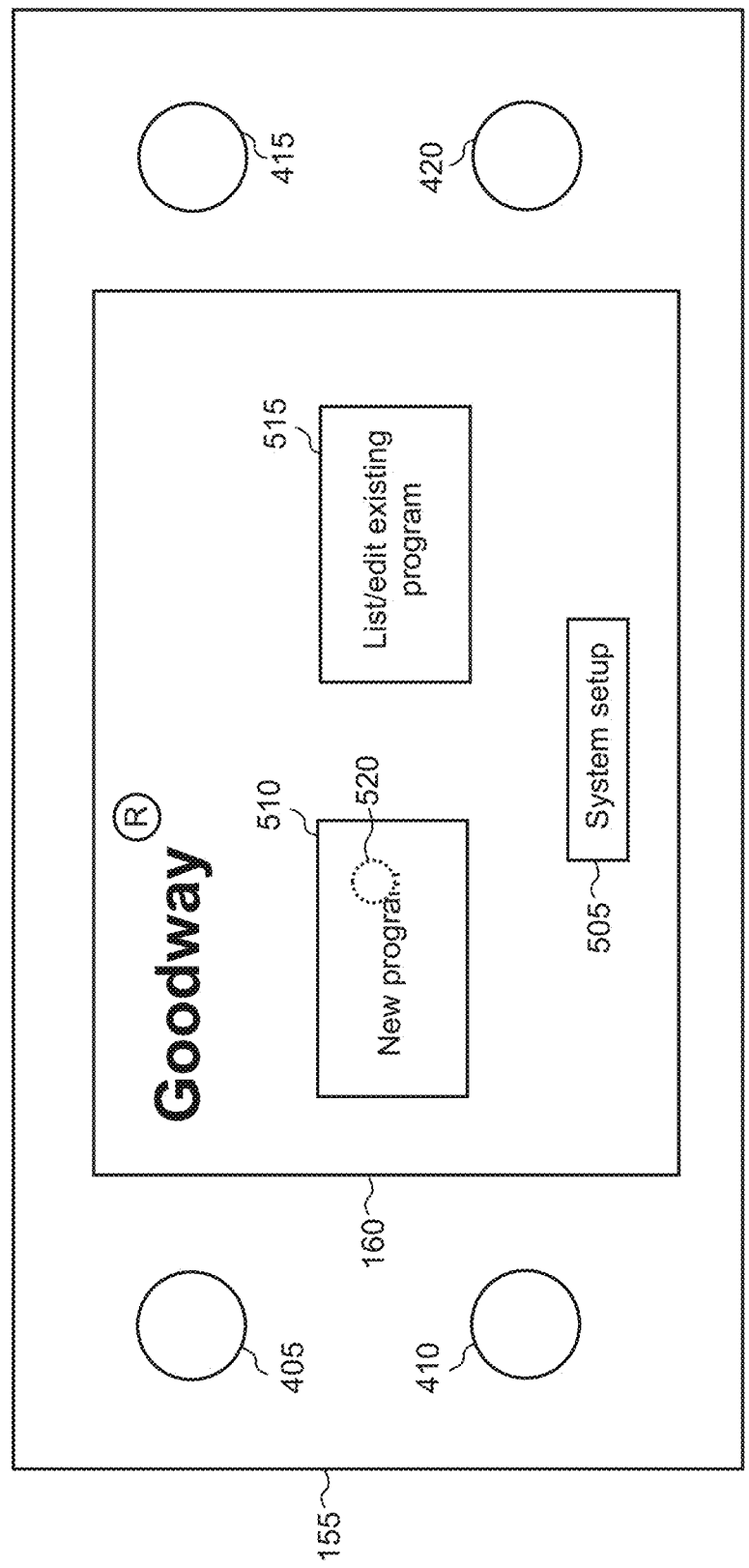
FIG. 7 shows an illustrative UI in which the user selects a new program setup.
Figure 8:
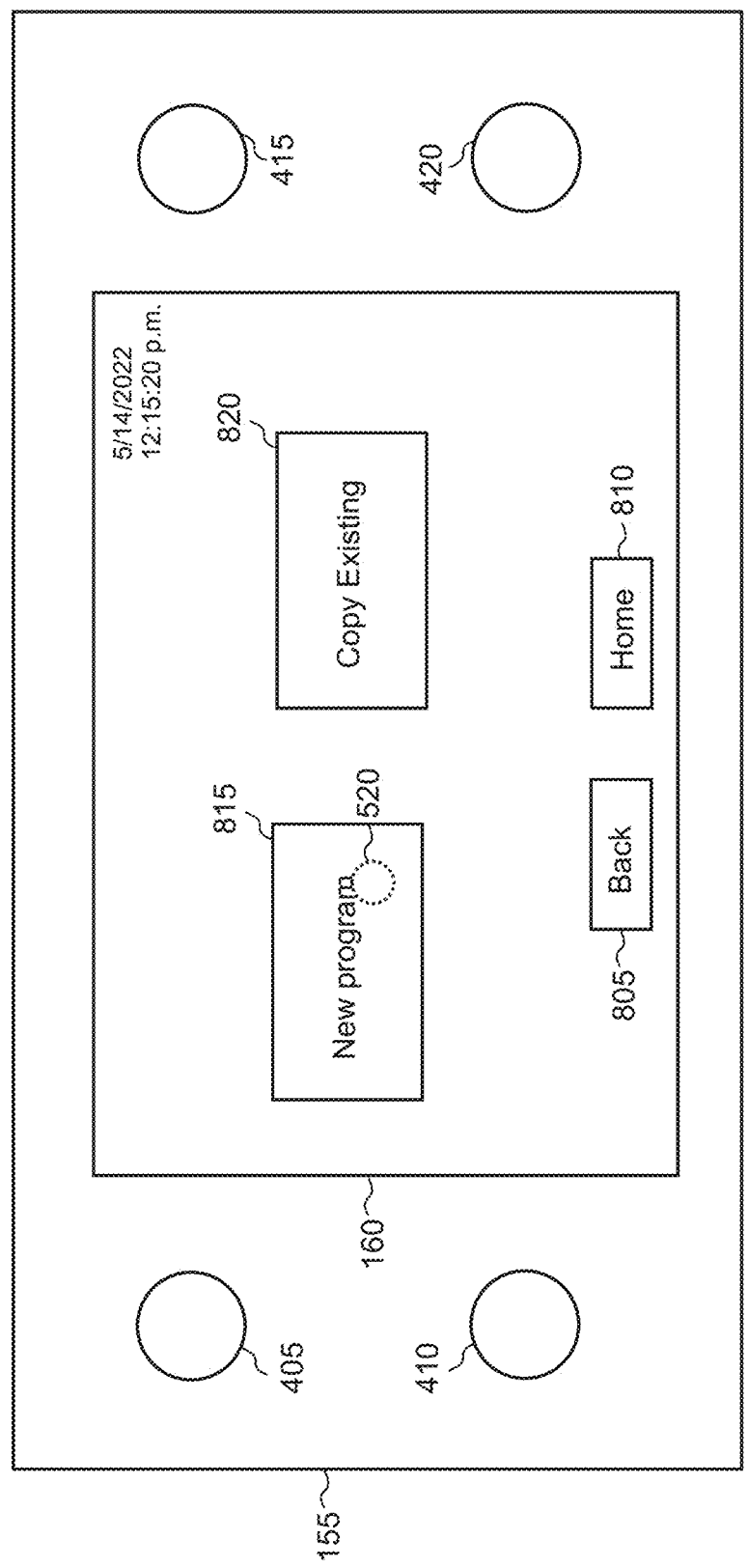
FIG. 8 shows an illustrative UI in which the user creates a new program.

FIG. 7 shows an illustrative representation in which the user selects 520 the new program option 510 instead of accessing the list of existing programs at option 515. FIG. 8 is the subsequent screen to the FIG. 7 display. In FIG. 8, the user is able to create an entirely new program via option 815 or may copy an existing program via option 820. The copy of existing program option 820 may enable a user to select a previously created program, such as from the list of existing programs at option 515 in FIG. 7, or install a new program from an external media, such as a USB (universal serial bus), the remote service 350, or user computing devices 385. The back button 805 takes the user to a previously displayed screen, and the home button 810 takes the user back to, for example, the UI presented in FIG. 5.

Figure 9:
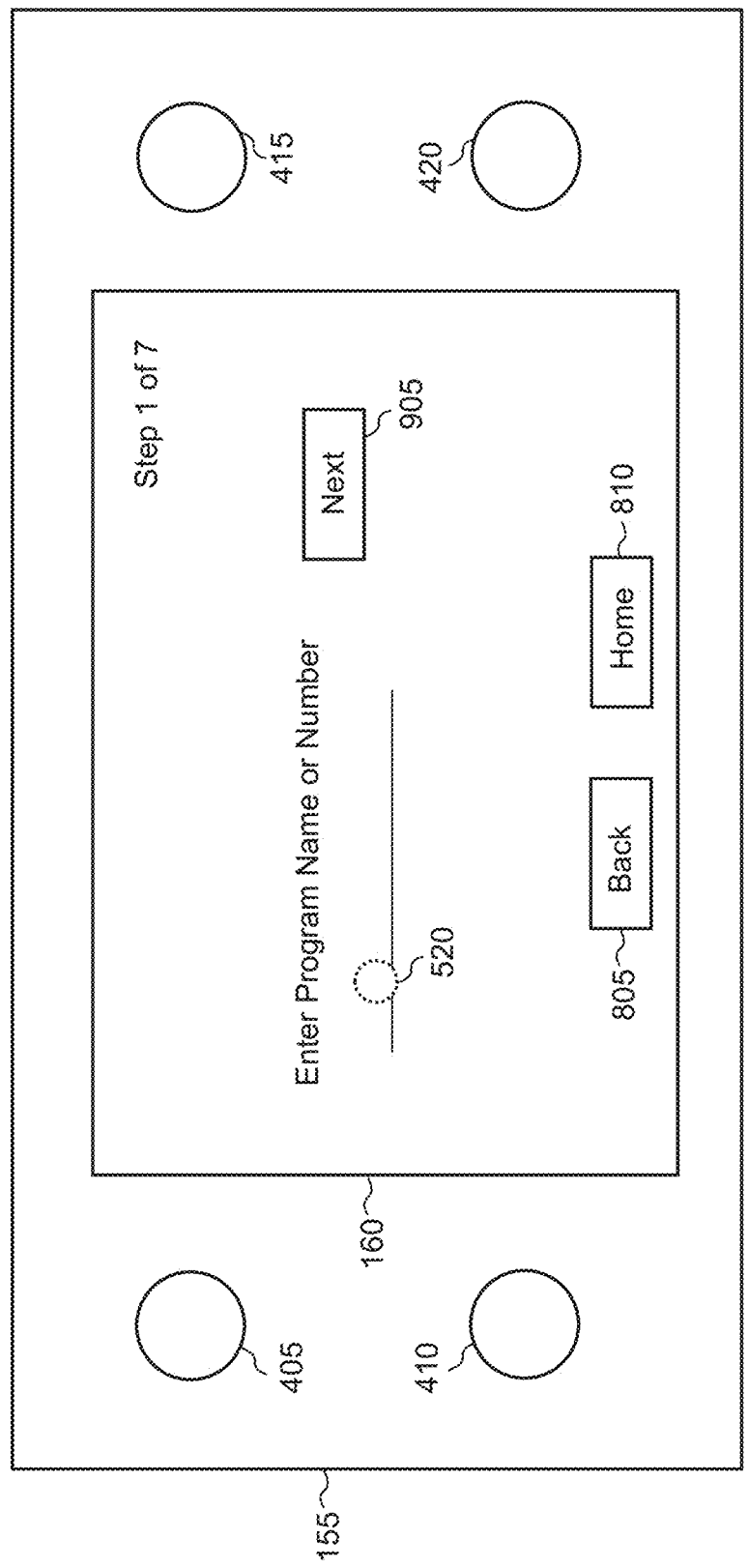
FIG. 9 shows an illustrative UI in which the user selects to enter a program name or designation.
Figure 10:
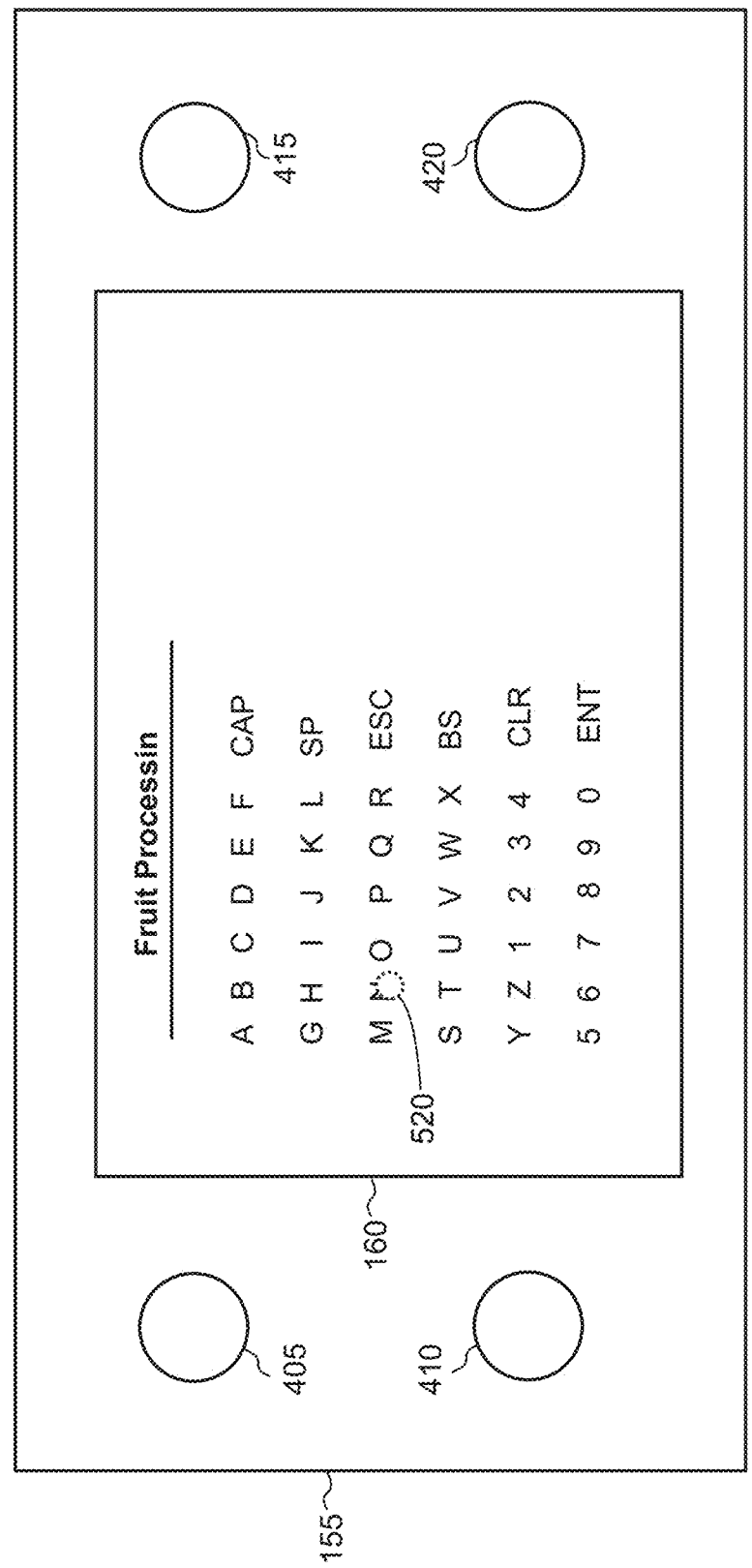
FIG. 10 shows an illustrative UI in which the user enters in the program name or designation.
Figure 11:
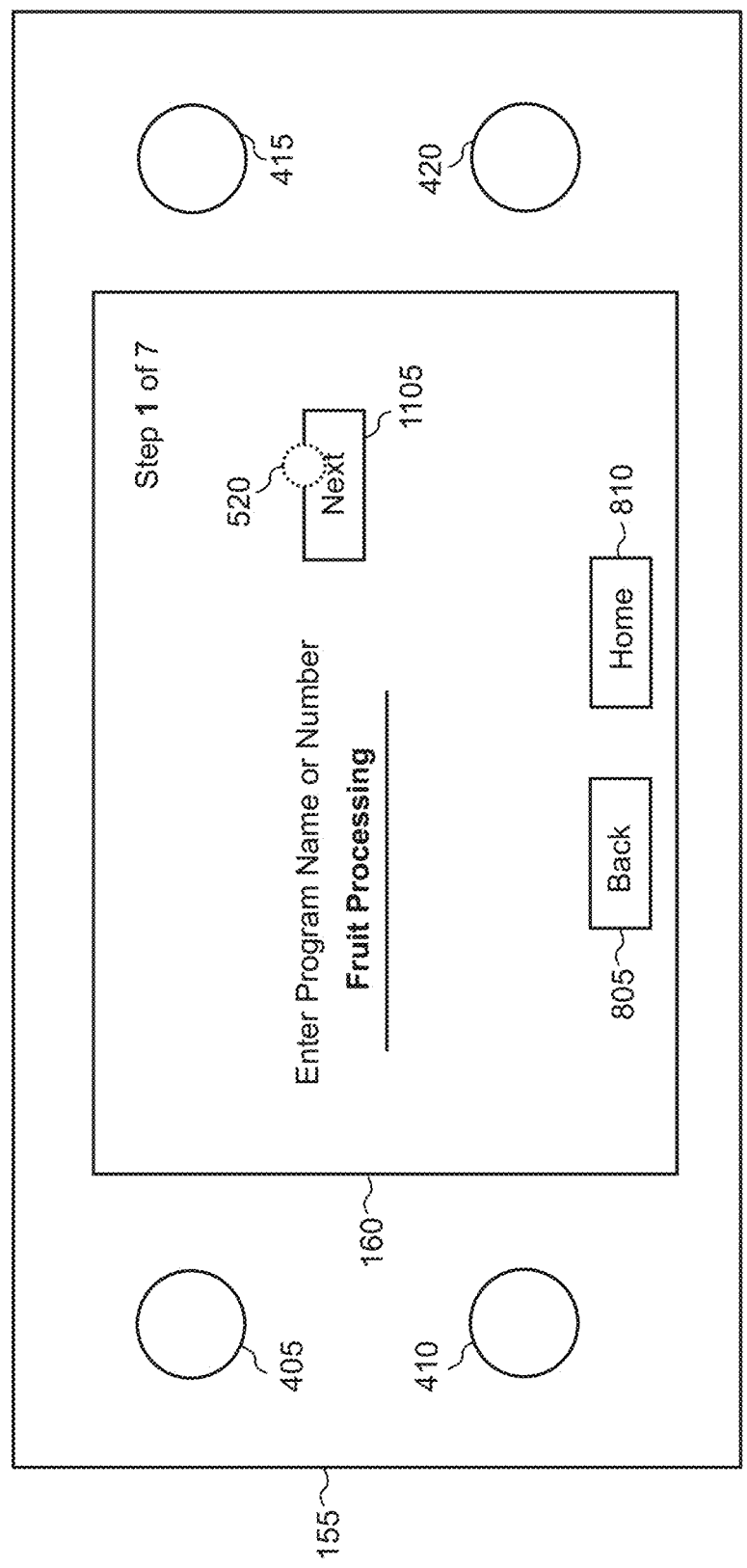
FIG. 11 shows an illustrative UI in which the program name has been entered.

FIG. 9 shows an illustrative UI that is subsequent to the user selecting the new program option 815 from the UI shown in FIG. 8. As shown in the subsequent steps to set up a new or modify an existing program, the step numbers in the setup process are shown in the top right corner of the UI. In this step, the UI requests the user to enter a program name or designation, which the user does by selecting the textbox via input 520. FIGS. 10 and 11 show the user entering their desired title for the new program setup and the completed program name, respectively. The user selected the title "Fruit Processing" for the current program. The user may enter any set of alpha-numeric characters in creating a program name.

Figure 12:
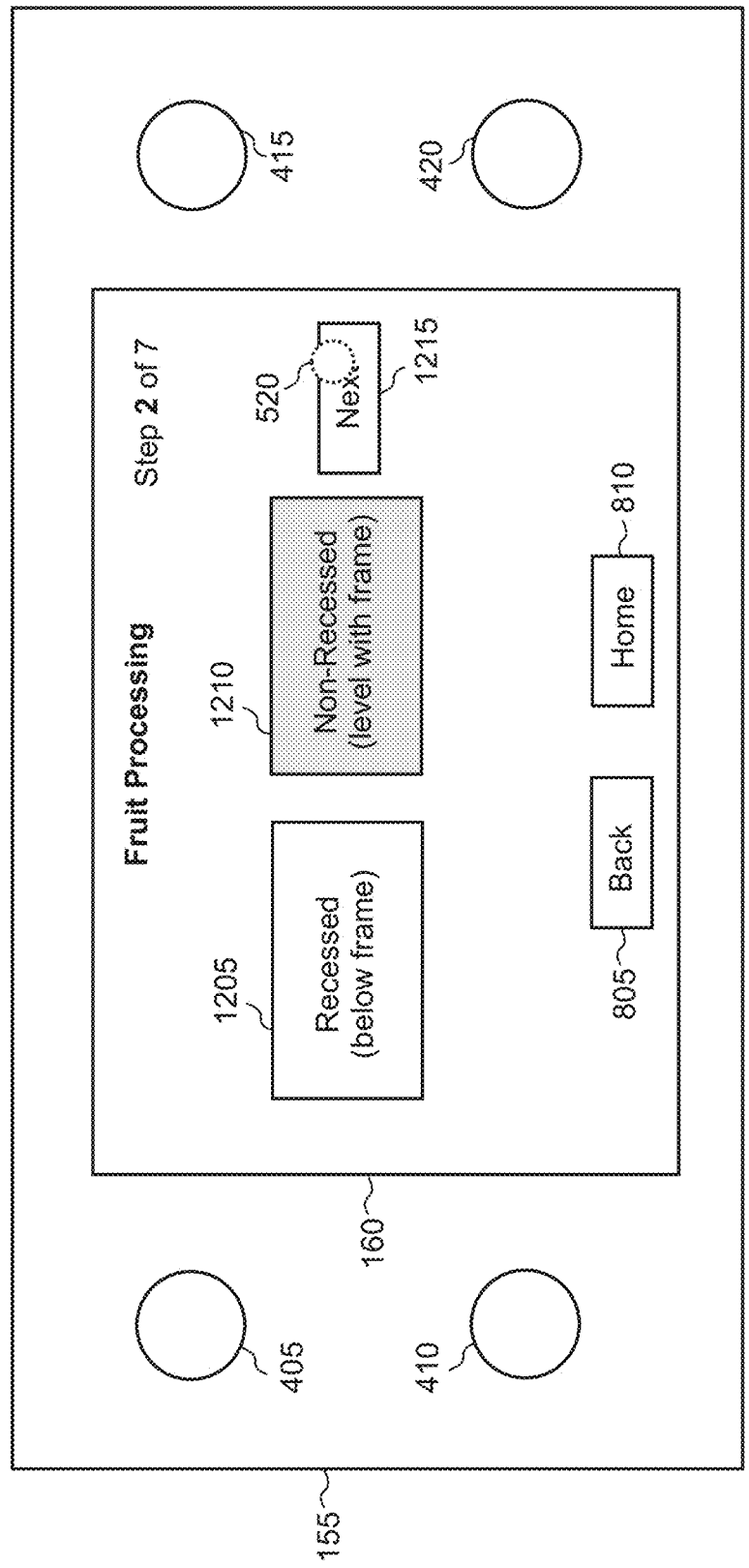
FIG. 12 shows an illustrative UI in which the user selects a recessed or non-recessed head.

Upon selecting the "Next" button 1105 in FIG. 11, the user is presented with step two in the new program setup process, in FIG. 12. In step two, the control panel 155 requests the user to select whether the conveyor belt 130 that the cleaning device 105 is used with is recessed (below frame) 1205 or non-recessed (level with frame) 1210. Conveyor belts may be constructed differently depending on the scenario, and having such information enables the cleaning device 105 to change and optimize its cleaning patterns for each situation. Non-recessed signifies that the conveyor belt is level with the frame rails, and recessed indicates that the conveyor belt is not level with the frame rails. In this example, the user selects that the conveyor belt is non-recessed, as illustrated by the tinting of the button.

Figure 13:
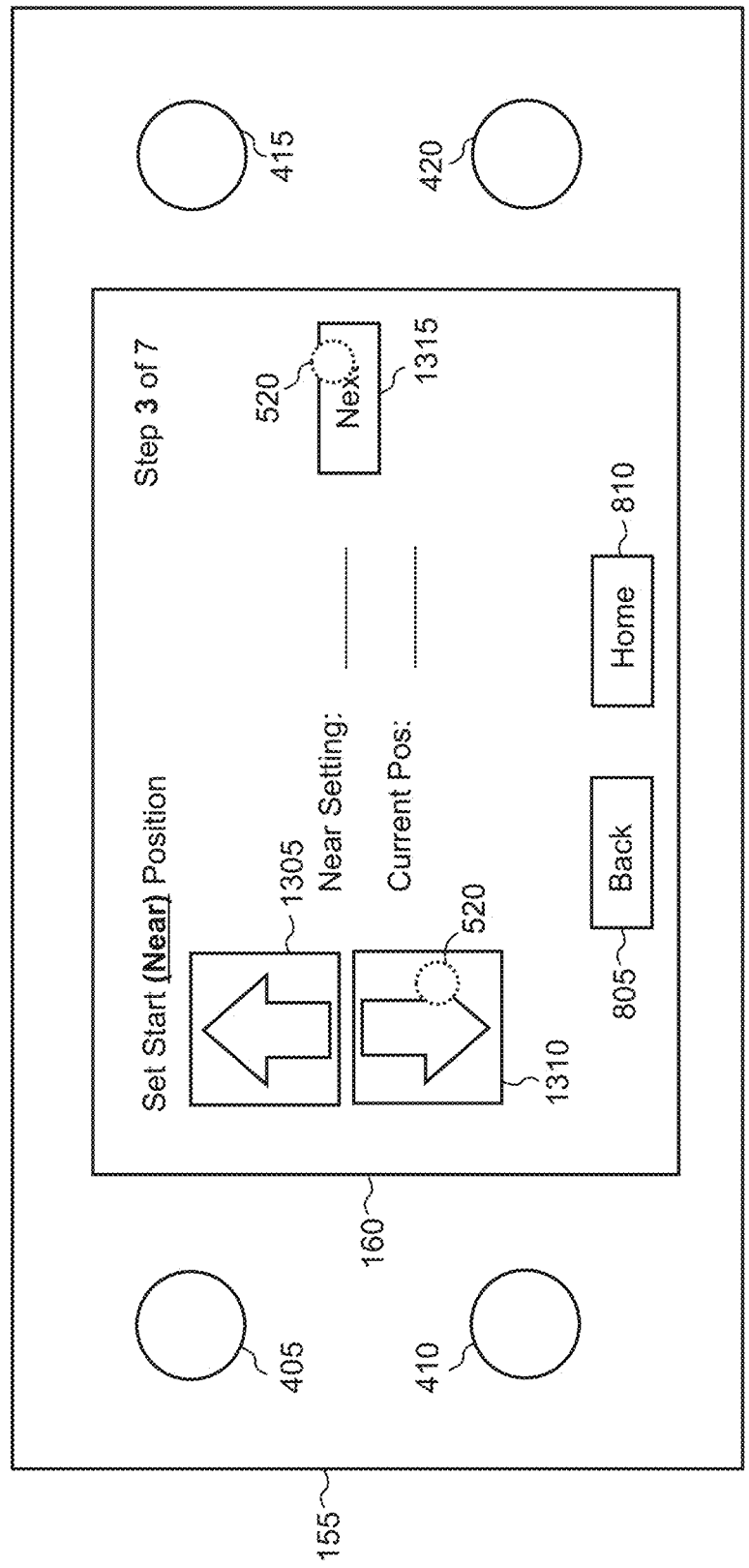
FIG. 13 shows an illustrative UI in which the user sets a near position of a cleaning head.

Upon selecting the next button 1215 in FIG. 12, the user is presented with step three in the new program setup process, in FIG. 13. In step three, the near (proximal) and extended (distal) positions for the cleaning head 125 are established and stored in the control panel's memory. These positions are used by the cleaning head during operation so as to ensure that the conveyor belt 130 is fully cleaned and the cleaning head does not extend beyond the conveyor belt.

Figure 14:
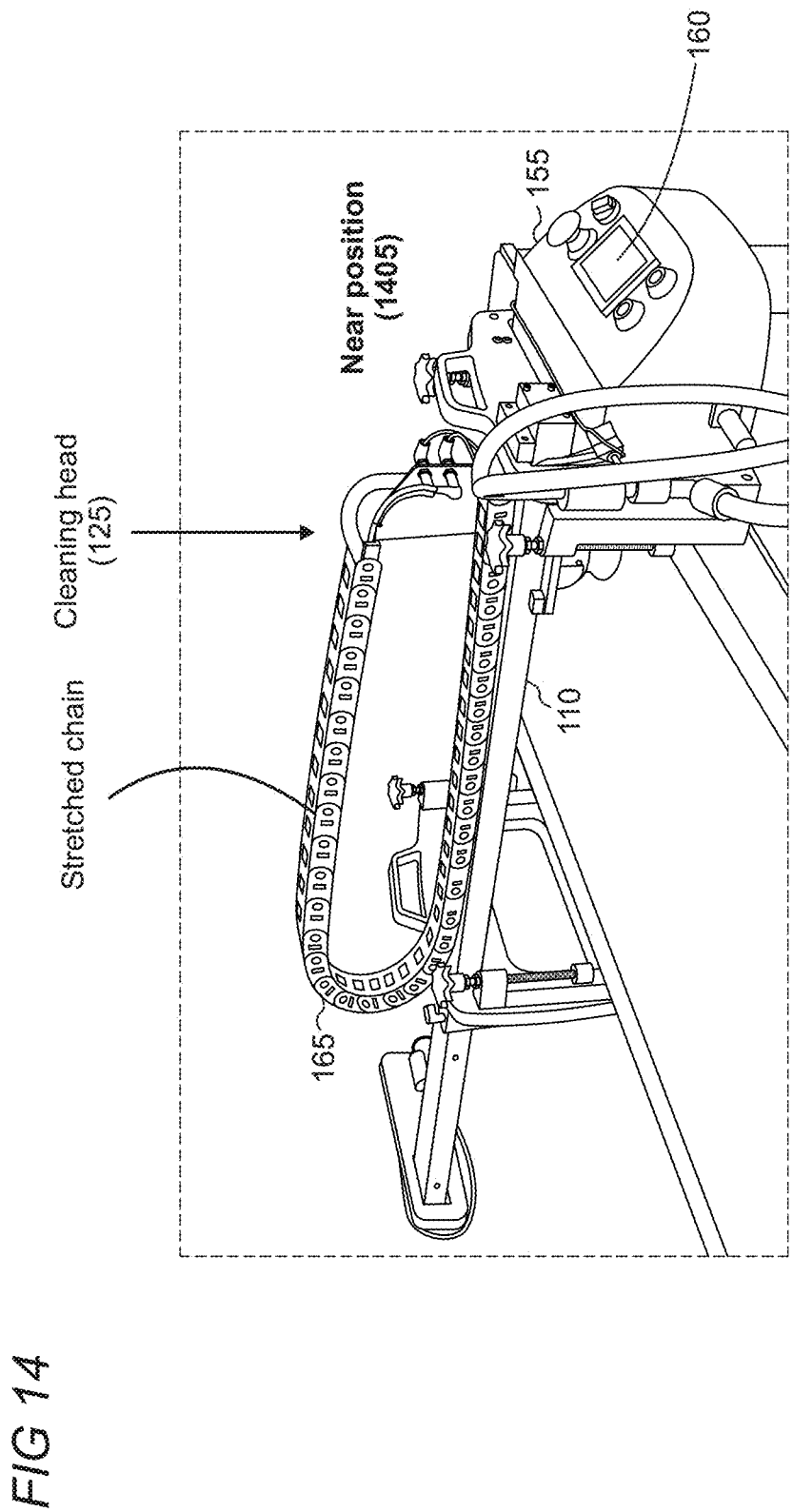
FIG. 14 shows an illustrative representation in which the cleaning head is at the near position of the conveyor belt.

The UI 160 in FIG. 13 queries the user to set the near position. The user selects 520 the down arrow button 1310 on the UI, which physically moves the cleaning head 125 to an end of the conveyor belt 130. As shown in FIG. 14, the user stops pressing the down arrow button when the cleaning head 125 reaches the near position 1405 of the conveyor belt. The near position may be the end of the conveyor belt, slightly beyond the conveyor belt's end, slightly before the conveyor belt's end, or otherwise dependent on the user's input and preferences. The wire carriage 165 is stretched so the cleaning head 125 can reach the end position.

Figure 15:
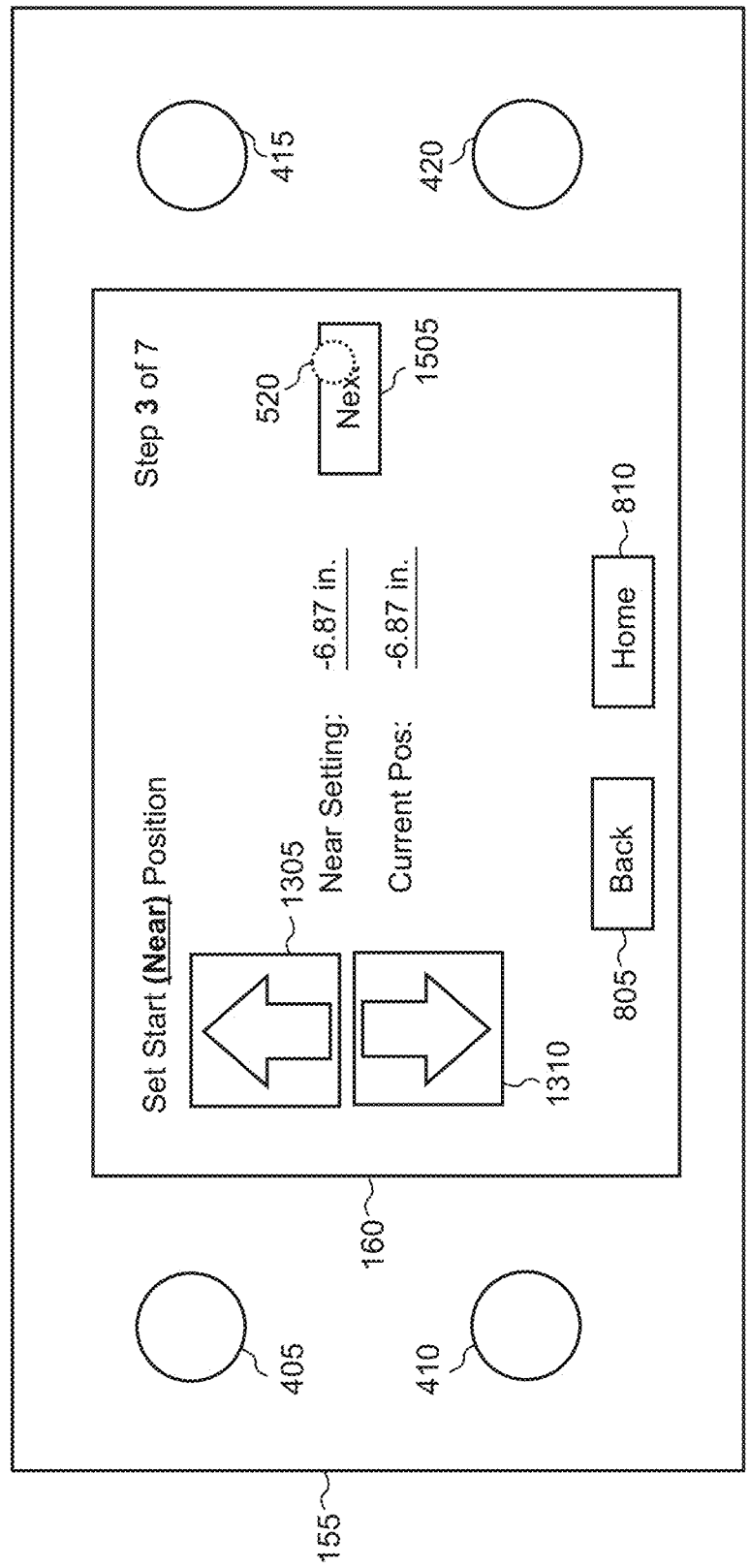
FIG. 15 shows an illustrative UI in which the near position's coordinates are propagated based on the user's set positioning.

In FIG. 15, the control panel 155 automatically detects the cleaning head's position for the conveyor belt 130, as shown by the −6.87 inches input in the textbox on the UI 160. The control panel may be pre-configured to associate each cleaning head position with a numerical measurement, such as in inches. Since this is a new program being customized, the "Near Setting" and "Current Pos." (for "position") are the same; however, if the user was editing an existing program, the "Near setting" may be set to a prior set near position and the "Current Pos." may show the cleaning head's current position, as controlled by the user's arrow movements. In such a situation, the "Current Pos." may update the "Near Setting" when the user hits the "Next" button.

Figure 16:
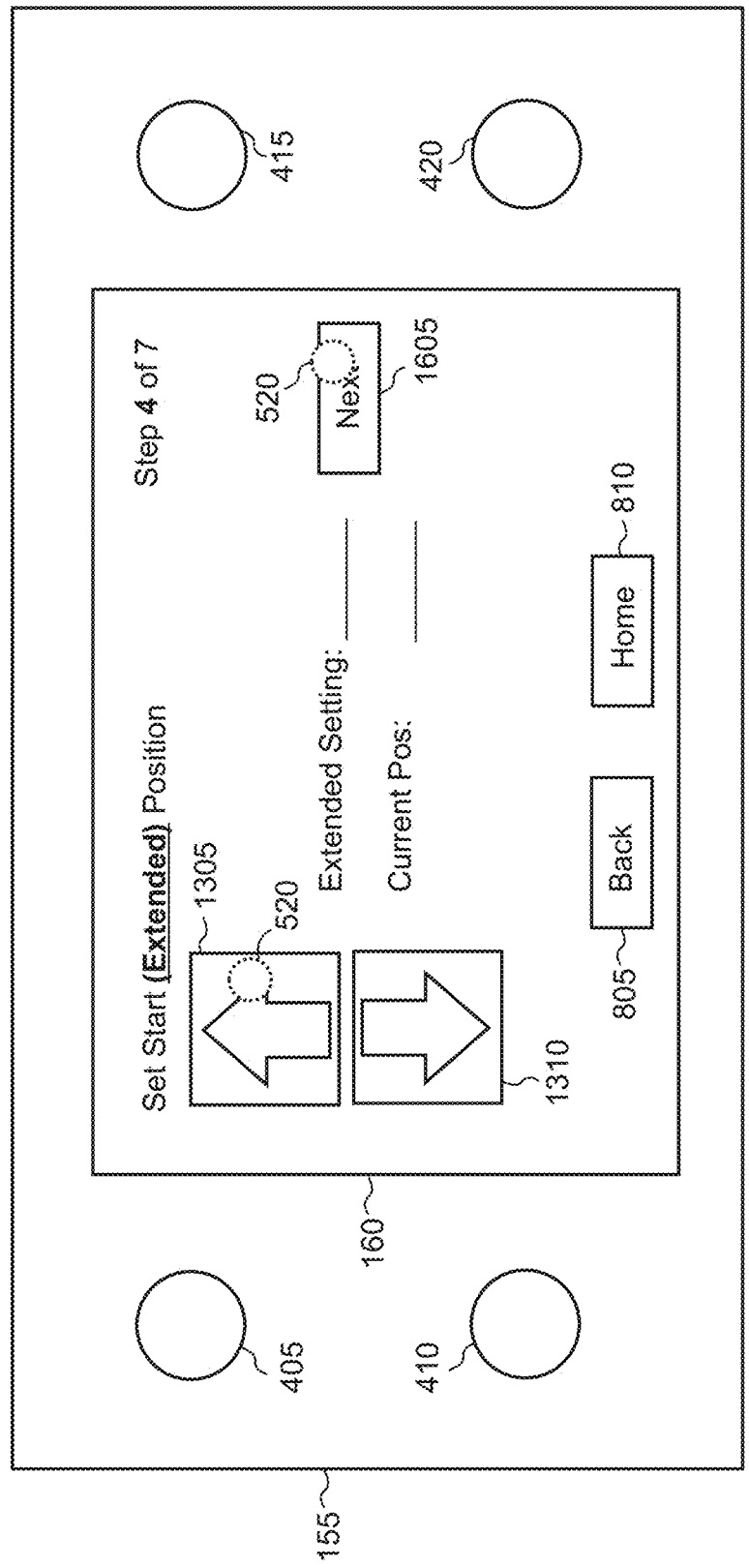
FIG. 16 shows an illustrative UI in which the user sets an extended (far) position of the cleaning head.
Figure 17:
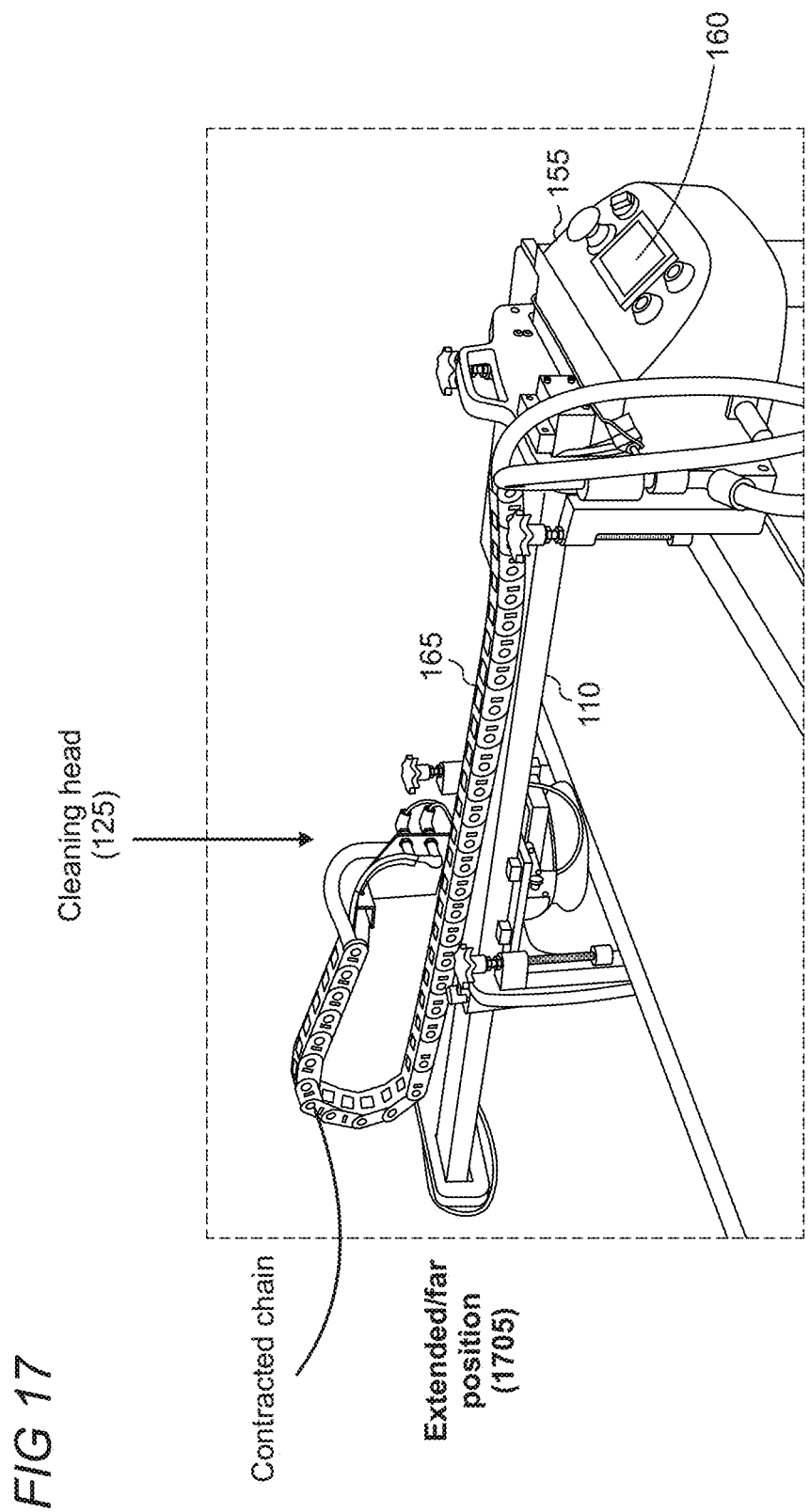
FIG. 17 shows an illustrative representation in which the cleaning head is at the extended position of the conveyor belt.

FIG. 16 shows the UI 160 after the user selects 520 the next button 1505 in FIG. 15. FIG. 16 shows an illustrative UI 160 in which the user selects 520 the up arrow button 1305 for configuring the cleaning head's extended position relative to the conveyor belt 130. As shown in FIG. 17, the user stops pressing the up arrow button when the cleaning head reaches the extended position 1705 of the conveyor belt, which is at the opposite end to the conveyor belt's near position 1405. The extended position may be at the end of the conveyor belt, slightly beyond the conveyor belt's end, slightly before the conveyor belt's end, or otherwise dependent on the user's input and preferences. The wire carriage 165 is contracted so the cleaning head 125 can reach the end position. As shown, the wire carriage translatably moves with the cleaning head so as to maintain the cable connections, tube connections, etc.

Figure 18:
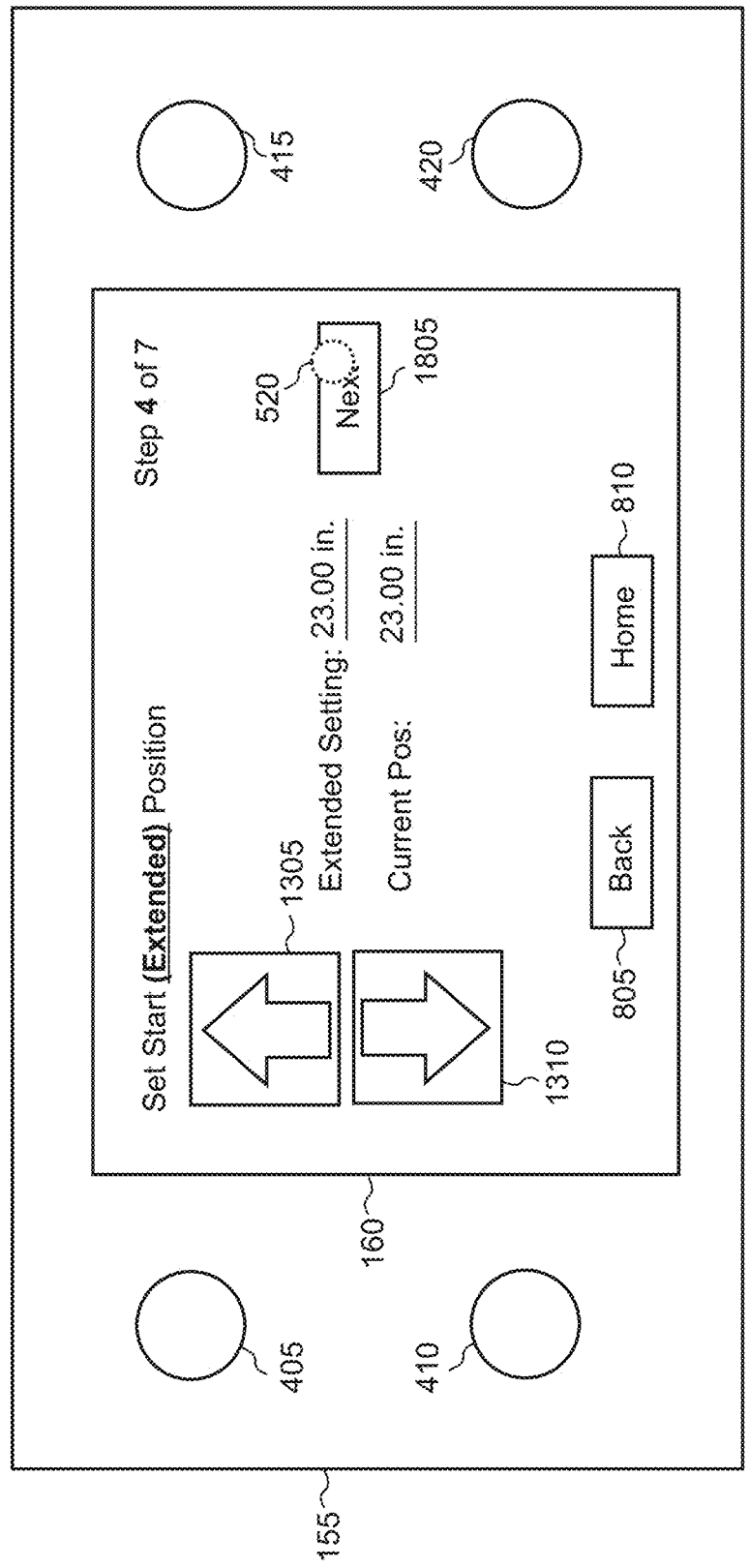
FIG. 18 shows an illustrative UI in which the extended position's coordinates are propagated based on the user's set positioning.

FIG. 18 shows an illustrative UI 160 in which the control panel 155 automatically detects and measures the cleaning head's extended position for the conveyor belt 130, as shown by the 23.00 inches input in the textbox. Since this is a new program being customized, the "Extended Setting" and "Current Pos." are the same; however, if the user was editing an existing program, the "Extended setting" may be set to a prior set extended position and the "Current Pos." may show the cleaning head's current position, as controlled by the user's arrow movements. In such a situation, the "Current Pos." may update the "Extended Setting" when the user hits the "Next" button.

Figure 19:
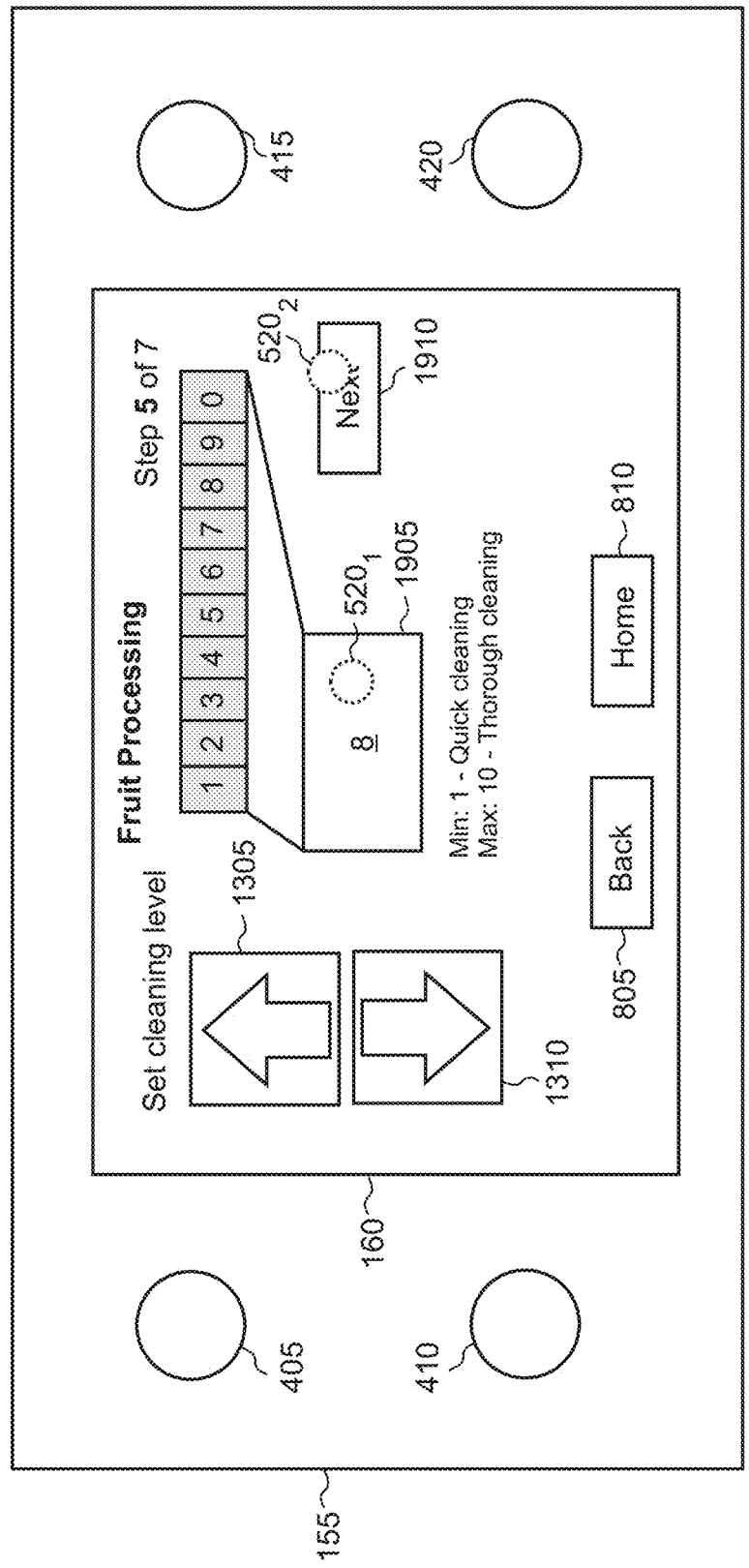
FIG. 19 shows an illustrative UI in which the user sets a cleaning level of the cleaning device.

FIG. 19 shows the subsequent UI 160 after the user selects 520 the next button 1805 in FIG. 18. FIG. 19 shows an illustrative UI 160 in which the control panel 155 queries the user to enter a cleaning level setting for the program. Upon selecting the input box 1905, the user may be presented with a set of numbers so the user can select the cleaning level from 1-10, one being the least intense cleaning and 10 being the most intense cleaning. Higher cleaning levels may result in increased rotational speed of a rotary head, increased dispensing output of steam, liquid, chemicals, or air, increased lateral movement speed, greater pressure exerted against the conveyor belt 130, adjust the number of zones of the conveyor belt as discussed in greater detail below, increase the duration of cleaning, or any combination thereof, among other changes that may increase the cleanliness of the conveyor belt. In contrast, a lower cleaning level may gradually decrease the rotational speed of the rotary head, decrease dispensing output of steam, liquid, chemicals, or air, decrease lateral movement speed, decrease pressure exerted against the conveyor belt 130, adjust the number of zones of the conveyor belt as discussed in greater detail below, decrease the duration of cleaning, or any combination thereof, among other changes that may decrease the cleanliness of the conveyor belt.

Figure 20:
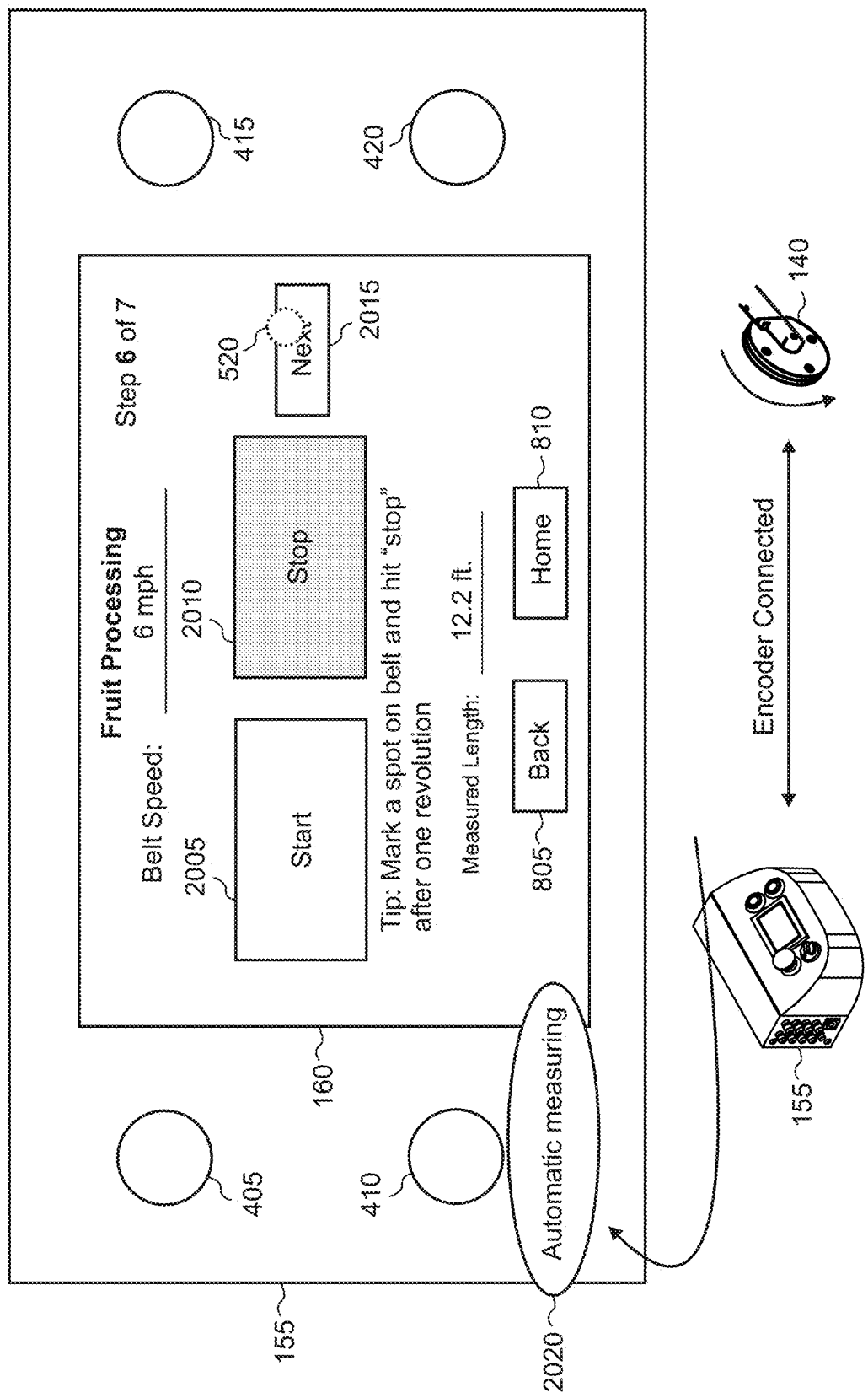
FIG. 20 shows an illustrative UI in which the control panel automatically measures a length of the conveyor belt in use.

FIG. 20 shows the subsequent UI 160 after the user selects 520 the next button 1910 in FIG. 19. FIG. 20 shows an illustrative representation in which the control panel 155 is configured to automatically measure 2020 the conveyor belt's length utilizing the sensor 140. The sensor 140 is a wheel sensor that measures and records the distance traveled on a surface, such as a conveyor belt's surface. The user presses the start button 2005 to initiate the conveyor belt's movement and initiate the wheel sensor's measuring. The user selects the stop button 2010 when one full conveyor belt revolution is complete. The user may identify one full revolution by marking a starting point on the conveyor belt and hitting the stop button when the marked spot comes back around at the same location. Alternatively, the cleaning device 105 may place an identifiable marker on the conveyor belt that can be traced and identified by a distinct sensor for recognizing a complete revolution. For example, a magnet detected by a Hall effect sensor, a painted color identified by a vision sensor, such as a camera, among other configurations. The UI shown in FIG. 20 is presented when the wheel sensor's encoder is connected to the control panel 155, such as via one of the control panel's cables 425 and plugs 130 (FIG. 4). In this regard, the automated setting may be the initial setting at which the control panel is set to when the wheel sensor is plugged in.

Figure 21:
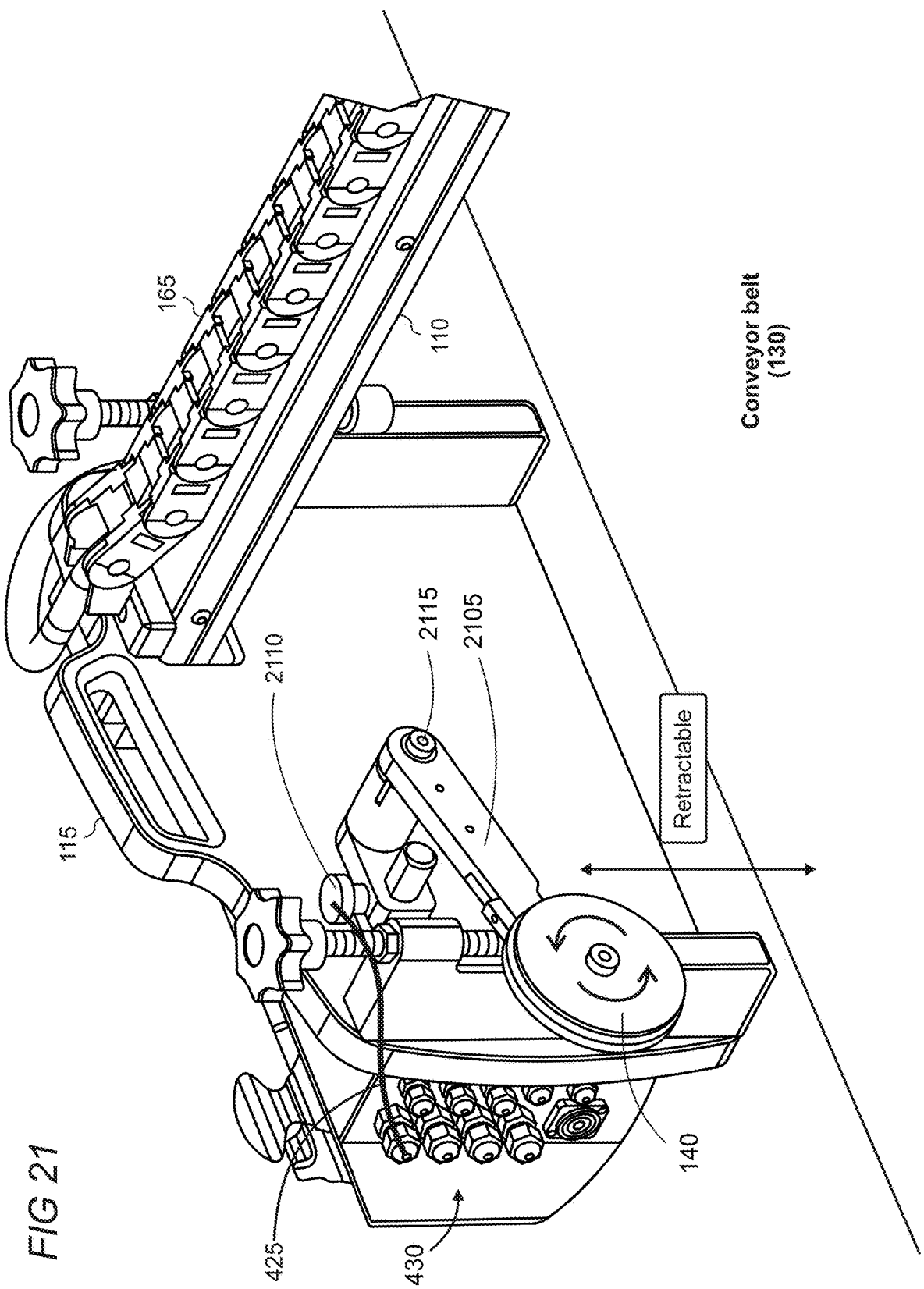
FIG. 21 shows an illustrative representation in which a speed sensor is retractably configured to measure the conveyor belt in use.

FIG. 21 shows an illustrative representation in which the wheel sensor 140 is retractable to an off-position and an on-position relative to the conveyor belt 130. The wheel sensor is connected to a swing arm 2105 attached to a pivot point attached via a bolt or screw 2115. The plug 2110 triggers the control panel to automatically utilize and measure the conveyor belt's length using the wheel sensor 140. The plug is connected to the control panel's input mechanisms to receive the data, thereby triggering the wheel sensor's operation or inoperation. The speed sensor may also independently measure the belt's speed.

The speed sensor 140 provides useful data for the control panel's control over the cleaning head 125 and the cleaning device's operations. For example, a detected fast speed may result in more (e.g., three, four, etc.) sections/zones with short lateral travel and faster swaths per zone. Conversely a detected slow belt speed can cause the cleaning head to move a single swath across the conveyor belt's end-to-end width. Furthermore, the speed detection can inform the cleaning head and steam generator to turn off should the belt stop moving to prevent damage to the belt, or to turn on when the belt starts moving. Discussion of conveyor belt zones is provided in more detail below.

Figure 22:
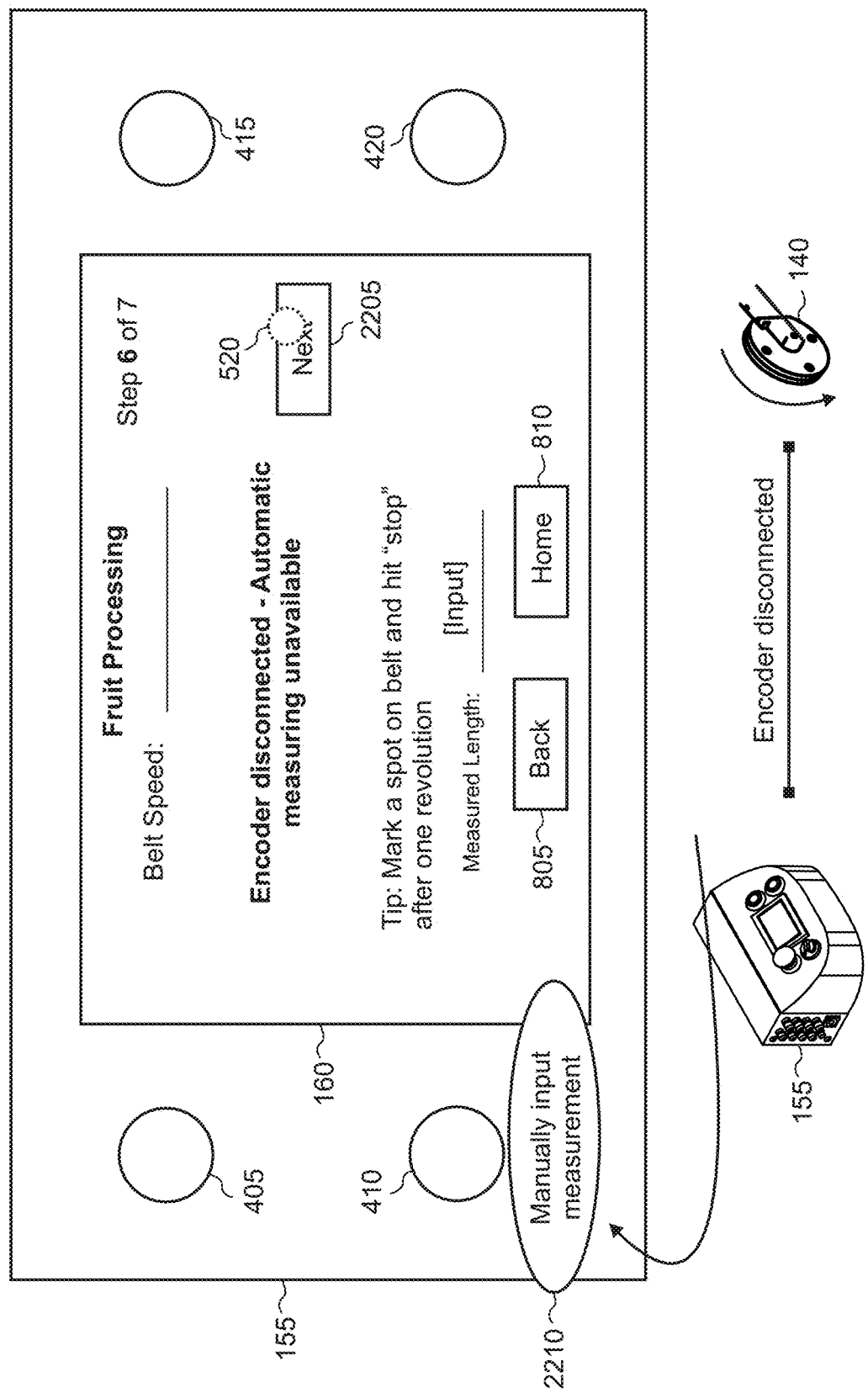
FIG. 22 shows an illustrative representation in which the conveyor belt's length is manually input at least when the speed sensor's encoder is disconnected.

FIG. 22 shows an illustrative UI 160 in which the user manually inputs the conveyor belt's length 2210 responsive to the encoder being disconnected. In such a scenario, the user may click the textbox for the measurement and input numerical values describing the conveyor belt's length. Such a setup may be desirable when the user knows the exact length and does not wish to rely on sensory measurements. Alternatively, the user may utilize the automated measurement to verify the conveyor belt's size.

Figure 23:
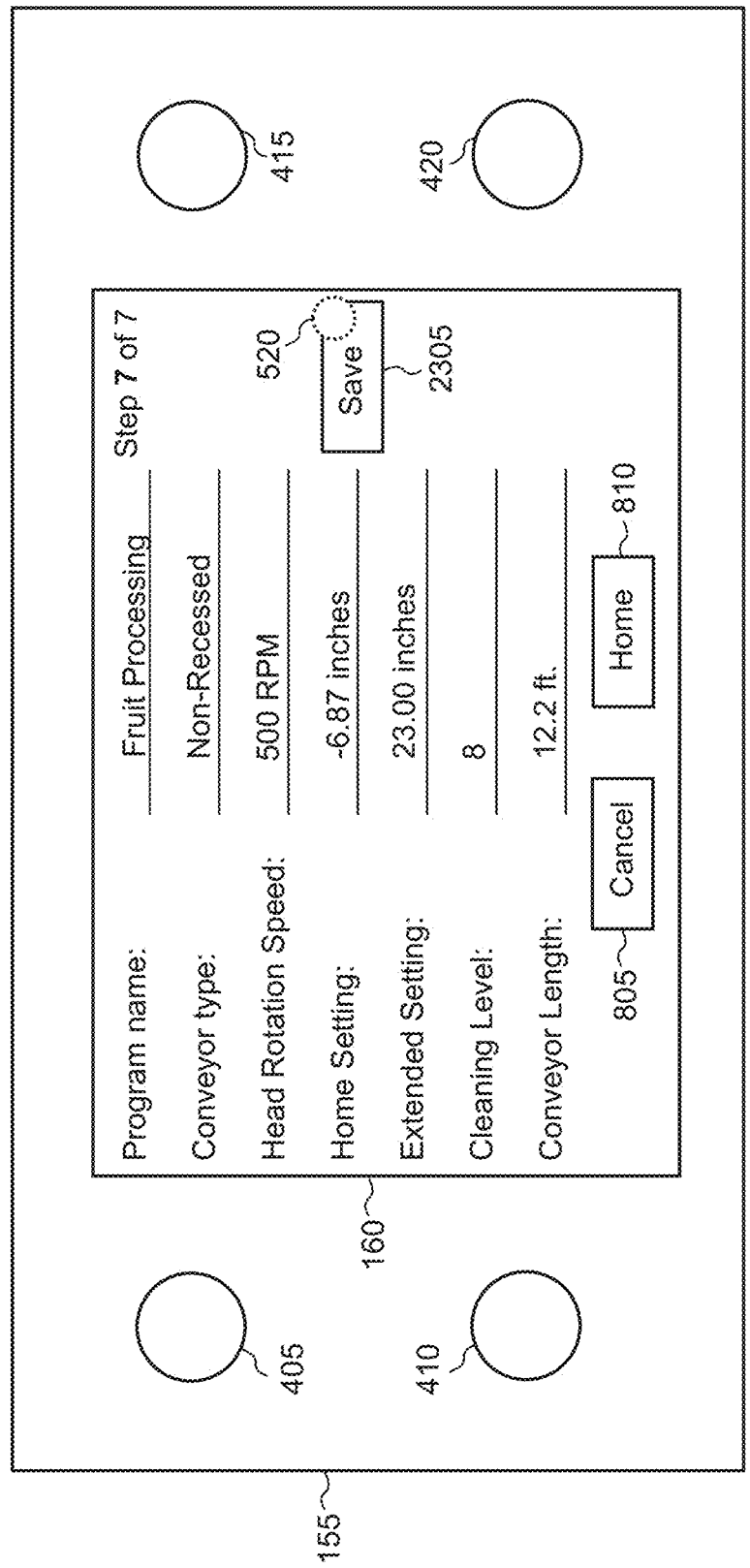
FIG. 23 shows an illustrative UI in which the new program's settings are presented for review to the user.

FIG. 23 shows the subsequent UI 160 after the user selects 520 the next button 2205 in FIG. 22. In this final step, seven, a summary of the new program's configurations is presented to the user on the UI. The head rotation speed may be dependent on the connected cleaning head 125 and, in some scenarios, may be higher, lower, or non-existent if the cleaning head does not rotate. For example, some cleaning heads may dispense liquid, air, or steam, and other cleaning heads may vacuum materials. After reviewing and approving the new program details, the user may select the save button 2305.

Figure 24:
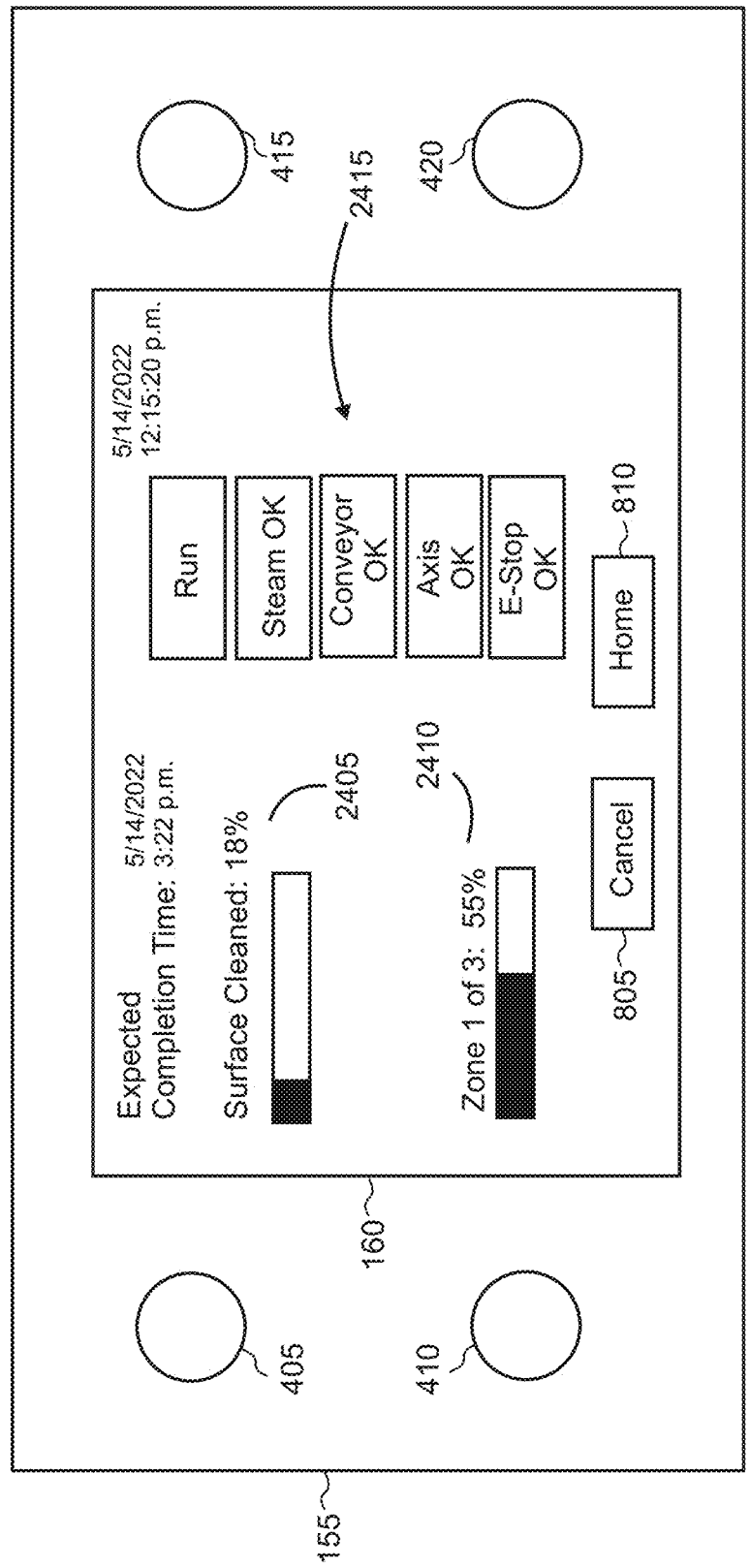
FIG. 24 shows an illustrative UI in which the cleaning device's status is presented to the user while the cleaning device is operating.

FIG. 24 shows an illustrative UI 160 after the user initiates the new program's operations. The new program may initiate after the user selects the save button 2305 (FIG. 3) or may initiate after the user selects the "Fruit Processing" program in the list/edit exiting programs button 515 (FIGS. 5 and 7). The user initiates the "Fruit Processing" program, and the control panels' UI displays the status screen shown in FIG. 24. The status screen shows various status information 2415 about the cleaning device, the completion status of the conveyor belt's surface 2405, and a zone completion status 2410 of the conveyor belt. The surface cleaned status 2405 informs the user the total percentage of the conveyor belt's surface was cleaned. The zone status 2410 informs the user of the completion status for identified zones. The status information 2415 informs the user that the machine is on and whether certain components are operating properly or malfunctioning, such as steam output, conveyor belt movement, axis levels and movements, and emergency stopping.

Figure 25:
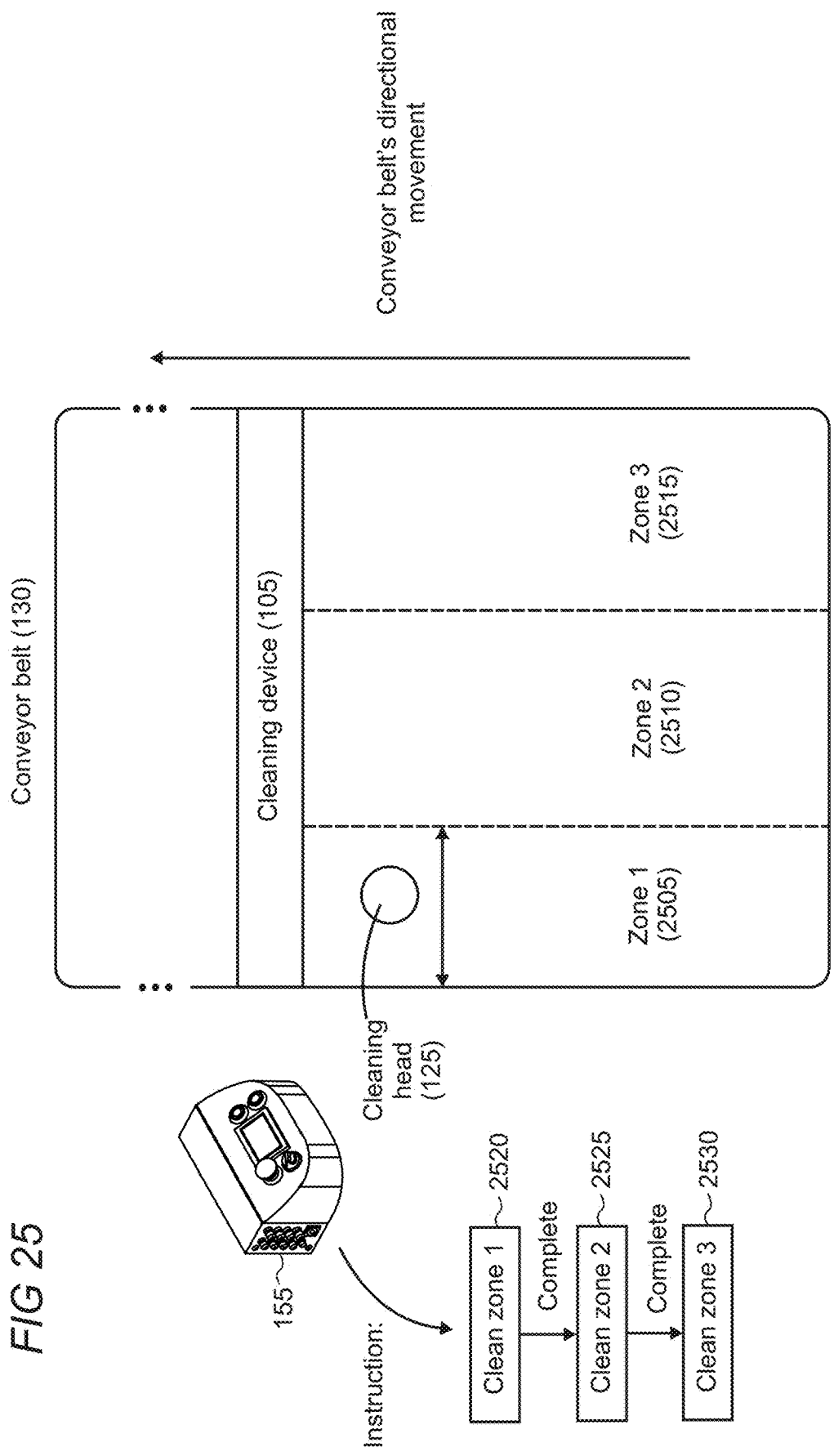
FIG. 25 shows an illustrative representation in which the control panel automatically designates zones on the conveyor belt, which affects the cleaning head's strategic cleaning pattern.

FIG. 25 shows an illustrative representation in which the control panel 155 separates the conveyor belt 130 into zones, specifically, zone 1 2505, zone 2 2510, and zone 3 2515. Given a typical conveyor belt's width and the cleaning head's surface area coverage, the cleaning head may miss portions of a conveyor belt's surface if it is cleaning from end to end. To safeguard against missed surface areas, the control panel separates a conveyor belt into zones that the cleaning head focuses on. Thus, for example, the cleaning head 125 may clean zone 1 fully before advancing to zones 2 or 3. The control panel 155 may instruct the cleaning head to clean zone 1 first, then clean zone 2 after zone 1 is complete, and finally clean zone 3 after zone 2 is complete, as representatively shown from processes 2520, 2525, and 2530. While three zones are shown in FIG. 25, any number of zones may be created, such as seven zones, ten zones, 11 zones, etc.

The control panel 155 may independently develop zones based on the conveyor belt's size (FIGS. 13-18), the desired cleaning level (FIG. 19), and the conveyor belt's detected speed, among other factors. For example, the control panel may increase the number of zones if the conveyor belt moves at high speeds or if the conveyor belt's detected width is beyond certain thresholds. The control panel may add a zone for every 10 inches, for example. Thus, if the near and extended positions of the cleaning head relative to the conveyor belt indicate a size of 28 inches, the control panel may create three distinct zones for the cleaning head. If the near and extended positions of the cleaning head relative to the conveyor belt are 42 inches, then the control panel may create five zones.

The user's selected cleaning level (FIG. 19) may also influence the number of created zones. For example, a quick cleaning job may reduce the number of zones to one or two, and a thorough cleaning job may cause the control panel 155 to increase the number of zones to nine or ten. Furthermore, the sensed dirtiness of the conveyor belt 130 may influence the number of zones. For example, if a vision sensor (e.g., camera, UV light, etc.) identifies that the conveyor belt requires significant cleaning, then the control panel may increase the number of zones to accommodate the necessary cleaning. Detected speed may also influence the number of zones. For example, the cleaning head may be able to cover an entire belt width if the speed is slow enough. Alternatively, higher speeds may require additional zones so the belt is adequately cleaned and spots are not missed.

Figure 26:
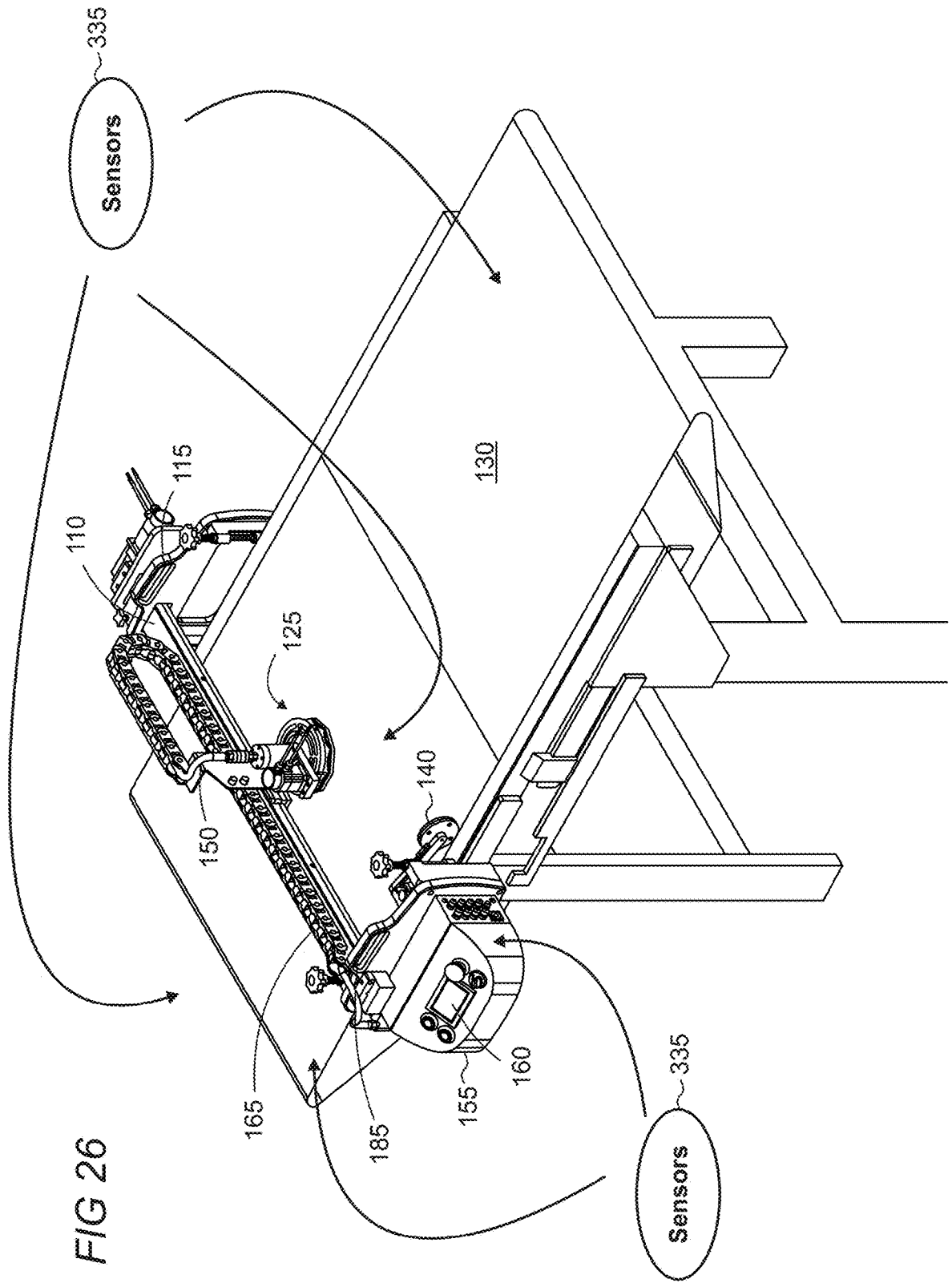
FIG. 26 shows an illustrative environment in which sensors are disposed in various places on and around the cleaning device and the conveyor belt.

FIG. 26 shows an illustrative environment in which sensors 335 are disposed throughout and around the cleaning device 105. Sensors may be placed in any number of locations to gather data on the conveyor belt 130, the cleaning head 125, and the cleaning device overall to effectuate dynamic adjustments to cleaning operations. In typical implementations, the sensors are deployed within operational proximity to the conveyor belt 130, cleaning device 105 and its associated components. Operational proximity may signify that the sensors are positioned, whether remotely or locally, to gather data over a given component that is then transmittable to the control panel 155. Sensors 335 may be attached to the conveyor belt 130, the frame 110, the cleaning head 125, the conveyor belt's body, the cleaning device's end frames 115, 185, and other locations associated with or within the vision or operation to the cleaning device 105. These sensors may gather data that is transmitted to the control panel's processors for processing and real-time actions.

FIG. 27 shows an illustrative non-exhaustive schema of sensors 335 that the present cleaning device system may utilize. Exemplary sensors 335 include vision sensors (light, color, shade, UV (ultraviolet)) 2710, infrared or thermal sensors 2715, humidity sensors 2720 (e.g., for belt, steam, ambient, or debris), measurement sensors (conveyor belt speed or length, debris, cleanliness testing, sonic, laser, quantity) 2725, proximity sensors 2730 (e.g., for cleaning head collision avoidance), pressure sensors 2735 (e.g., monitor vacuum, monitor feed lines), and other sensors 2740. Sensors gather relevant information about the conveyor belt's cleanliness status to optimize cleaning efficiency and automate adjustments. For example, the ability to detect that areas of a conveyor belt are still dirty enables the cleaning device 105 to focus on such areas without manual user input. Such configurations save system resources by tailoring cleaning jobs. Likewise, the system can automatically cease cleaning if the gathered data indicates that the conveyor belt 130 is sufficiently cleaned, thereby enabling users the benefit of switching the cleaning device on and not worrying about checking in.

Figure 28A:
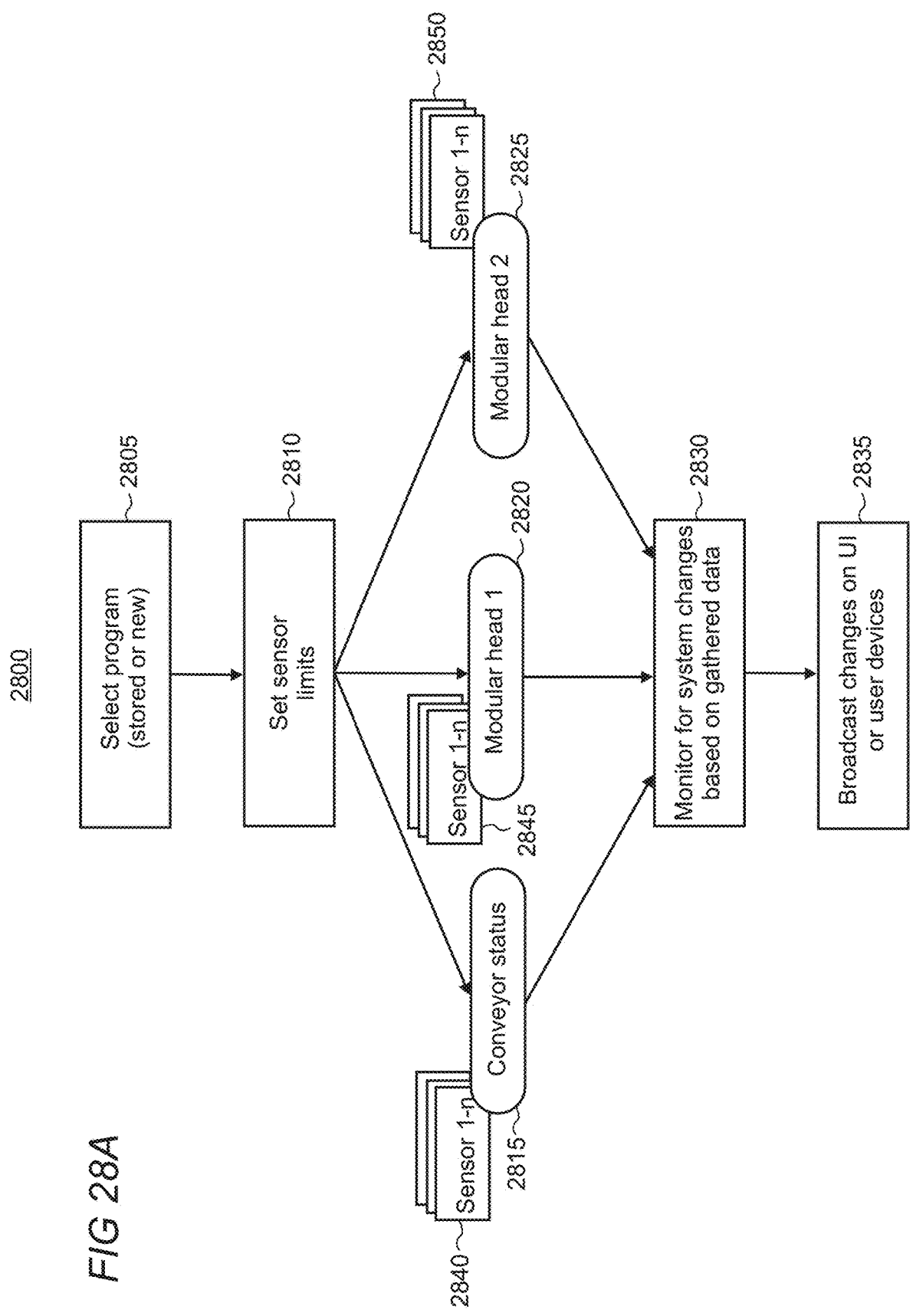
FIG. 28A shows an illustrative process for configuring sensors and using the data gathered by the sensors at the control panel.

FIG. 28A shows an illustrative process 2800 in which sensors 335 are utilized by the cleaning device 105 to adjust system or component operational changes. In step 2805, the user selects a new or stored program in the control panel 155. In step 2810, the user sets sensor limits for various sensors. The sensor limits may be applied to specific components associated with the cleaning device, such as conveyor status 2815, modular cleaning head 1 2820, and modular cleaning head 2 2825. The modular cleaning heads 1 and 2 may be, for example, a rotary cleaning head and a vacuum, respectively. The data gathered by the sensors may cause the control panel to function differently depending on the modular cleaning head 125 attached and in use. For example, a chemical-dispensing head may be directed to spray at a sticky substance on a conveyor belt, whereas a vacuum cleaning head may be directed to ignore such a sticky substance.

Conversely, a vacuum may be directed to vacuum dry debris from a conveyor belt 130 that the chemical-dispensing head may ignore or otherwise treat differently. In this regard, sets of sensors 2840, 2845, 2850 may be more or less relevant to specific cleaning device components (such as cleaning heads 125) depending on the component and the sensors 335. Sensors that detect conveyor belt status may be irrelevant to certain cleaning heads, and sensors that are particularly relevant to specific or all cleaning heads may be irrelevant to the conveyor belt status. Such limits and ranges may be set into a given program or part of the control panel's hardcoded and set rules for all cleaning devices.

Limits and ranges that can be configured for given sensors 335 can vary. Exemplary limits and ranges can include between nanometers for UV (ultraviolet) light (e.g., 250-400 nm), distance in centimeters, inches, etc. for proximity sensors to avoid collisions with the cleaning head, certain wavelengths in micrometers (μm) for infrared sensors, identifying certain colors that are different from the conveyor belt's color from cameras (e.g., red particulates identified on a black belt), setting size limits (e.g., one or two inches high) for identified or objects on the conveyor belt identified by cameras, among other units and limits.

In step 2830, the control panel 155 monitors for system changes based on gathered data received from one or more sensors 335. For example, the control panel may monitor for irregularly dirty parts on the conveyor belt 130 and thereby instruct the cleaning head 125 to attack the location. Irregular dirty parts may be, for example, when a sensor identifies an object according to the set ranges/limits for a given sensor, as discussed above. In step 2835, the control panel 155 broadcasts the cleaning device's changes on the UI 160 and/or to user devices 385 (FIG. 3) using its network interface. For example, the control panel may determine that the sensors have detected particulates on the conveyor belt 130, which causes the cleaning device 105 to operate longer than expected.

FIG. 28B shows an illustrative diagram of sensory considerations by the control panel 155 responsive to received data from the sensors 335. The gathered data by specific sensors, as represented by numeral 2855, causes the control panel to perform various functions 2850, 2860. The specific piece of gathered data for a specifically monitored component may cause the control panel to adjust the cleaning device's operations differently. For example, the control panel may increase the cleaning level if the conveyor belt cleaning status or quality is low and decrease the cleaning level if the conveyor belt cleaning status or quality is high. Increasing or decreasing the cleaning level may mean adjusting the number of zones, pressure, or dispensing output, among other changes.

The control panel 155 may consider multiple detected sensory categories when determining a system or component adjustment. For example, the conveyor belt's percentage cleaned status may be considered with the conveyor belt's speed. If the conveyor belt speed is high and the percentage cleaned status is high, then the system may reduce the conveyor belt's speed but not necessarily reduce the cleaning head's pressure level. This way, the cleaning head can definitively clean the remainder of the belt and then stop operations.

Figure 29:
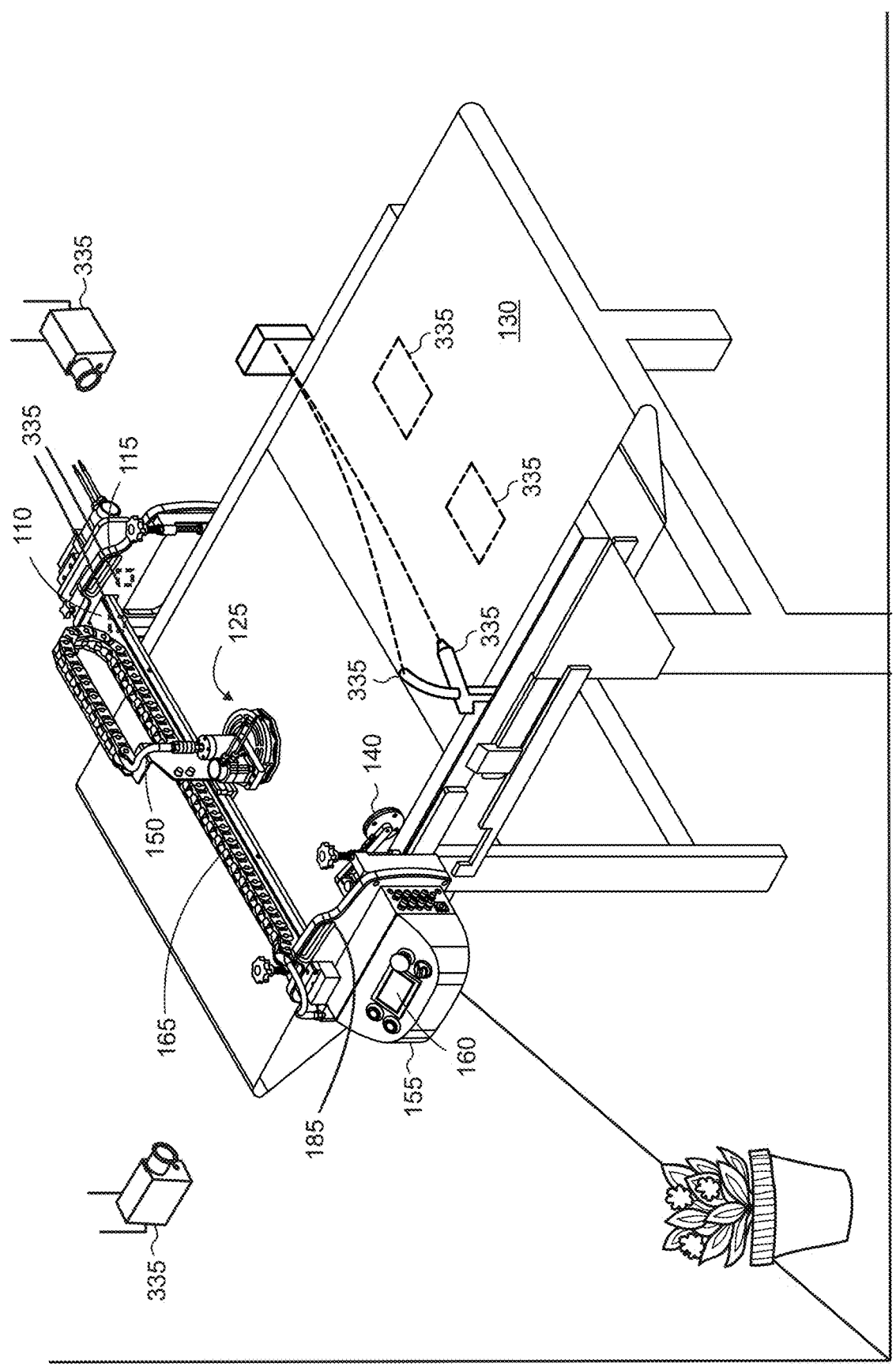
FIG. 29 shows an illustrative environment of sensors utilized with the cleaning device and conveyor belt setup.

FIG. 29 shows an illustrative environment in which sensors 335 are disposed throughout and around the cleaning device 105. Exemplary sensors include visual sensors, such as cameras, or any of the sensors listed in FIG. 27. Sensors 335 (occasionally shown in broken lines) represent exemplary locations of the sensors positioning, such as a distance from the cleaning device 105 and conveyor belt 130, attached to the conveyor belt (such as an underside thereof), affixed to portions of the conveyor belt or cleaning device, such as on the width-sides of the conveyor belt's body, attached to the cleaning device's frame 110 or end frames 115, among other locations. The horizontal lines represent the sensor 335 monitoring and capturing data about the conveyor belt, such as debris locations, chemical or particulate detection, or other data picked up depending on the sensor used (e.g., humidity for a humidity sensor, location, and presence of matter from a vision sensor, etc.).

Figure 30:
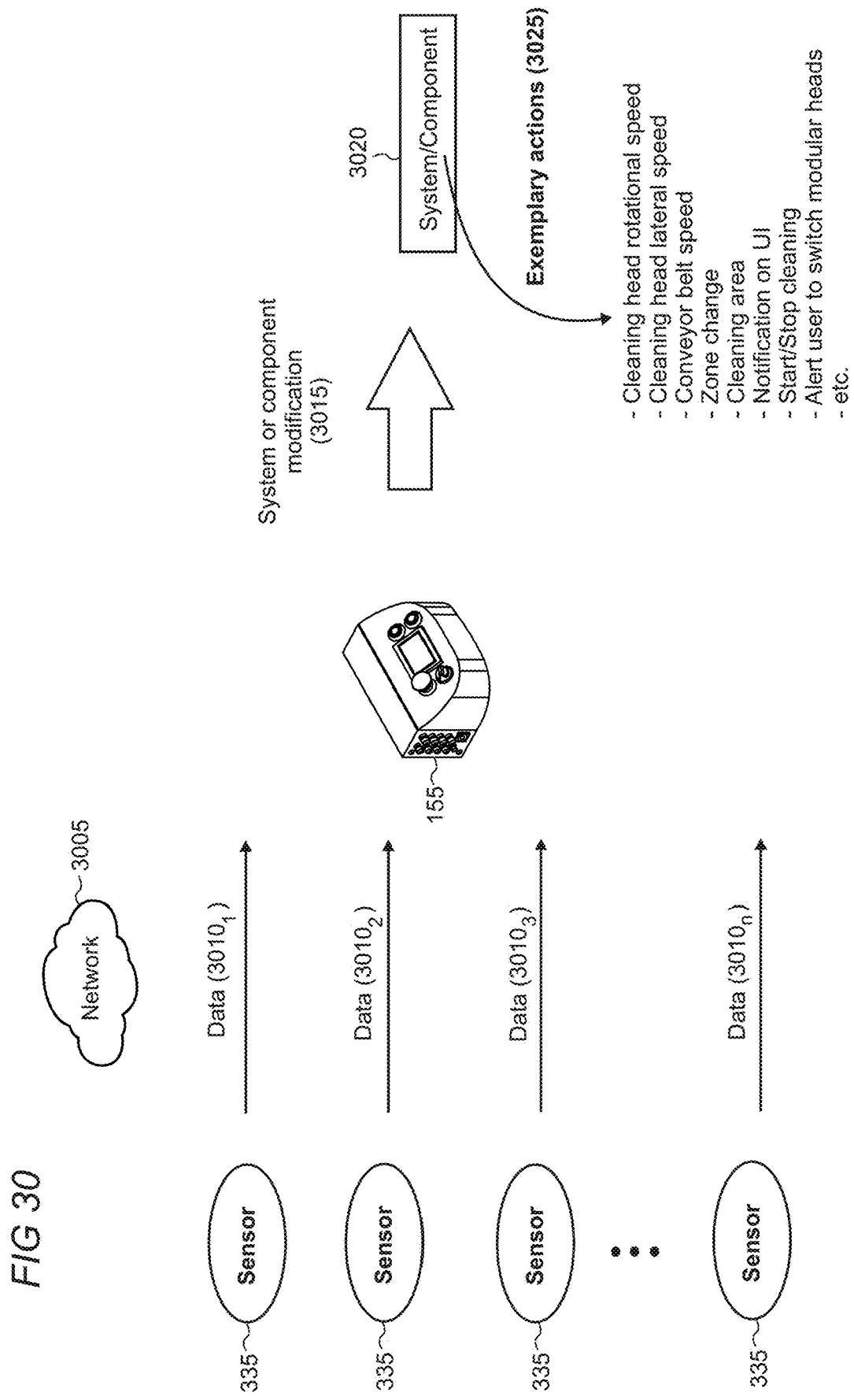
FIG. 30 shows an illustrative environment of system or component modifications by the control panel based on received sensor data.

FIG. 30 shows an illustrative environment in which data 3010 gathered by sensors 335 are transmitted over a network 3005 to the control panel 155 for processing. The deployed sensors 335 may transmit gathered data to the control panel over one or more types of connections. For example, the sensors may have a wired connection (e.g., copper wire, optical fiber, etc.) to the control panel (FIG. 4), or may have a wireless network interface card (NIC) that can transmit data to the control panel over, for example, Bluetooth®, near field communication (NFC), Wi-Fi, etc. The network may be a personal area network, local area network, wide area network, or the Internet.

While the control panel 155 is shown as receiving the data, other computing devices may receive and process the data, such as the remote service 350 or user computing device 385. Upon receiving the data, the control panel or other computing device may make a responsive system or component modification 3015 and transmit the modification to the relevant system/component 3020.

Exemplary actions 3025 performed by the cleaning device 105 based on the system or component modification can include changing the cleaning head's rotational or lateral speed, the conveyor belt's speed, zone changes (e.g., number or size), cleaning area to focus on or ignore, notification on the UI 160 or to a user computing device 385, start/stop cleaning, alert the user to switch modular cleaning heads, etc. While a set of actions is shown in FIG. 30, any number of actions may be determined and executed responsive to processing the gathered data. Multiple data points from various sensors can be simultaneously or individually processed by the control panel or other computing device to determine an instructional change to the cleaning device 105, such as the cleaning head 125.

The control panel 150 may control various components and actions performed by the cleaning head 125 and other components in operational connectivity to the control panel. For example, the control panel control when the cleaning head is switched on, what operations to perform, where to clean, at what pace to move, etc. The cleaning head may have its own motorized capabilities, but the control panel directs the cleaning head how to move. For example, the control panel controls the various actuators, such as the x-axis actuator, in controlling the cleaning head's horizontal movements relative to the conveyor belt 130. The control panel controls the various positions and customized actions of the cleaning head and other components as discussed in FIGS. 12-25. For example, the control panel can control the speed and switching on/off of the conveyor belt, directional movement of the cleaning head by, for example, controlling the actuators connected to the cleaning head, retractability, positioning, and operation of the wheel sensor 140, cleaning level (e.g., in terms of intensity or quality of cleaning), among other features. By controlling the cleaning head's positioning and lateral and other movements, the control panel can control the degree of cleaning and how the cleaning head cleans the conveyor belt.

The control panel's level of control and instructions may vary depending on the attached cleaning head 125 as well, For example, the control panel can control the rate of speed for a rotary cleaning head, and may control how much, when, and the level of pressure of dispensing cleaning heads, including steam, chemicals, water, air, etc. Dispensing cleaning heads may be configured with a motor that causes dispensing of an article, in which the control panel can control such actions by controlling the actuation of the motor at the cleaning head.

Figure 31:
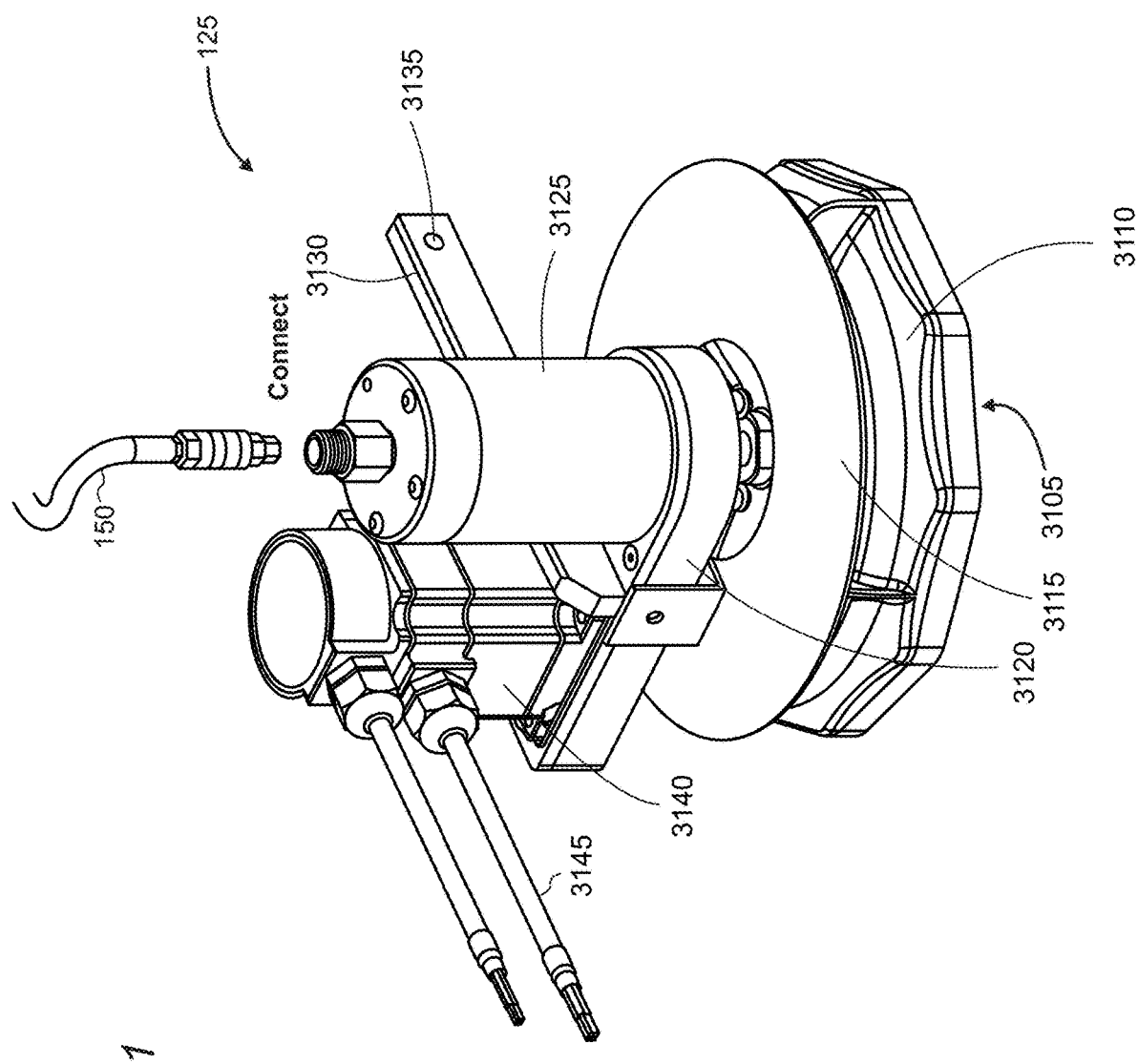
FIG. 31 shows an illustrative rotary modular cleaning head that may be used with the cleaning device and conveyor belt setup.

FIG. 31 shows an illustrative representation of the cleaning head 125. In this example, the cleaning head is a rotary cleaning head 3105 that performs a rotational cleaning action against the conveyor belt 130. A rotary disc assembly 3110 is driven by mechanical means by a motor 3140. A plurality of motor control wires 3145, by an electronic connection with the rotary disc assembly 3110, powers and adjusts the speed of the rotary disc assembly. In this regard, the cleaning head is configured with its own motorized system, which causes rotation of the rotary disc.

The rotary cleaning head 3105 attaches to the wire carriage 165 by a connecting arm 3130, which functions as a connecting portion that is directly or indirectly connected to the cleaning device 105. A screw, bolt, or other fastening mechanisms may attach the connecting arm's fastening opening 3135 to the cleaning device's connecting frame to enable control over the cleaning head. For example, a connecting frame is directly or indirectly attached to the cleaning device's frame 110. Upon the connecting arm attaching to the cleaning device's connecting frame, actuator movement translates to the cleaning head. Although a connecting arm is discussed herein, other methods of connecting cleaning heads to the cleaning device 105 are possible, such as tab and notch mechanisms, press-fit mechanisms, male connector to female receptacle, magnets, or any combination thereof.

A rotary union 3125 also affixes the cleaning head 125 to the wire carriage 165. Specifically, the tube 150 secures to the threaded portion of the rotary union, which enables fluid, air, etc., to be transferred to the cleaning head for expulsion. Electrical and data may also be transferred from the tube 150 (or cable), which is then connected to the threaded portion of the rotary union 3125. A drive train cover 3120 and air guide finger guard 3115, or deflector plate, prevent both particulate matter from entering the cleaning head 125 and accidental injury by an operator.

The finger guard 3115, which also functions as a deflector plate, is positioned above the spinning rotary cleaning head 3105 to mitigate potential safety hazards associated with the spinning head. Configurations in which the space between the solid finger guard 3115 (not including the center air inlet) and the spinning rotary cleaning head 125 is minimized can increase the amount of lateral airflow generated by the spinning fan blades on an underside of the disc assembly 3110. This lateral airflow can provide an air shield to minimize debris from the cleaned surface traveling upward and settling on the cleaning head. In this regard, the finger guard 95 may affect airflow at certain rotational speeds, thereby functioning as a deflector plate as well.

Figure 32:
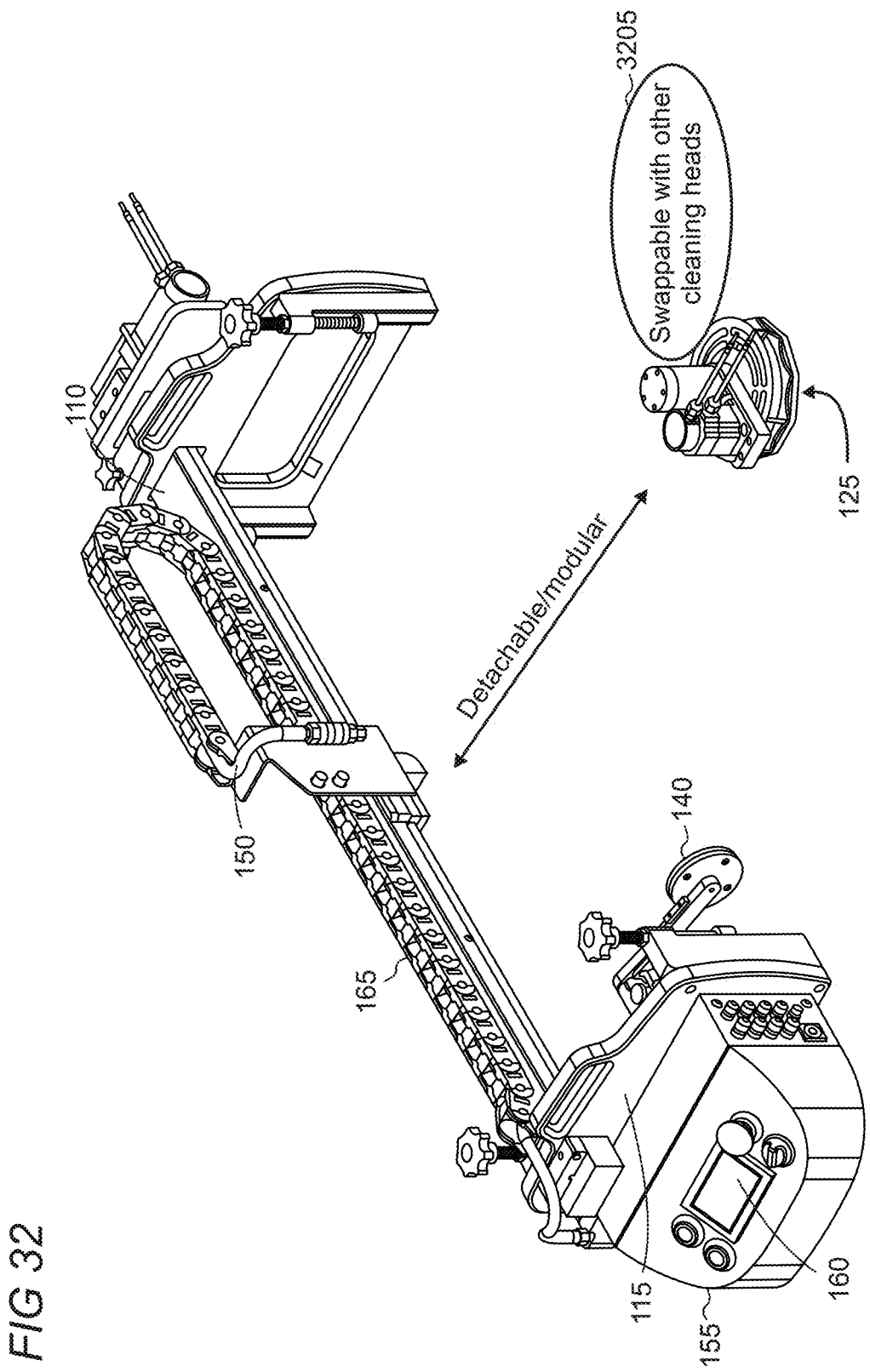
FIG. 32 shows the detachability and swappability of the rotary modular cleaning head with an alternate modular cleaning head configured with different cleaning capabilities.

FIG. 32 shows an illustrative representation in which the cleaning head 125 is detachable from the cleaning device's body. Thus, the detachability of the cleaning head creates a modular system such that various cleaning heads and techniques can be used with a single cleaning device 105, control panel 155, and system. The cleaning head is swappable with other cleaning heads, as representatively shown by numeral 3205.

Figure 33:
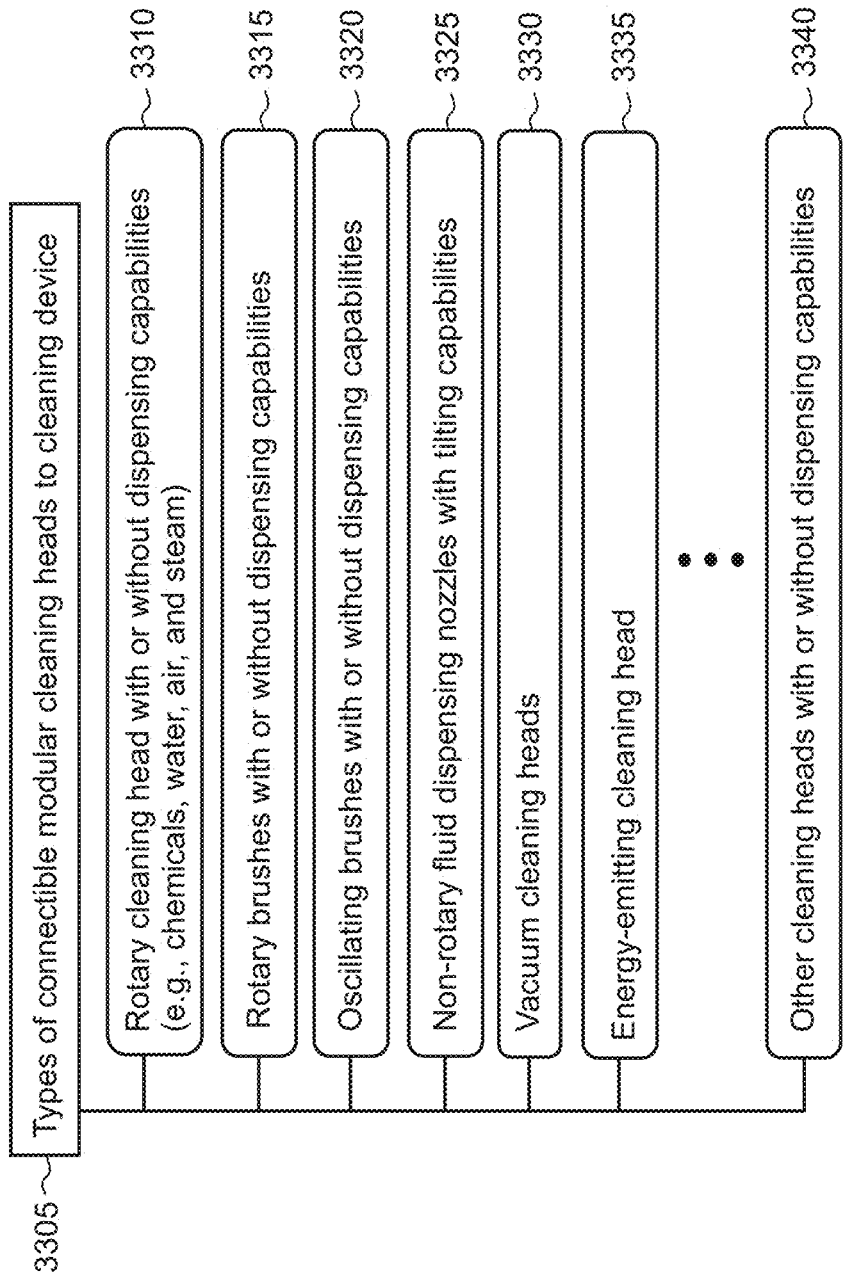
FIG. 33 shows an illustrative schema of modular cleaning heads that may be attached to and utilized by the cleaning device.
Figure 34:
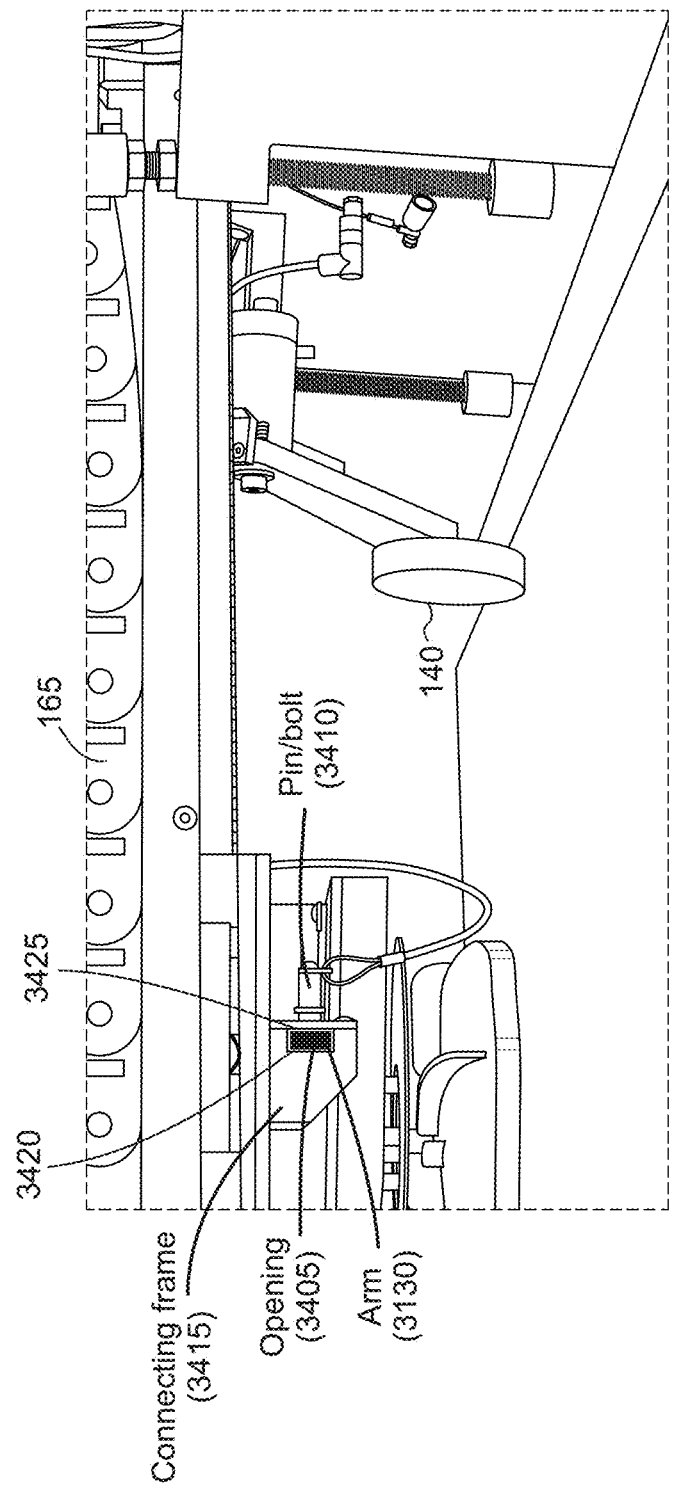
FIG. 34 shows an illustrative representation of a cleaning head attached to the cleaning device's frame.
Figure 35:
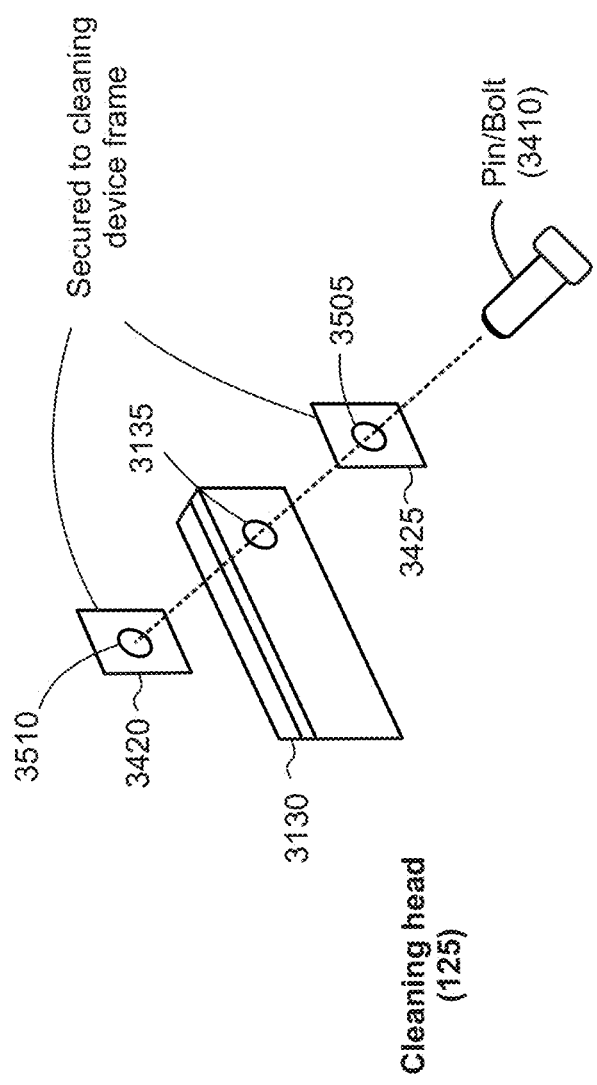
FIG. 35 shows an illustrative representation of a pin or bolt securing the connected cleaning head to the cleaning device's frame.
Figure 36:
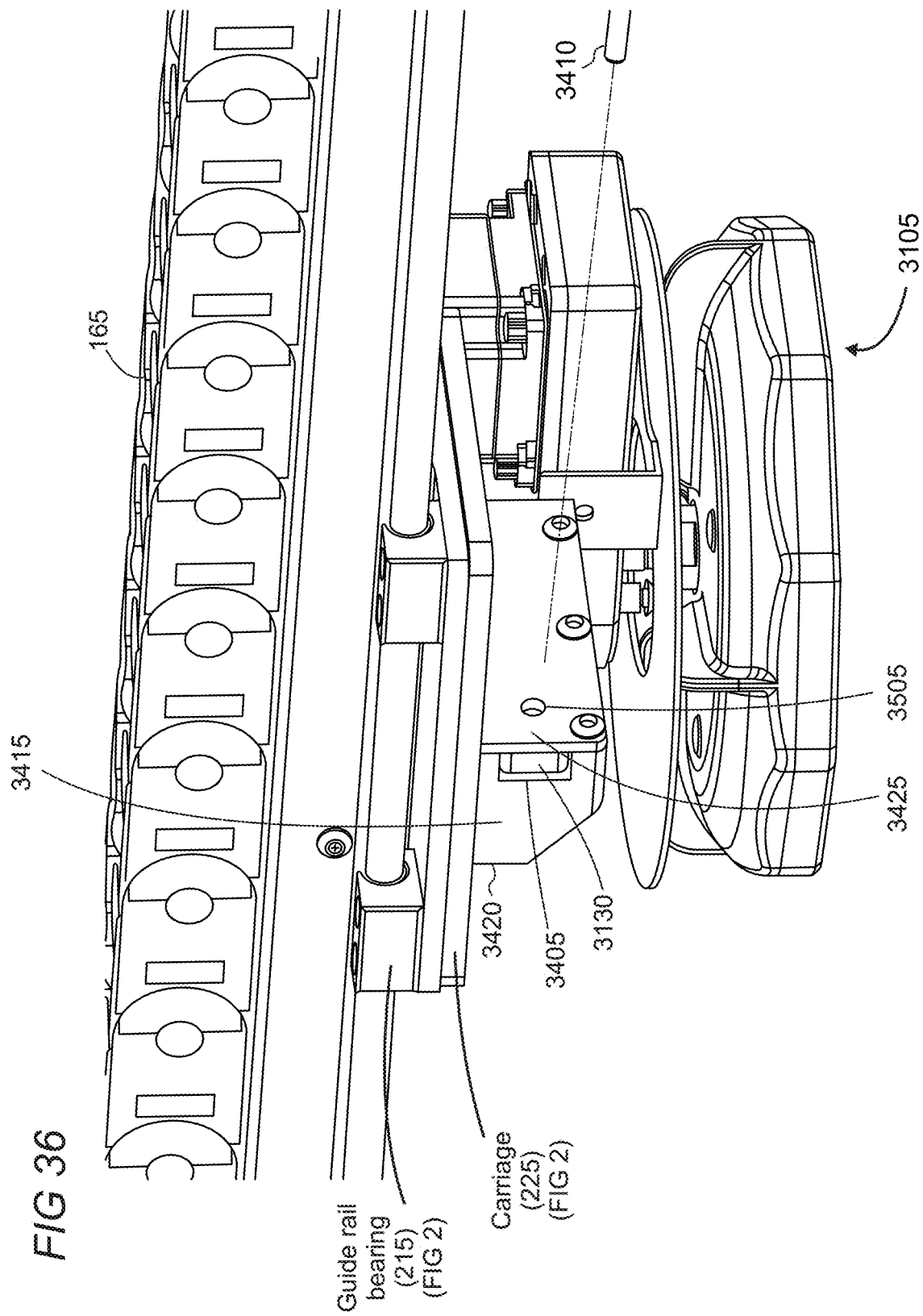
FIGS. 36 and 37 show illustrative representations of the pin or bolt aligned with and then secured to the frame's holes to connect the cleaning head to the frame, respectively.
Figure 37:
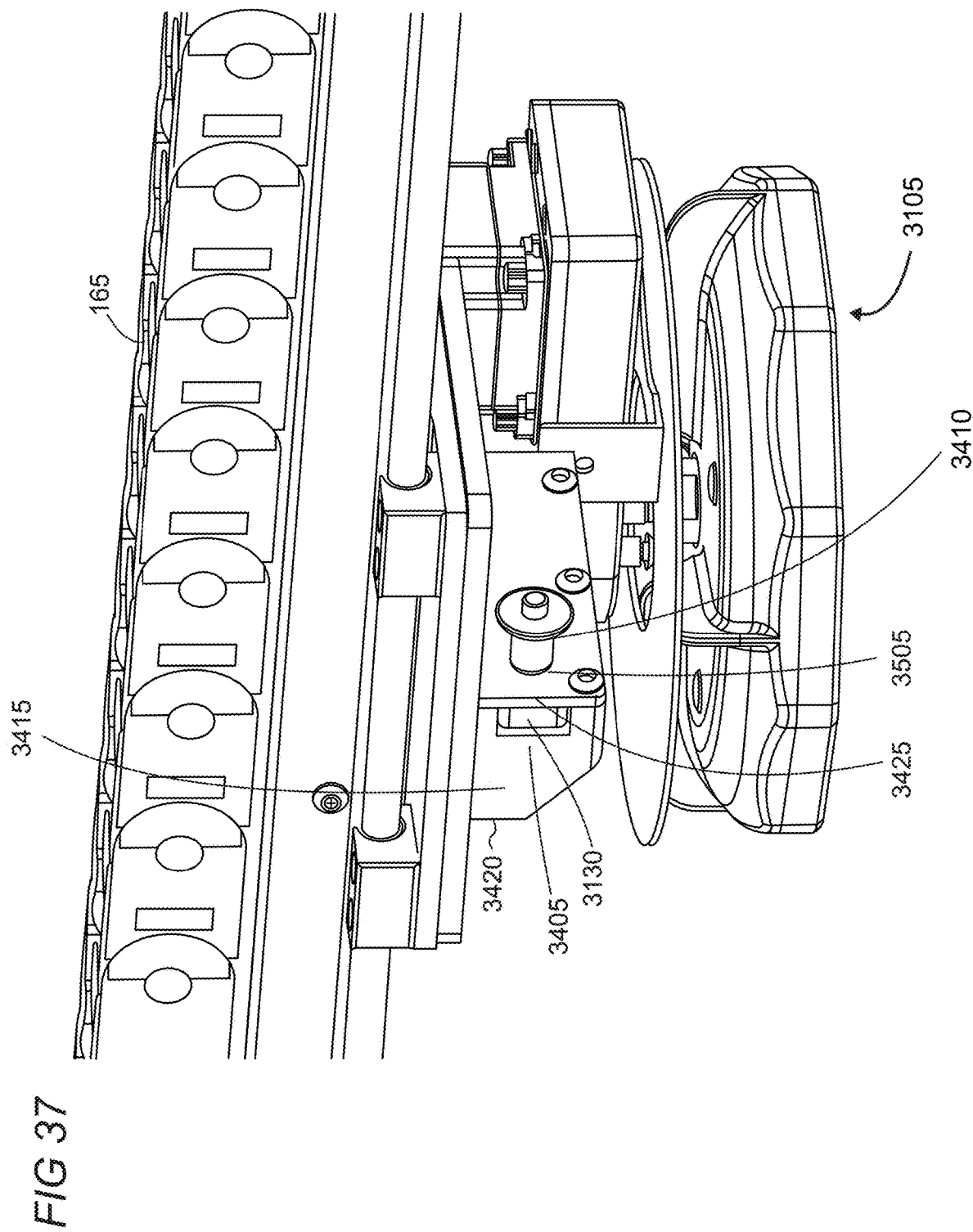

FIG. 33 shows an illustrative schema of types of connectible modular cleaning heads to the cleaning device 3305. Exemplary and non-exhaustive cleaning heads include a rotary cleaning head with or without dispensing capabilities (e.g., chemicals, water, air, and steam) 3310, rotary brushes with or without dispensing capabilities 3315, oscillating brushes with or without dispensing capabilities 3320, non-rotary fluid dispensing nozzles with tilting capabilities 3325, vacuum-cleaning heads 3330, energy-emitting cleaning heads 3335, and other cleaning heads with or without dispensing capabilities 3340.

FIGS. 34-37 show illustrative representations in which a cleaning head 125 can be connected to and disconnected from the cleaning device 105. Although a specific cleaning head is shown in the drawings, the term 'cleaning head' references any type of cleaning head available for the system, such as those listed in FIG. 33. A pin/bolt 3410 attaches through holes on the cleaning device's connecting frame 3415 and the cleaning head's connecting arm 3130. The connecting frame includes an opening 3405 that receives the arm 3130, and holes on the arm and connecting frame align to receive the pin. For example, the connecting frame 3415 includes a first portion 3420 that has a hole 3510 and a second portion 3425 that has a hole 3505. The pin may be locked in place via a tab and notch mechanism, friction fit, or other fastening mechanisms that secure the pin in place. Removing the pin releases the cleaning head 125 from the cleaning device's frame and enables a user to swap an alternate cleaning head (FIG. 33). Each cleaning head may be configured with an arm and a hole, as shown and discussed with respect to FIGS. 31-37. The hose 150 (or cables) may be detached from the cleaning head as well.

Figure 38:
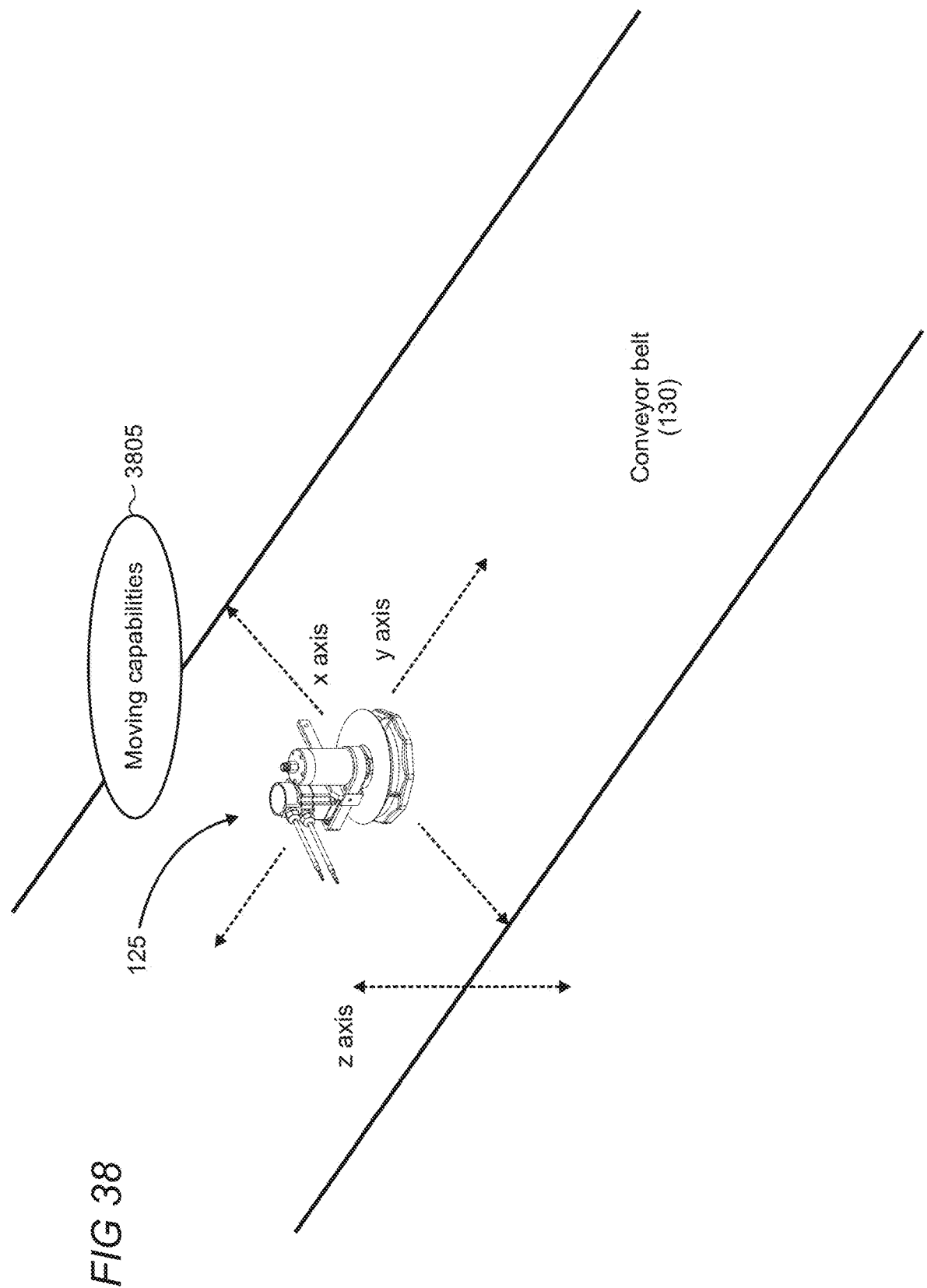
FIG. 38 shows an illustrative environment of the cleaning head's moving capabilities relative to the conveyor belt.
Figure 39:
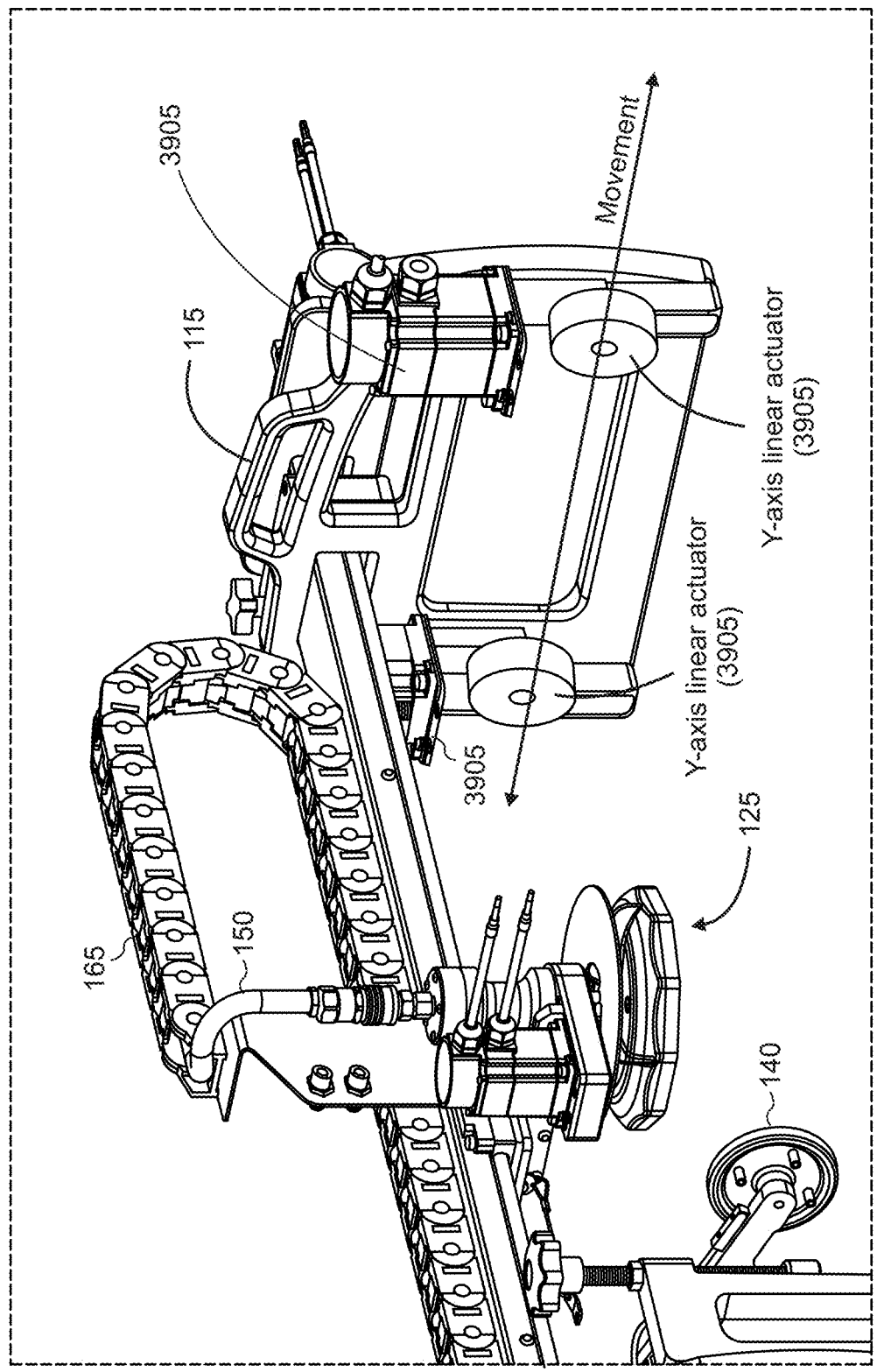
FIG. 39 shows an illustrative representation of the cleaning device's y-axis actuator, which enables the cleaning head's y-axis movements.

FIG. 38 shows an illustrative environment in which the cleaning head 125 is configured with a variety of moving capabilities 3805. For example, the cleaning head may move according to an x-axis, y-axis, and z-axis fashion to provide greater and enhanced cleaning capabilities. FIG. 39 shows an illustrative representation in which the y-axis linear actuators 3905 are implemented on an inside portion of the end frame 115. Additional y-axis linear actuators may be positioned on an opposite side on an inside portion of the end frame 185. The y-axis linear actuator shifts or moves the entire cleaning device 105 parallel to the conveyor belt's motion, which translates into like movements of the cleaning head 125 since the cleaning head is attached to the cleaning device 105. Thus, the linear actuator causes portions of the cleaning device 105 to move about the components that are permanently attached to the conveyor belt's body/frame. Thus, the y-axis actuators cause the cleaning device to shift relative to the conveyor belt.

Various types of linear actuators may be utilized to move the cleaning device 105, such as lead screw actuators or ball screw actuators. An electric motor 3905 is generally connected to the linear actuator by a flexible coupling or a belt, enabling the motor to be mounted either axially or perpendicular to the linear actuator. A variety of motor sizes can be mounted to these actuators depending on requirements and the specific implementation. The linear actuator has linear bearings that support the moving payload, as well as rotary bearings that support either the lead screw, ball screw, or belt pulleys. A shaft or belt may be used to keep the multiple actuators in sync with each other.

A lead screw actuator uses a plain screw/nut arrangement to translate the rotary motion from a motor to linear motion. A manually driven screw or an AC (alternating current) induction motor are some methods to supply the rotary motion. The actuator's ability to back drive is reduced over ball screw actuators due to the low efficiency of the screw/nut. In some applications, this can be an advantage as it helps to keep the payload stationary while not in motion.

A ball screw actuator uses a high-precision nut with recirculating ball bearings that rotate around a ground screw thread. The advantages of this system are high precision and low friction, giving an efficient method of converting rotary motion to linear motion. Stepper or servo motors may be used to supply the rotary motion.

Belt actuators may also work in which a belt is carried between two pulleys and attached to the moving carriage, then, as the belt rotates, the carriage is pulled along the actuator. One of the pulleys is driven by a motor which is generally mounted perpendicular to the actuator and coupled using a flexible coupling. Belt-driven linear actuators may be effective for long travel and high linear speed applications. Any one of these actuator configurations and mechanisms is usable with the present system.

FIG. 40 shows an illustrative representation in which the cleaning head 125 is tiltable about an a-axis 4015. The cleaning head is attached to the cleaning device 105 at a pivot point 4005, about which the cleaning head pivots. The cleaning head may be secured to the pivot point via a pin or bolt, and an actuator causes the pivoting movement, which is translated to the cleaning head. Such a-axis tilt can provide greater angles for cleaning conveyor belts 130.

Figure 41:
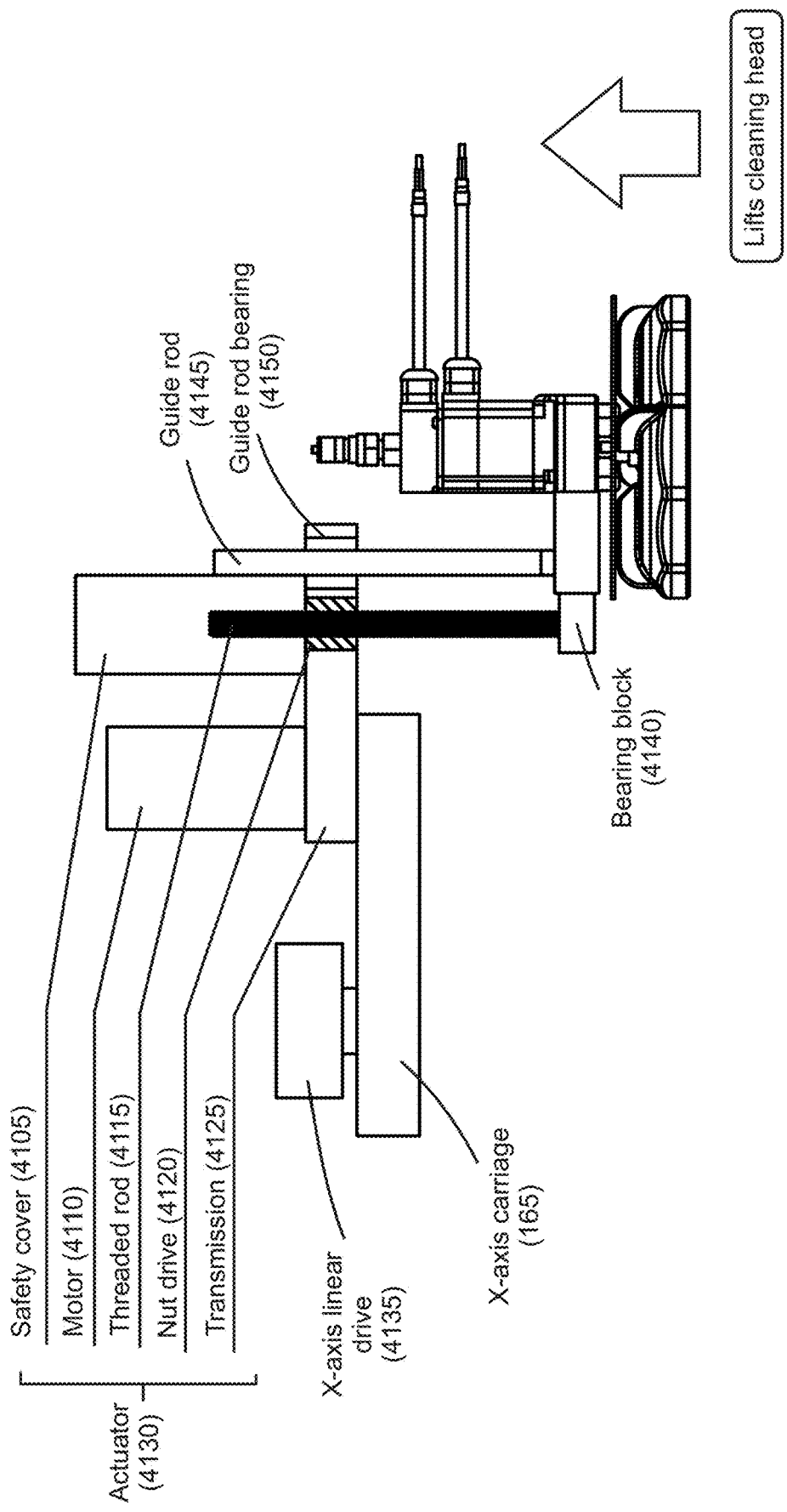
FIG. 41 shows an illustrative representation of the cleaning head's z-axis actuator components.
Figure 42:
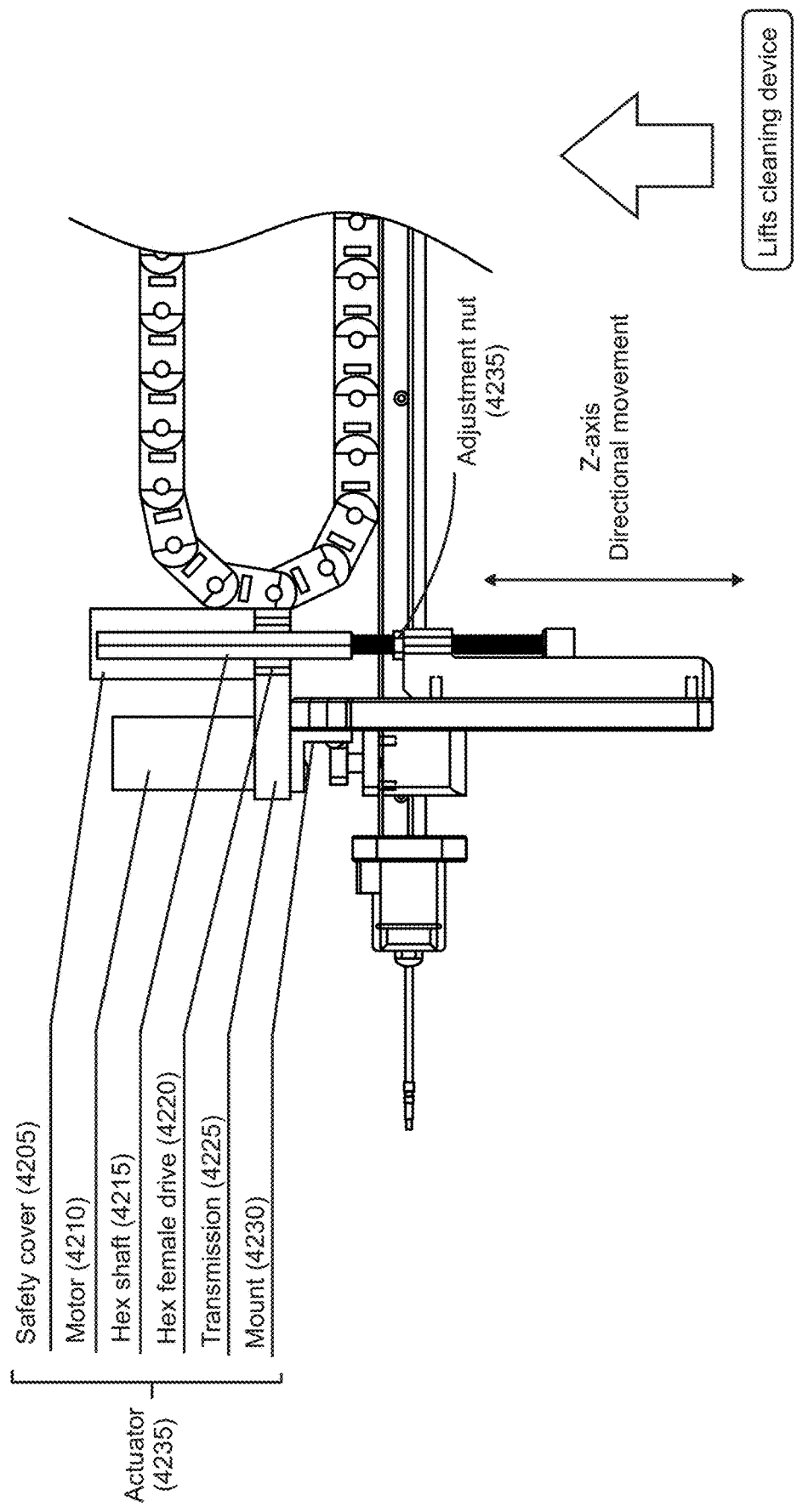
FIG. 42 shows an illustrative representation of the cleaning device's z-axis actuator components.

FIGS. 41 and 42 show illustrative diagrams of the z-axis actuator's configuration on the cleaning device 105 or cleaning head 125. In FIG. 41, the z-axis actuator lifts the cleaning head. The z-axis actuator is attached to the cleaning head itself to enable independent lifting of the cleaning head. The actuator 4130 includes a safety cover 4105, motor 4110, threaded rod 4115, nut drive 4120, and transmission 4125, which operate with the guide rod 4145 and guide rod bearing 4150. The z-axis actuator may operate similarly to the actuators discussed above with respect to the y-axis actuator. The z-axis linear actuators 4130 may leverage against the conveyor belt's body to lift the cleaning device 105. Lifting the end frame 115, 185 causes the remainder of the cleaning device to lift, such as the frame 110, wire carriage 165, cleaning head 125, etc.

In FIG. 42, the z-axis linear actuator 4235 lifts the entire frame 110 and other components of the cleaning device 105. In this example, the z-axis actuators may be positioned on each end frame 185, 115 for evenly lifting the cleaning device. Each actuator may include a safety cover 4205, motor 4210, hex shaft 4215, hex female drive 4220, transmission 4225, mount 4230, and adjustment nut 4235. The actuator rotates the hex shaft, and the hex shaft slides within the female hex drive. The female hex drive could also be a threaded nut and the hex shaft a threaded rod, eliminating the adjustment nut. The z-axis actuator causes at least portions of the cleaning device's body to lift, including the attached cleaning head 125, thereby enabling vertical up and down movements of the cleaning head. Such features can enable the control panel 155 to adjust the position of a cleaning head relative to the conveyor belt based on, for example, the type of cleaning head used (FIG. 33), the cleanliness level of the conveyor belt identified by sensory data (e.g., vision sensors), among other reasons.

Figure 43:
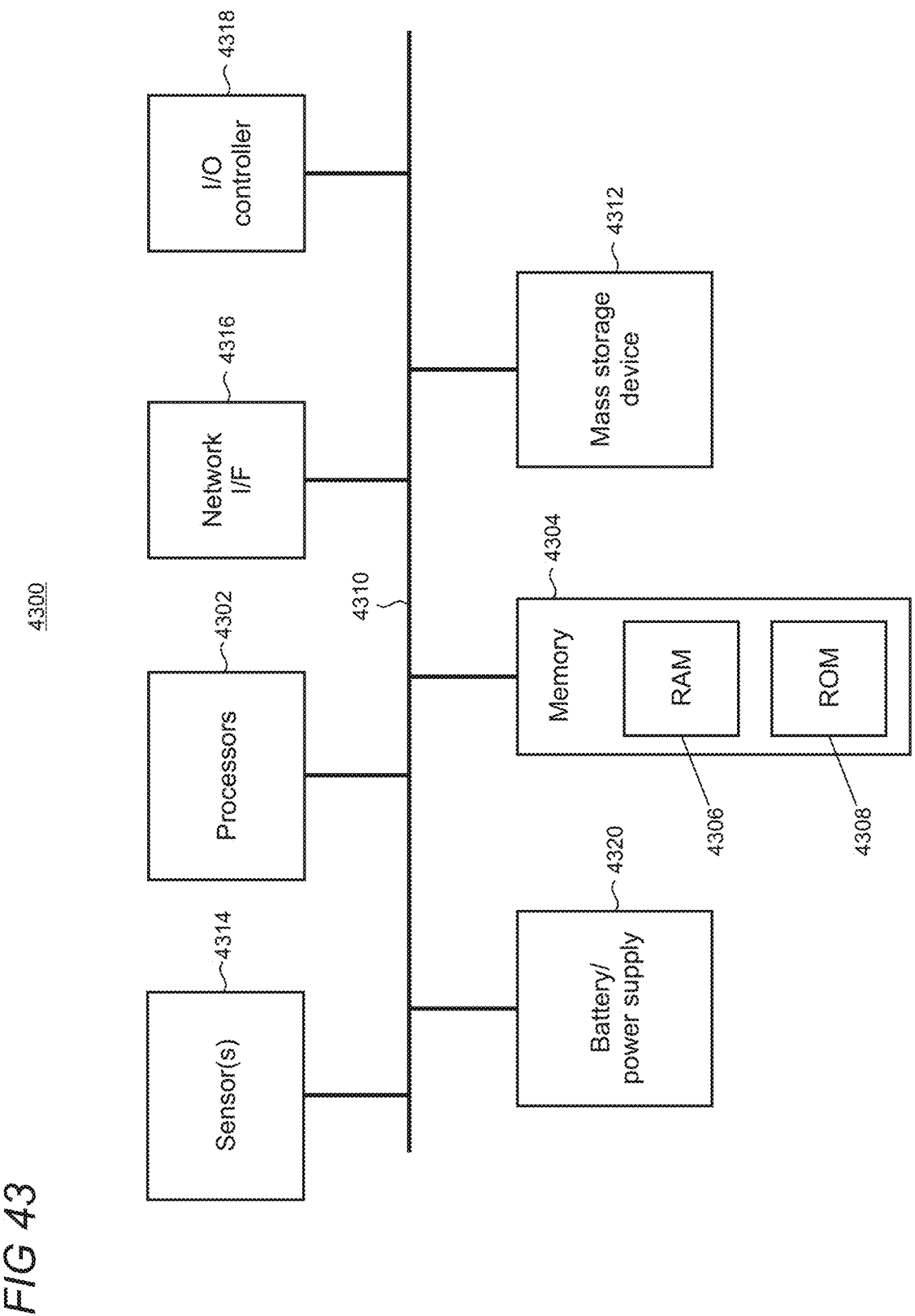
FIG. 43 is a simplified block diagram of an illustrative architecture of a control panel or user computing device that may be used at least in part to implement the present conveyor belt cleaning device having modularity and real-time cleaning adjustments.

FIG. 43 shows an illustrative architecture 4300 for a computing device such as a control panel, user computing device (e.g., laptop computer, desktop computer, smartphone, etc.) for the present conveyor belt cleaning device having modularity and real-time cleaning adjustments based on sensory input. The architecture 4300 may be non-exhaustive for a given computing device but may be utilized to execute the functions described herein.

The architecture 4300 illustrated in FIG. 43 includes one or more processors 4302 (e.g., central processing unit, dedicated Artificial Intelligence chip, graphics processing unit, etc.), a system memory 4304, including RAM (random access memory) 4306 and ROM (read-only memory) 4308, and a system bus 4310 that operatively and functionally couples the components in the architecture 4300. A basic input/output system containing the basic routines that help to transfer information between elements within the architecture 4300, such as during startup, is typically stored in the ROM 4308. The architecture 4300 further includes a mass storage device 4312 for storing software code or other computer-executed code that is utilized to implement applications, the file system, and the operating system. The mass storage device 4312 is connected to the processor 4302 through a mass storage controller (not shown) connected to the bus 4310. The mass storage device 4312 and its associated computer-readable storage media provide non-volatile storage for the architecture 4300. Although the description of computer-readable storage media contained herein refers to a mass storage device, such as a hard disk or CD-ROM drive, it may be appreciated by those skilled in the art that computer-readable storage media can be any available storage media that can be accessed by the architecture 4300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read-only memory), EEPROM (electrically erasable programmable read-only memory), Flash memory or other solid-state memory technology, CD-ROM, DVD, HD-DVD (High Definition DVD), Blu-ray, or other optical storage, a magnetic cassette, magnetic tape, magnetic disk storage or other magnetic storage device, or any other medium which can be used to store the desired information and which can be accessed by the architecture 4300.

According to various embodiments, the architecture 4300 may operate in a networked environment using logical connections to remote computers through a network. The architecture 4300 may connect to the network through a network interface unit 4316 connected to the bus 4310. It may be appreciated that the network interface unit 4316 also may be utilized to connect to other types of networks and remote computer systems. The architecture 4300 also may include an input/output controller 4318 for receiving and processing input from a number of other devices, including a keyboard, mouse, touchpad, touchscreen, control devices such as buttons and switches, or electronic stylus (not shown in FIG. 43). Similarly, the input/output controller 4318 may provide output to a display screen, user interface, a printer, or other output device types (also not shown in FIG. 43).

It may be appreciated that the software components described herein may, when loaded into the processor 4302 and executed, transform the processor 4302 and the overall architecture 4300 from a general-purpose computing system into a special-purpose computing system customized to facilitate the functionality presented herein. The processor 4302 may be constructed from any number of transistors or other discrete circuit elements, which may individually or collectively assume any number of states. More specifically, the processor 4302 may operate as a finite-state machine in response to executable instructions contained within the software modules disclosed herein. These computer-executable instructions may transform the processor 4302 by specifying how the processor 4302 transitions between states, thereby transforming the transistors or other discrete hardware elements constituting the processor 4302.

Encoding the software modules presented herein also may transform the physical structure of the computer-readable storage media presented herein. The specific transformation of physical structure may depend on various factors in different implementations of this description. Examples of such factors may include but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 4300 may further include one or more sensors 4314 or a battery or power supply 4320. The sensors may be coupled to the architecture to pick up data about an environment or a component, including temperature, pressure, etc. Exemplary sensors can include a thermometer, accelerometer, smoke or gas sensor, pressure sensor (barometric or physical), light sensor, ultrasonic sensor, gyroscope, among others. The power supply may be adapted with an AC power cord or a battery, such as a rechargeable battery for portability.

In light of the above, it may be appreciated that many types of physical transformations take place in the architecture 4300 in order to store and execute the software components presented herein. It also may be appreciated that the architecture 4300 may include other types of computing devices, including wearable devices, handheld computers, embedded computer systems, smartphones, PDAs, and other types of computing devices known to those skilled in the art. It is also contemplated that the architecture 4300 may not include all of the components shown in FIG. 43, may include other components that are not explicitly shown in FIG. 43, or may utilize an architecture completely different from that shown in FIG. 43.

Figure 44:
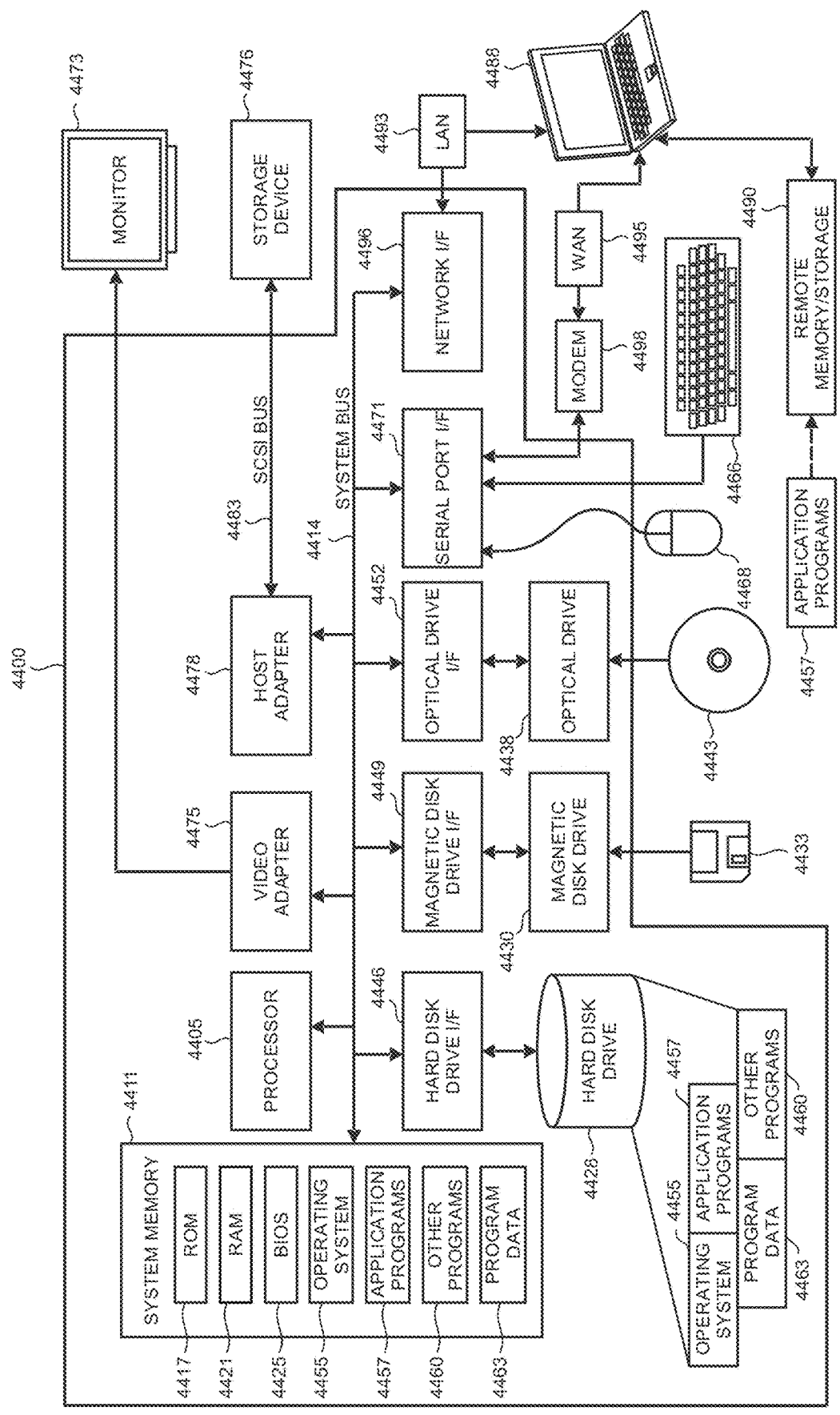
FIG. 44 is a simplified block diagram of an illustrative control panel, desktop computer, smartphone, laptop computer, other computer system, or remote server that may be used in part to implement the present conveyor belt cleaning device having modularity and real-time cleaning adjustments.

FIG. 44 is a simplified block diagram of an illustrative computer system 4400 such as a personal computer, control panel, server (such as remote service 150), or user computing device with which the present conveyor belt cleaning device having modularity and real-time cleaning adjustments based on sensory input may be implemented.

Computer system 4400 includes a processor 4405, a system memory 4411, and a system bus 4414 that couples various system components including the system memory 4411 to the processor 4405. The system bus 4414 may be any of several types of bus structures, including a memory bus or memory controller, a peripheral bus, or a local bus using any of a variety of bus architectures. The system memory 4411 includes read-only memory (ROM) 4417 and random-access memory (RAM) 4421. A basic input/output system (BIOS) 4425, containing the basic routines that help to transfer information between elements within the computer system 4400, such as during startup, is stored in ROM 4417. The computer system 4400 may further include a hard disk drive 4428 for reading from and writing to an internally disposed hard disk (not shown), a magnetic disk drive 4430 for reading from, or writing to a removable magnetic disk 4433 (e.g., a floppy disk), and an optical disk drive 4438 for reading from or writing to a removable optical disk 4443 such as a CD (compact disc), DVD (digital versatile disc), or other optical media. The hard disk drive 4428, magnetic disk drive 4430, and optical disk drive 4438 are connected to the system bus 4414 by a hard disk drive interface 4446, a magnetic disk drive interface 4449, and an optical drive interface 4452, respectively. The drives and their associated computer-readable storage media provide non-volatile storage of computer-readable instructions, data structures, program modules, and other data for the computer system 4400. Although this illustrative example includes a hard disk, a removable magnetic disk 4433, and a removable optical disk 4443, other types of computer-readable storage media which can store data that is accessible by a computer such as magnetic cassettes, Flash memory cards, digital video disks, data cartridges, random access memories (RAMs), read-only memories (ROMs), and the like may also be used in some applications of the present conveyor belt cleaning device having modularity and real-time cleaning adjustments based on sensory input. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof are intended to cover non-transitory embodiments and do not include waves, signals, and/or other transitory and/or intangible communication media.

A number of program modules may be stored on the hard disk, magnetic disk 4433, optical disk 4443, ROM 4417, or RAM 4421, including an operating system 4455, one or more application programs 4457, other program modules 4460, and program data 4463. A user may enter commands and information into the computer system 4400 through input devices such as a keyboard 4466 and pointing device 4468 such as a mouse. Other input devices (not shown) may include a microphone, joystick, gamepad, satellite dish, scanner, trackball, touchpad, touchscreen, touch-sensitive device, voice-command module or device, user motion or user gesture capture device, or the like. These and other input devices are often connected to the processor 4405 through a serial port interface 4471 that is coupled to the system bus 4414 but may be connected by other interfaces, such as a parallel port, game port, or universal serial bus (USB). A monitor 4473 or other type of display device is also connected to the system bus 4414 via an interface, such as a video adapter 4475. In addition to the monitor 4473, personal computers typically include other peripheral output devices (not shown), such as speakers and printers. The illustrative example shown in FIG. 44 also includes a host adapter 4478, a Small Computer System Interface (SCSI) bus 4483, and an external storage device 4476 connected to the SCSI bus 4483.

The computer system 4400 is operable in a networked environment using logical connections to one or more remote computers, such as a remote computer 4488. The remote computer 4488 may be selected as another personal computer, a server, a router, a network PC, a peer device, or other common network node, and typically includes many or all of the elements described above relative to the computer system 4400, although only a single representative remote memory/storage device 4490 is shown in FIG. 44. The logical connections depicted in FIG. 44 include a local area network (LAN) 4493 and a wide area network (WAN) 4495. Such networking environments are often deployed, for example, in offices, enterprise-wide computer networks, intranets, and the Internet.

When used in a LAN networking environment, the computer system 4400 is connected to the local area network 4493 through a network interface or adapter 4496. When used in a WAN networking environment, the computer system 4400 typically includes a broadband modem 4498, network gateway, or other means for establishing communications over the wide area network 4495, such as the Internet. The broadband modem 4498, which may be internal or external, is connected to the system bus 4414 via a serial port interface 4471. In a networked environment, program modules related to the computer system 4400, or portions thereof, may be stored in the remote memory storage device 4490. It is noted that the network connections shown in FIG. 44 are illustrative, and other means of establishing a communications link between the computers may be used depending on the specific requirements of an application of the present conveyor belt cleaning device having modularity and real-time cleaning adjustments based on sensory input.

Various exemplary embodiments are disclosed herein. In one embodiment, disclosed is a method performed by a computing device operatively coupled to a conveyor belt cleaning device, the computing device having a user-interactable user interface (UI) that prompts a user to setup or control the conveyor belt cleaning device, comprising: presenting, on the UI of the computing device, controls to set a near and extended position for a cleaning head controllable by the conveyor belt cleaning device, in which the near and extended positions are with reference to near and far width ends, respectively, of a conveyor belt; presenting, on the UI of the computing device, options to set a cleaning level of the conveyor belt; presenting, on the UI of the computing device, a method by which the computing device measures a length of the conveyor belt; and initiating operation of the cleaning belt cleaning device.

As another example, the computing device is attached to a portion of the conveyor belt cleaning device. In another example, the computing device is remote to the conveyor belt cleaning device. As a further example, the method to measure the conveyor belt's length is automated. In another example, the automated method utilizes a wheel sensor that engages with a moving conveyor belt and measures a distance that the wheel sensor moves over the conveyor belt. In a further example, the wheel sensor further measures a belt speed. As another example, the wheel sensor is attached to an arm that causes retractability of the wheel sensor. In another example, the computing device is initially set to automatically measure the conveyor belt's length when an the wheel sensor's encoder is plugged into the conveyor belt cleaning device. In a further example, presenting, on the UI of the computing device, status information about the conveyor belt cleaning device's operation.

In another exemplary embodiment, disclosed is a conveyor belt cleaning system, comprising: a cleaning head mounted to a frame; a computing device operatively connected to the cleaning head, the computing device having a user interface (UI), one or more processors, and one or more hardware-based memory devices storing instructions which, when executed by the one or more processors, causes the computing device to: present, on the UI, controls to set a near and extended position for a cleaning head controllable by a conveyor belt cleaning device; present, on the UI, options to set a cleaning level of the conveyor belt, in which the cleaning level pertains to a level of intensity exerted against the conveyor belt by the cleaning head; and initiate operation of the cleaning belt cleaning device.

As another example, the controls to set the near and extended positions are with reference to near and far width ends, respectively, of the conveyor belt. In another example, the executed instructions further cause the computing device to present, on the UI of the computing device, a method by which the computing device measures a length of the conveyor belt; and the method to measure the conveyor belt's length is automated. In another example, the automated method utilizes a wheel sensor that engages with a moving conveyor belt and measures a distance that the wheel sensor moves over the conveyor belt. As another example, the wheel sensor further measures a belt speed. As a further example, the wheel sensor is attached to an arm that causes retractability of the wheel sensor. In a further example, the computing device is initially set to automatically measure the conveyor belt's length when an the wheel sensor's encoder is plugged into the conveyor belt cleaning device. As another example, the executed instructions further cause the computing device to present, on the UI of the computing device, status information about the conveyor belt cleaning device's operation.

In another exemplary embodiment, disclosed is one or more hardware-based non-transitory memory devices storing computer-readable instructions which, when executed by one or more processors disposed in a computing device, cause the computing device to: present, on the UI of the computing device, controls to set a near and extended position for a cleaning head controllable by the computing device; determine, by the computing device, a length of a conveyor belt to be cleaned by the cleaning head; and initiate operation of the cleaning belt cleaning device, in which operation includes causing movement of the conveyor belt and the cleaning head. In another example, the determination of the conveyor belt's length is measured by a wheel sensor engaging with the conveyor belt during movement.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a computing device operatively coupled to a conveyor belt cleaning device, the computing device having a user-interactable user interface (UI) that prompts a user to setup or control the conveyor belt cleaning device, comprising:

presenting, on the UI of the computing device, controls to set a near and extended position for a cleaning head controllable by the conveyor belt cleaning device, in which the near and extended positions are with reference to near and far width ends, respectively, of a conveyor belt;

presenting, on the UI of the computing device, options to set a cleaning level of the conveyor belt, in which the cleaning level affects a rotational speed of a rotary head and adjusts a number of zones identified by the computing device for the conveyor belt, in which the zones are sections of the conveyor belt that are independently cleaned;

presenting, on the UI of the computing device, a method by which the computing device measures a length of the conveyor belt;

initiating operation of the conveyor belt cleaning device.

2. The method of claim 1, wherein the computing device is attached to a portion of the conveyor belt cleaning device.

3. The method of claim 1, wherein the computing device is remote to the conveyor belt cleaning device.

4. The method of claim 1, wherein the method to measure the conveyor belt's length is automated.

5. The method of claim 4, wherein the automated method utilizes a wheel sensor that engages with a moving conveyor belt and measures a distance that the wheel sensor moves over the conveyor belt.

6. The method of claim 5, wherein the wheel sensor further measures a belt speed.

7. The method of claim 5, wherein the wheel sensor is attached to an arm that causes retractability of the wheel sensor.

8. The method of claim 5, wherein the computing device is initially set to automatically measure the conveyor belt's length when the wheel sensor's encoder is plugged into the conveyor belt cleaning device.

9. The method of claim 1, further comprising presenting, on the UI of the computing device, status information about the conveyor belt cleaning device's operation.

10. The conveyor belt cleaning system of claim 1, wherein the controls to set the near and extended positions are with reference to near and far width ends, respectively, of the conveyor belt.

11. The method of claim 1, wherein the cleaning level affects a dispensing output level from the cleaning head independent of other cleaning head operations.

12. The method of claim 1, wherein the cleaning level further affects an amount of pressure exerted by the cleaning head against the conveyor belt.

13. The method of claim 1, further comprising, presenting, on the UI of the computing device, a status of the conveyor belt cleaning device including a completion status per zone and an amount cleaned of the conveyor belt's surface.

14. A conveyor belt cleaning system, comprising:
a cleaning head mounted to a frame;
a computing device operatively connected to the cleaning head, the computing device having a user interface (UI), one or more processors, and one or more hardware-based memory devices storing instructions which, when executed by the one or more processors, causes the computing device to:
present, on the UI, controls to set a near and extended position for the cleaning head controllable by the conveyor belt cleaning system;

present, on the UI, options to set a cleaning level of the conveyor belt, in which the cleaning level pertains to a level of intensity exerted against the conveyor belt by the cleaning head;

present, on the UI, a method by which the computing device measures a length of the conveyor belt, wherein the computing devices is initially set to automatically measures the conveyor belt's length when the wheel sensor's encoder is plugged into the conveyor belts cleaning device, in which the conveyor belt's length is manually measured when the wheel sensor's encoder is unplugged, and wherein a distinct UI is presented to on the computing device to enable the user to manually measure the conveyor belt's length when the encoder is disconnected; and initiate operation of the cleaning belt cleaning system.

15. The conveyor belt cleaning system of claim 14, wherein the automated method utilizes a wheel sensor that engages with a moving conveyor belt and measures a distance that the wheel sensor moves over the conveyor belt.

16. The conveyor belt cleaning system of claim 15, wherein the wheel sensor further measures a belt speed.

17. The conveyor belt cleaning system of claim 15, wherein the wheel sensor is attached to an arm that causes retractability of the wheel sensor.

18. The conveyor belt cleaning system of claim 14, wherein the executed instructions further cause the computing device to present, on the UI of the computing device, status information about the conveyor belt cleaning system's operation.

19. One or more hardware-based non-transitory memory devices storing computer-readable instructions which, when executed by one or more processors disposed in a computing device, cause the computing device to:

present, on a UI of the computing device, controls to set a near and extended position for a cleaning head controllable by the computing device;

determine, by the computing device, a length of a conveyor belt to be cleaned by the cleaning head;

present, on the UI, a method by which the computing device measures a length of the conveyor belt, wherein the computing device is initially set to automatically measure the conveyor belt's length when the wheels sensor's encoder is plugged into the conveyor belt's cleaning device, in which the conveyor belt's length is manually measured when the wheels sensor's encoder is unplugged and wherein a distinct UI is presented to on the computing device to enable the user to manually measure the conveyor belt's length when the encoder is disconnected; and initiate operation of the cleaning head, in which operation includes causing movement of the conveyor belt and the cleaning head.

20. The one or more hardware-based non-transitory memory devices of claim 19, wherein the determination of the conveyor belt's length is measured by a wheel sensor engaging with the conveyor belt during movement.

* * * * *